US011155903B2

United States Patent
Plotkowski et al.

(10) Patent No.: US 11,155,903 B2
(45) Date of Patent: Oct. 26, 2021

(54) SOFT MAGNETIC ALLOY EMBODIMENTS FOR ADDITIVE MANUFACTURING AND GEOMETRIC STRUCTURES FORMED THEREFROM

(71) Applicant: UT-Battelle, LLC, Oak Ridge, TN (US)

(72) Inventors: Alexander Plotkowski, Knoxville, TN (US); Ryan Dehoff, Knoxville, TN (US); Frederick List, III, Oak Ridge, TN (US); Jason Pries, Oak Ridge, TN (US); Benjamin Stump, Oak Ridge, TN (US); Keith Carver, Oak Ridge, TN (US); Peeyush Nandwana, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 16/786,845

(22) Filed: Feb. 10, 2020

(65) Prior Publication Data
US 2020/0263281 A1    Aug. 20, 2020

Related U.S. Application Data

(60) Provisional application No. 62/803,665, filed on Feb. 11, 2019.

(51) Int. Cl.
| | |
|---|---|
| *B33Y 80/00* | (2015.01) |
| *C22C 38/02* | (2006.01) |
| *B33Y 10/00* | (2015.01) |
| *B33Y 70/00* | (2020.01) |
| *C22C 38/00* | (2006.01) |

(Continued)

(52) U.S. Cl.
CPC .............. *C22C 38/02* (2013.01); *B23K 26/34* (2013.01); *B23K 26/354* (2015.10); *B33Y 10/00* (2014.12); *B33Y 70/00* (2014.12); *B33Y 80/00* (2014.12); *C22C 38/001* (2013.01); *C22C 2202/02* (2013.01)

(58) Field of Classification Search
CPC ... C22C 38/02; C22C 38/001; C22C 2202/02; B33Y 10/00; B33Y 70/00; B33Y 80/00; B23K 26/354; B23K 26/34
USPC ........................................................ 428/546
See application file for complete search history.

(56) References Cited

U.S. PATENT DOCUMENTS

2018/0336982 A1\*  11/2018  Chainnasamy et al. .....................
                                                      H01F 1/14775
2019/0033828 A1\*   1/2019  Madelone, Jr. et al. .....................
                                                      G05B 19/4099

OTHER PUBLICATIONS

A. Vyatskikh et al., "Additive manufacturing of 3D nano-architected metals", Feb. 2018, Nature Communications, 9, p. 1-8 (Year: 2018).\*

(Continued)

*Primary Examiner* — Humera N. Sheikh
*Assistant Examiner* — John D Schneible
(74) *Attorney, Agent, or Firm* — Klarquist Sparkman, LLP

(57) ABSTRACT

Disclosed herein are embodiments of soft magnetic alloy embodiments for use in additive manufacturing and structures fabricated from such alloys. In some embodiments, the fabricated structures comprise a continuous thin wall (or plurality thereof) having a geometry that promotes reduced eddy current losses and other performance enhancements. In some embodiments, the fabricated structures are used to make components, such as transformer cores and/or electric motors.

18 Claims, 37 Drawing Sheets e    f    g    h

(51) Int. Cl.
*B23K 26/34* (2014.01)
*B23K 26/354* (2014.01)

(56) References Cited

OTHER PUBLICATIONS

M. Garibaldi et al., "Metallurgy of high-silicon steel parts produced using Selective Laser Melting", May 2016, Acta Materialia, 110, p. 207-216 (Year: 2016).*
Y. Yan et al., "Additive Manufacturing of Magnetic Components for Power Electronics Integration", 2016, ICEP 2016 Proceedings, p. 368-371 (Year: 2016).*
Chaudhary et al., "Additive manufacturing of magnetic materials," *Progress in Materials Science*, 114: 100688, May 25, 2020.
Garibaldi, et al. "Effect of annealing on the microstructure and magnetic properties of soft magnetic Fe—Si produced via laser additive manufacturing," *Scripta Materialia*, 142: 121-125, Aug. 30, 2017.
Lamichhane et al., "Additive manufacturing of soft magnets for electrical machines—a review," *Materials Today Physics*, 15: 100255, Jul. 15, 2020.

\* cited by examiner 3400 3402 3404 3406 3408 3410 3412 3414

SOFT MAGNETIC ALLOY EMBODIMENTS FOR ADDITIVE MANUFACTURING AND GEOMETRIC STRUCTURES FORMED THEREFROM

CROSS REFERENCE TO RELATED APPLICATION

This application claims the benefit of the earlier filing date of U.S. Provisional Patent Application No. 62/803,665, filed on Feb. 11, 2019, the entirety of which is incorporated herein by reference.

ACKNOWLEDGMENT OF GOVERNMENT SUPPORT

This invention was made with government support under Contract No. DE-AC05-00OR22725 awarded by the U.S. Department of Energy. The government has certain rights in the invention.

FIELD

The present disclosure concerns embodiments of a soft magnetic alloy for use in additive manufacturing and objects formed therefrom having unique geometries promoting reduced power losses and improved performance.

BACKGROUND

Metal additive manufacturing has emerged as a manufacturing route for structural components. While such manufacturing techniques exist for structural metal alloys, successfully applying such methods to develop functional materials, such as soft-magnetic components for devices like transformers and electric motors, has found less success. Of particular importance is developing alloy materials and additive manufacturing fabrication methods that can produce components that exhibit good magnetic permeability and electrical resistivity. There exists a need in the art for alloy compositions and additive manufacturing methods that facilitate the ability make soft-magnetic objects that exhibit low power losses and improved performance.

SUMMARY

Disclosed herein are embodiments of an additively manufactured object having a shape, comprising: a continuous thin wall having a thickness ranging from greater than 0 mm to 1.5 mm and that occupies a fixed region of the object defined by the shape of the object, wherein the continuous thin wall is made of an iron-based alloy and comprises at least two termini that do not physically touch, and wherein external boundaries of the continuous thin wall do not touch along a path length of the continuous thin wall; and an internal void region defined by the external boundaries of the continuous thin wall. In some embodiments, the iron-based alloy is an iron-silicon alloy. Additional features of certain embodiments of the additively manufactured object are disclosed herein.

Also disclosed herein are embodiments of a method, comprising: (a) adding a first amount of an iron-based alloy feedstock to a build platform; (b) exposing the first amount, or a portion thereof, of the iron-based alloy feedstock to an energy source to provide a first energy-treated region on the build platform, wherein the first energy-treated region comprises an iron-based alloy material; (c) adding a second amount of the iron-based alloy feedstock to the build platform, wherein the second amount of the iron-based alloy feedstock is positioned immediately adjacent to the first energy-treated region on the build platform; (d) exposing the second amount, or a portion thereof, of the iron-based alloy feedstock to the energy source to provide a second energy-treated region on the build platform, wherein the second energy-treated region comprises the iron-based alloy material; and repeating steps (a), (b), (c), and/or (d) to fabricate a continuous thin wall made up of the iron-based alloy material. Additional features of certain embodiments of the method are disclosed herein.

Also disclosed herein are embodiments of an additively manufactured transformer core, or part thereof, comprising: a continuous thin wall made of an Fe-3Si or an Fe-6Si alloy and having a thickness ranging from 0.1 mm to 1.5 mm and that comprises (i) a first terminus and a second terminus, wherein the first terminus and the second terminus do not physically touch and (ii) an external boundary; and an internal void region defined by the external boundary of the continuous thin wall; wherein the continuous thin wall comprises at least one angled curve ranging from greater than 0° to 90°.

Also disclosed herein are embodiments of an additively manufactured continuous thin wall of an iron-based alloy, wherein the continuous thin wall has a thickness ranging from greater than 0 mm to 1.5 mm and comprises (i) at least two termini that do not physically touch, and (ii) external boundaries that do not touch along a path length of the continuous thin wall. In some embodiments, the continuous thin wall comprises at least one angled curve ranging from greater than 0° to 90°.

The foregoing and other objects and features of the present disclosure will become more apparent from the following detailed description, which proceeds with reference to the accompanying figures.

BRIEF DESCRIPTION OF THE DRAWINGS

in FIG. 1A, columns a-c show samples additively manufactured to have different numbers of parallel non-continuous thin walls using a longitudinal scan pattern and column d shows samples additively manufactured to comprise a radial geometry using a standard, rotating scan pattern; in FIG. 1B, column e comprises samples having a continuous thin wall additively manufactured to have a Hilbert curve geometry using a standard, rotating scan pattern; column f comprises samples having a continuous thin wall additively manufactured to have a square spiral geometry using a standard, rotating scan pattern; column g comprises samples that are additively manufactured to comprise a square spiral geometry using a longitudinal (in both directions) scan pattern; and column h comprises samples having a continuous thin wall additively manufactured to have a square spiral geometry with thicker walls than the square spiral geometries of columns f and g.

FIGS. 2A and 2B illustrate a representative geometry of the present disclosure, wherein FIG. 2A illustrates a schematic representation of the features of a continuous thin wall having a Hilbert curve geometry and FIG. 2B is a model simulating the corresponding eddy current density of this geometry at 60 Hz and H=795.7 A/m.

FIGS. 3A and 3B illustrate a representative geometry of the present disclosure, wherein FIG. 3A illustrates a schematic representation of the features of a continuous thin wall having a square spiral geometry and FIG. 3B is a model simulating the corresponding eddy current density of this geometry at 60 Hz and H=795.7 A/m.

FIGS. 4A and 4B illustrate another geometry disclosed herein, wherein FIG. 4A illustrates a schematic representation of the features of a continuous thin wall having a radial lamination geometry and FIG. 4B is a model simulating the corresponding eddy current density at 60 Hz and H=795.7 A/m.

FIGS. 5A and 5B illustrate another geometry disclosed herein, wherein FIG. 5A illustrates a schematic representation of the features of a continuous thin wall having a radial geometry wherein the center of the radial geometry is solid; and FIG. 5B is a model simulating the corresponding eddy current density at 60 Hz and H=795.7 A/m.

FIGS. 6A and 6B illustrate another geometry disclosed herein, wherein FIG. 6A illustrates a schematic representation of the features of a continuous thin wall having another type of radial geometry wherein the center of the radial geometry is not solid and makes up a void region; and FIG. 6B is a model simulating the corresponding eddy current density at 60 Hz and H=795.7 A/m.

FIGS. 7A and 7B illustrate geometries that do not provide desirable eddy current loss reductions, wherein FIG. 7A illustrates a structure that does not comprise a continuous wall, and FIG. 7B is a model simulating the corresponding eddy current density at 60 Hz and H=795.7 A/m.

FIGS. 8A and 8B illustrate geometries that do not provide desirable eddy current loss reductions, wherein FIG. 8A illustrates a structure that does not comprise a continuous wall having at least two termini that do not physically touch, and FIG. 8B is a model simulating the corresponding eddy current density at 60 Hz and H=795.7 A/m.

FIGS. 11A-11O show the design of a cell used for magnetic testing of additively manufactured objects disclosed herein, wherein FIG. 11A shows a simulation of the magnetic flux path.

FIG. 12A shows the difference in hysteresis behavior for low and high frequencies and FIG. 12B shows a linear trend in loss behavior as a function of frequency.

FIG. 16A shows results relating to hysteresis losses and FIG. 16B shows results relating to eddy current losses.

FIGS. 21A-21D show thermal gradient directions across multiple layers of an additively manufactured object, wherein FIG. 21A illustrates an example of the solidification streamline construction for an arbitrary gradient vector field in two dimensions beginning from the seed points shown at the bottom of the graph; FIG. 21B provides EBSD maps and inverse pole figures (IPF) showing the difference in grain structure for thin walls with either a transverse or a longitudinal scan pattern; FIG. 21C illustrates three dimensional solidification gradient streamlines shown for 8 layers of an 800 µm thin wall with a transverse scan pattern; and FIG. 21D illustrates solidification gradient streamlines for the same thin wall but with a longitudinal scan pattern.

FIG. 24A is an electron diffraction image and FIG. 24B is a TEM dark field image over one of the superlattice reflections showing finely distributed ordered domains.

FIG. 28C shows a magnified view of the eddy current loss coefficients for the samples of FIGS. 28A and 28B showing the relationship between the number of plates in the geometry and the eddy current losses, in comparison to a continuous thin wall geometry (e.g., a Hilbert curve geometry).

FIGS. 29A-29H are graphs showing a comparison of the loss behavior of the thin wall geometries of FIGS. 28A-28C before heat treatment (FIGS. 29A-29D) and after heat treatment (FIGS. 29E-29H), wherein FIGS. 29A and 29E show the hysteresis loss coefficients, FIGS. 29B and 29F show the eddy current loss coefficients, FIGS. 29C and 29G show the loss density, and FIGS. 29D and 29H show the effective permeability at a frequency of 60 Hz.

FIGS. 31A-31C are graphs showing alternating current magnetic test results for thin wall embodiments having different exemplary cross-sectional geometries and comprising an Fe-6Si alloy, wherein FIG. 31A shows hysteresis losses, FIG. 31B shows eddy current losses, and FIG. 31C shows loss density at 60 Hz.

FIG. 32B=power loss at 50 Hz 1 T) for a continuous thin wall embodiment having a Hilbert curve geometry and comprising (i) an Fe-3Si alloy and (ii) an Fe-6Si alloy, as compared to a conventional M15 non-oriented steel and an additively manufactured Fe-6.9Si alloy that does not comprise a continuous thin wall geometry of the present disclosure.

FIG. 34A is an image showing a CAD design of the additively manufactured continuous thin wall components forming the core, including the locking miter joints; FIG. 34B is a CAD image of the build wherein features to be machined are shown in dark grey; FIG. 34C is a photographic image of additively manufactured continuous thin wall components comprising the Hilbert curve geometry and made of an Fe-6Si alloy embodiment; FIG. 34D is a photographic image of a partially assembled core after machining; and FIG. 34E is a close-up photographic image showing the Hilbert curve geometry of a continuous thin wall component made of an Fe-6Si alloy embodiment.

DETAILED DESCRIPTION

Overview of Terms

Figure 1A:
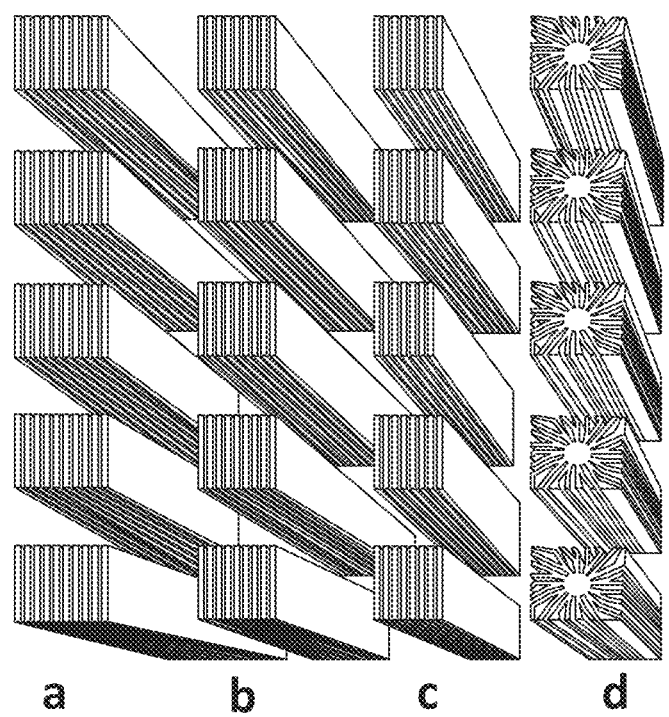
FIGS. 1A and 1B are photographic images of various additively manufactured samples comprising an Fe-6Si alloy.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Although the steps of some of the disclosed methods are described in a particular, sequential order for convenient presentation, it should be understood that this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms and abbreviations are provided:

Additive Manufacturing: As used herein, additive manufacturing is a process whereby three-dimensional objects are fabricated by adding layer-upon-layer of a soft magnetic alloy feedstock and using an energy source (e.g., a laser, electron beam, thermal print head, or other energy source) to melt and fuse each layer of the soft magnetic alloy feedstock together to form the object. In the present disclosure, additive manufacturing does not comprise lamination techniques whereby two or more pre-formed sheets of a material, such as a metal material, are laminated together.

Adjacent: When used in reference to the position of one or more layers making up a fabricated object made using an additive manufacturing process, this term refers to a physical orientation (or ordering) of a reference layer (e.g., a first layer of a feedstock that is provided and subjected to the energy source used in the additive manufacturing process) and another layer (e.g., a subsequent layer of a feedstock that is provided and subjected the energy source used in the additive manufacturing process) wherein the reference layer and the other layer are physically associated through one or more intervening layers (e.g., one or more layers of a feedstock that are provided and subject to the energy source used in the additive manufacturing process).

Continuous Thin Wall: An additively manufactured wall made of a soft magnetic alloy material and that comprises at least two termini that do not physically touch or meet and wherein the continuous thin wall is not interrupted by a void region. In some embodiments, the continuous thin wall comprises a first terminus and a second terminus that do not physically touch or meet and further comprises an external boundary that does not physically touch any other portion of the wall along its pathway. In some embodiments, a pathway of the continuous thin wall defines one or more void regions. In independent embodiments, a plurality of additively manufactured parallel plates do not comprise a continuous thin wall. In independent embodiments, the continuous thin wall does not comprise sheet metal or deformed sheet metal that has not been additively manufactured.

Hilbert Curve: A mathematical description of a path that can be occupied by an additively manufactured continuous thin wall fabricated with a soft magnetic alloy material disclosed herein. When this term is used herein, it is used to describe a continuous thin wall having two termini (i.e., a first terminus and a second terminus), that do not meet or touch, thereby providing an open pathway, and further having one or more angled curves such that the continuous thin wall does not have a completely straight pathway. In some embodiments, the angled curve can have an angle ranging from greater than 0° to less than 180°.

Immediately Adjacent: When used in reference to the position of one or more layers provided and/or made during an additive manufacturing process used to make fabricated objects of the present disclosure, this term refers to a physical orientation (or ordering) of the reference layer and another layer wherein the reference layer and the other layer are in direct physical contact (e.g., the reference layer is positioned on top of, on the bottom of, or to the immediate left/right of the other layer).

Main Alloying Element: An element that is combined with iron to provide a soft magnetic alloy. Exemplary main alloying elements can include silicon, cobalt, nickel, aluminum, manganese, or combinations thereof.

Planar Sheet: As used herein, a planar sheet is a pre-formed sheet of material that is not produced using additive manufacturing and instead comprises an alloy material that has been physically shaped and/or deformed to provide the planar sheet, such as by using a rolling technique.

Soft Magnetic Alloy: A solid or liquid composition comprising iron and at least one additional main alloying element. In some embodiments, a soft magnetic alloy is an iron-based alloy.

Thin Wall: A wall of alloy material that has been additively manufactured to have a thickness of 1.5 mm or less, such as greater than 0 mm to 1.5 mm. Additional thickness values are disclosed herein. In independent embodiments, a thin wall of the present disclosure does not include a thin wall formed by laminating individual planar sheets of sheet metal and/or does not include a thin wall formed by a single piece of sheet metal.

Trace Elements: Elements that can be present in a soft magnetic alloy of the present disclosure without deleteriously effecting the properties of the alloy. Exemplary trace elements can include carbon, nitrogen, oxygen, sulfur, phosphorus, or combinations thereof.

Void Region: A region defined by an external boundary of a continuous thin wall through which magnetic flux can freely flow. In particular embodiments, the void region is free of any alloy material.

Introduction

While using additive manufacturing to make metal materials in complex geometries and/or shapes has been developing, there have been fewer advances in using such processing methods to make functional components comprising magnetic alloys, particularly soft magnetic alloys like Fe—Si alloys.

Fe—Si alloys are attractive soft-magnetic materials that are typically used in transformer cores and electric motors. Fe—Si alloys typically possess high relative magnetic permeability and electrical resistivity, which results in decreased power losses. Typically, power losses may be attributed to hysteresis losses (which relate to the magnetic properties of the material) and eddy current losses (which are strongly influenced by geometric factors in device construction). While hysteresis losses may be decreased by optimizing the microstructure and alloy chemistry of a particular material, Fe—Si alloys comprise <100> type crystallographic directions that are most easily magnetized. By deforming Fe—Si materials into sheets and heat-treating the sheets using traditional manufacturing methods, a Goss texture can be obtained that preferentially aligns these directions against the rolling direction. As such, this type of material is often only usable in transformer cores where the magnetic flux direction can be oriented along the rolling direction of the sheet. However, for more complex flux pathways (such as in electric motor stators), randomly oriented grain structures are needed, and thus traditional manufacturing methods are not feasible. Also, while losses could potentially be reduced by increasing the amount of silicon in such alloys, such strategies result in materials that have minimal ductility and/or are incompatible with traditional processing methods.

As disclosed herein, the present inventors have determined that Fe—Si alloy embodiments can be prepared using additive manufacturing methods, and particularly alloys having high amounts of silicon and/or alloys having complex geometries that cannot be obtained using conventional lamination methods using non-additively manufactured sheet metal materials. Disclosed herein are new method embodiments for making new soft-magnetic devices comprised of one or more continuous thin walls that are additively manufactured to have geometries that reduce power losses and increase overall performance.

Alloy and Object Embodiments

Disclosed herein are alloy embodiments that function as soft-magnetic materials. In some embodiments, the alloy is an iron-based alloy that comprises one or more additional main alloying elements. Main alloying elements can include silicon, cobalt, nickel, aluminum, manganese, or combinations thereof. In some embodiments, each main alloying element can be included in an amount ranging from greater than 0 wt % to 10 wt %, such as 1 wt % to 8 wt %, or 2 wt % to 7 wt %, or 2 wt % to 5 wt %. In some other embodiments, the total amount of main alloying elements can range from greater than 0 wt % to 10 wt %, such as 1 wt % to 8 wt %, or 2 wt % to 7 wt %, or 2 wt % to 5 wt %. In some embodiments using aluminum and/or manganese as main alloying elements, individually or together (or in combination with another main alloying element), the aluminum and/or manganese individually can be present in an amount ranging from greater than 0 wt % to 2 wt %, such as 1 wt % to 2 wt %. In particular embodiments, the main alloying element used in combination with the iron is silicon or cobalt. In some representative embodiments, the alloy is an Fe—Si alloy that comprises 2 wt % Si to 7 wt % Si, such as 2.5 wt % to 6.5 wt %, or 3 wt % to 6 wt % Si. In an independent embodiment, the Si is not present at 6.9 wt %. In such embodiments, the balance wt % is iron, accounting for any trace elements that may be present. In some embodiments, the alloy consists essentially of Fe, Si, and any trace elements (e.g., carbon, nitrogen, oxygen, or combinations thereof). In yet some additional embodiments, the alloy consists of Fe, Si, and any trace elements (e.g., carbon, nitrogen, oxygen, or combinations thereof). In exemplary embodiments, the alloy is a Fe-6Si alloy or a Fe-3Si alloy. In an independent embodiment, the alloy is not Fe-6.9Si and thus does not comprise 6.9 wt % silicon.

As mentioned above, the alloy embodiments disclosed herein can comprise one or more trace elements, which are elements that can be present in the alloy at certain amounts without deleteriously affecting the alloy. In some embodiments, trace elements can include carbon, nitrogen, oxygen, sulfur, phosphorus, or combinations thereof. In some embodiments, the trace elements are present at low levels, such as less than 0.1 wt % per each trace element, such as less than 0.075 wt %, or less than 0.05 wt %, or less than 0.03 wt %. In particular embodiments, the trace elements are present in a total amount of less than 0.25 wt %, such as less than 0.24 wt %, or less than 0.17 wt %.

The alloy embodiments of the present disclosure can be used in additive manufacturing methods to fabricate functional objects, such as components of alternating current devices. In particular embodiments, alloy embodiments of the present disclosure are used to additively manufacture three dimensional objects that exhibit soft-magnetic properties and that exhibit low eddy current losses. Additively manufactured objects of the present disclosure comprise a thin wall that is made up of the alloy material. In some embodiments, the thin wall is additively manufactured to be continuous such that it does not terminate on itself. For example, some continuous thin walls comprise at least two termini (e.g., a first terminus and a second terminus) that do not physically meet or touch. As described herein, continuous thin walls of the present disclosure are not made or formed by laminating sheet metal materials and/or by deforming sheet metal materials.

In some embodiments, the continuous thin wall has a particular geometry that reduces eddy current losses and promotes an even distribution of magnetic flux through the object. The continuous thin wall typically is fabricated to occupy a fixed region that is defined by the shape of the particular object being fabricated. In such embodiments, the object can be made of one continuous thin wall that is fabricated via additive manufacturing in the desired shape of the object. In yet some additional embodiments, the object can be made of one or more continuous thin walls that can be coupled together (e.g., physically coupled) to provide the desired shape of the object. The continuous thin wall can be fabricated using additive manufacturing such that external edges of the thin wall do not touch along a path length of the continuous thin wall. In some embodiments, the continuous thin wall is fabricated to provide a shape has a tortuous path such that it comprises one or more angled curves along the path defined by the continuous thin wall. The angled curves can have angles ranging from greater than 0° to less than 180°, such as greater than 0° to 160°, or greater than 0° to 120°, or greater than 0° to 90°, or greater than 0° to 60°. In some such embodiments, the continuous thin wall comprises one or more 90° angles in the pathway of the continuous thin wall. In particular embodiments, the object also inherently has one or more void regions defined by the pathway of the continuous thin wall. The presence of these void regions can allow the magnetic flux to freely flow through the object. In some embodiments, the axis along which magnetic flux flows can be parallel or perpendicular to the build axis of the additively manufactured object.

Figure 1B:
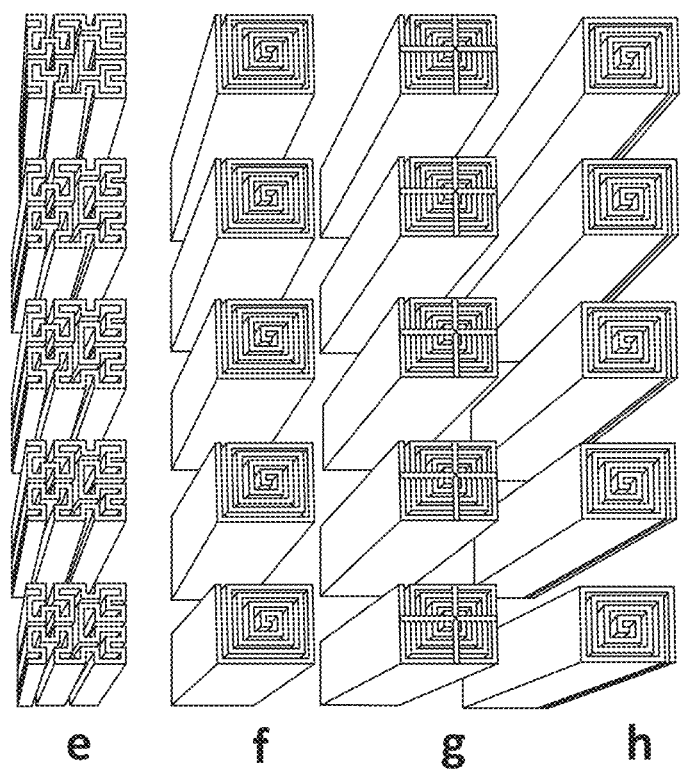
Figure 2A:
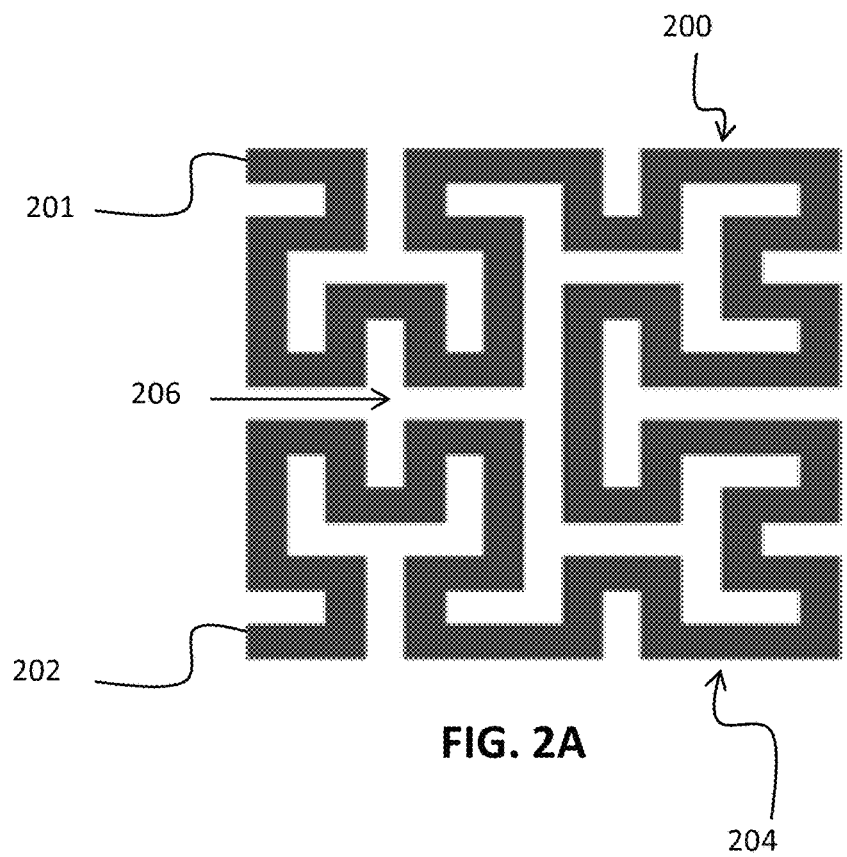
Figure 2B:
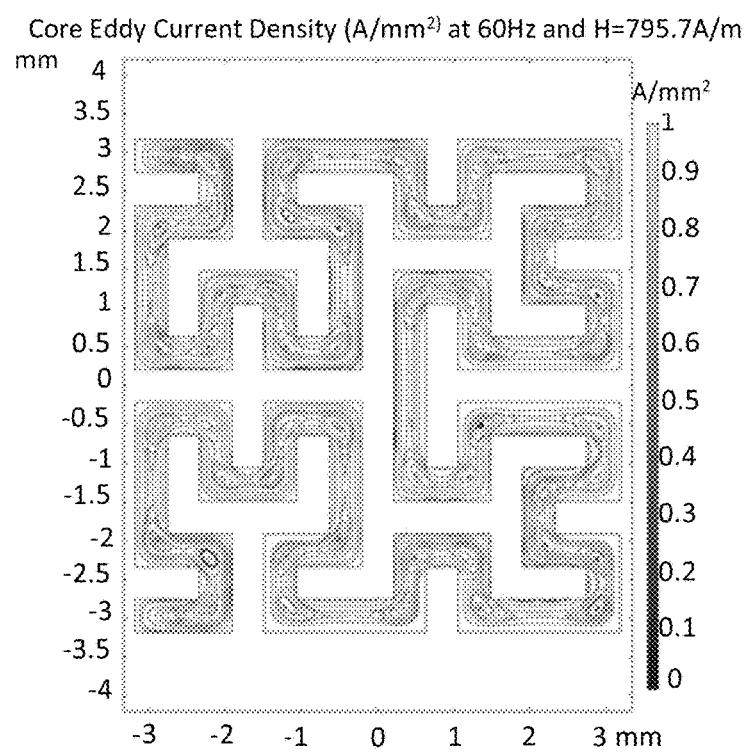
Figure 3A:
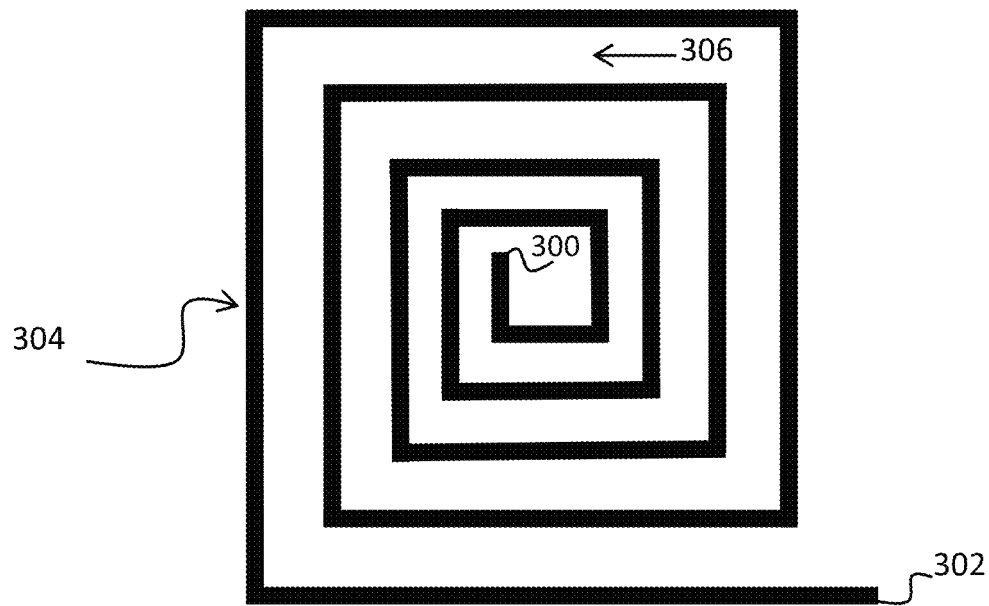
Figure 3B:
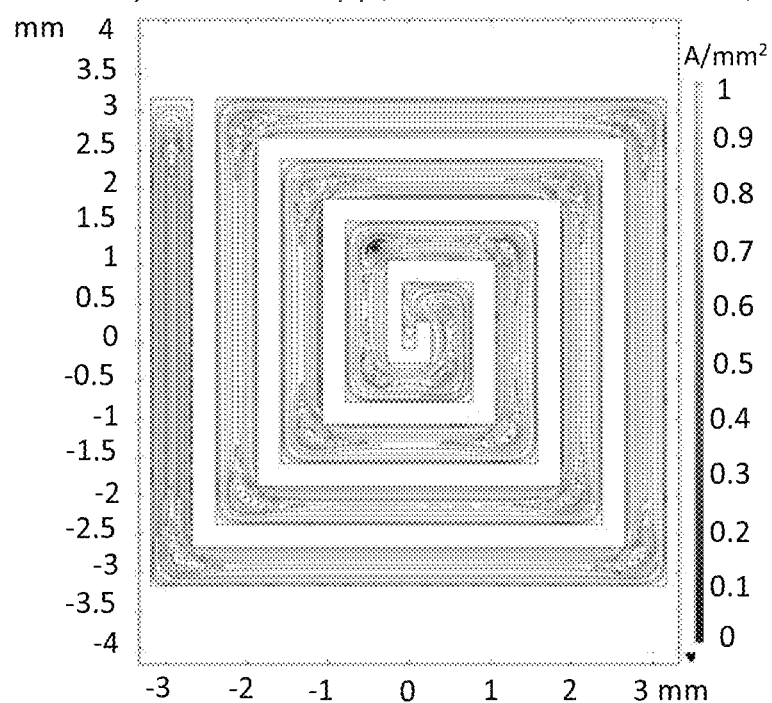
Figure 4A:
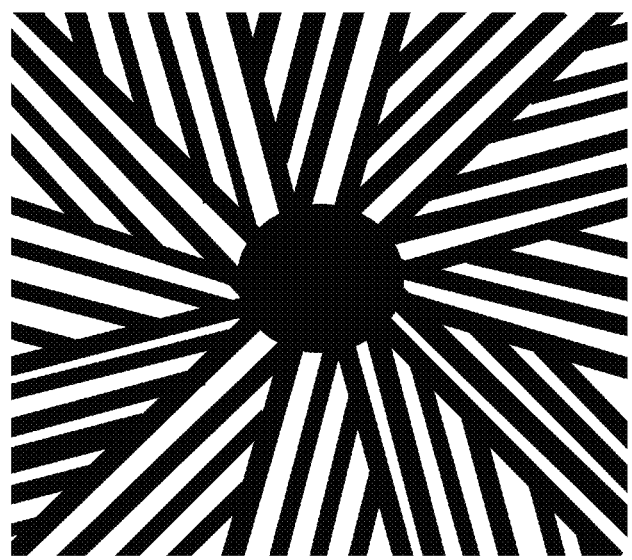
Figure 4B:
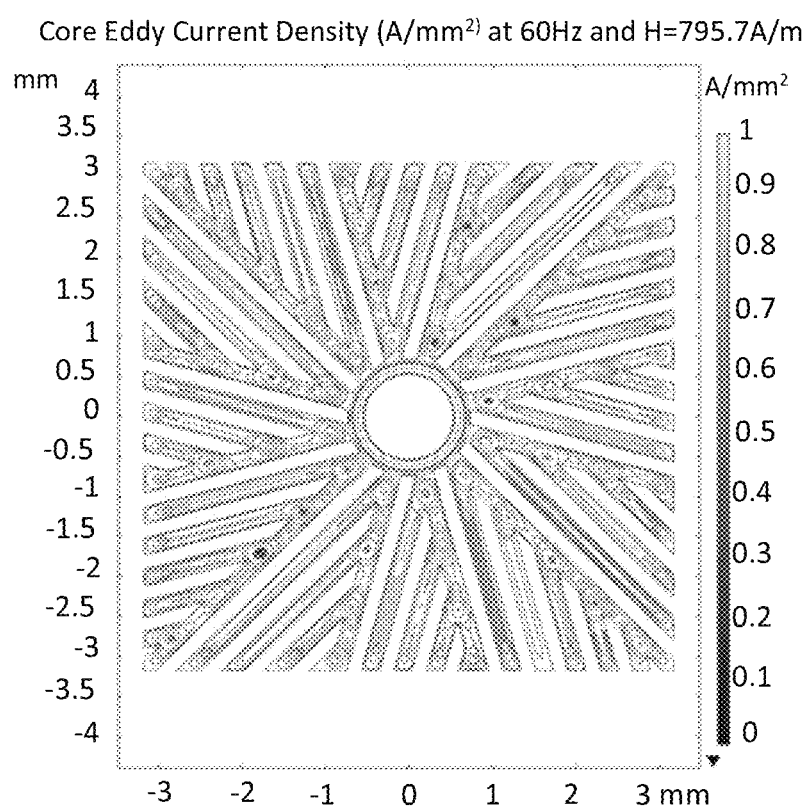
Figure 5A:
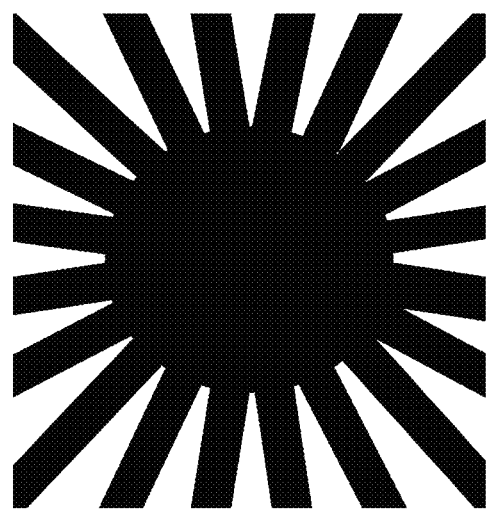
Figure 5B:
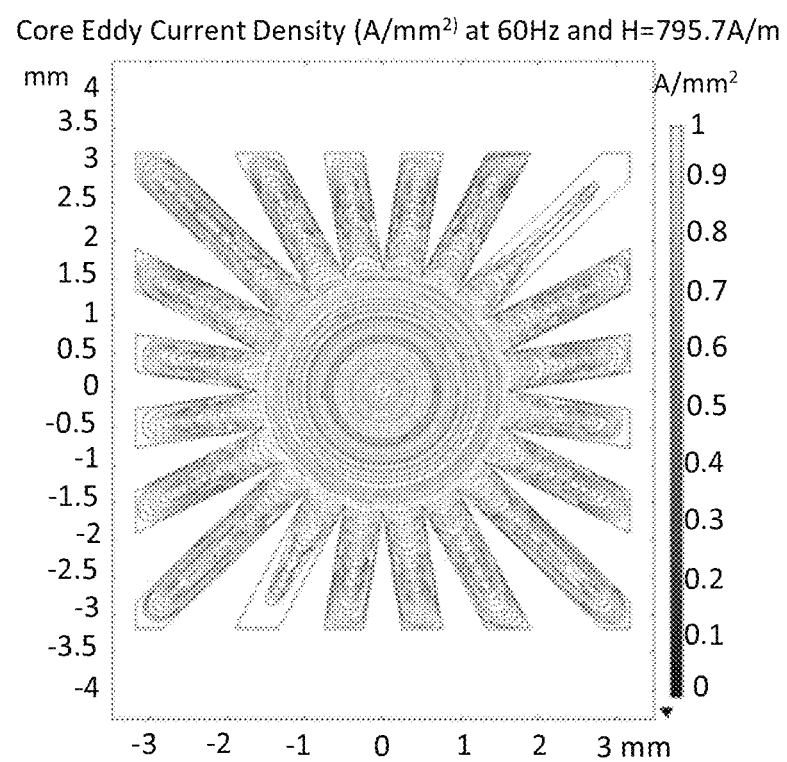
Figure 6A:
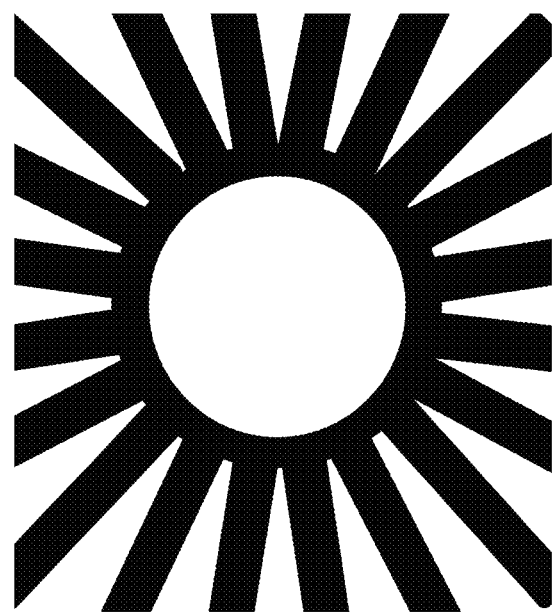
Figure 6B:
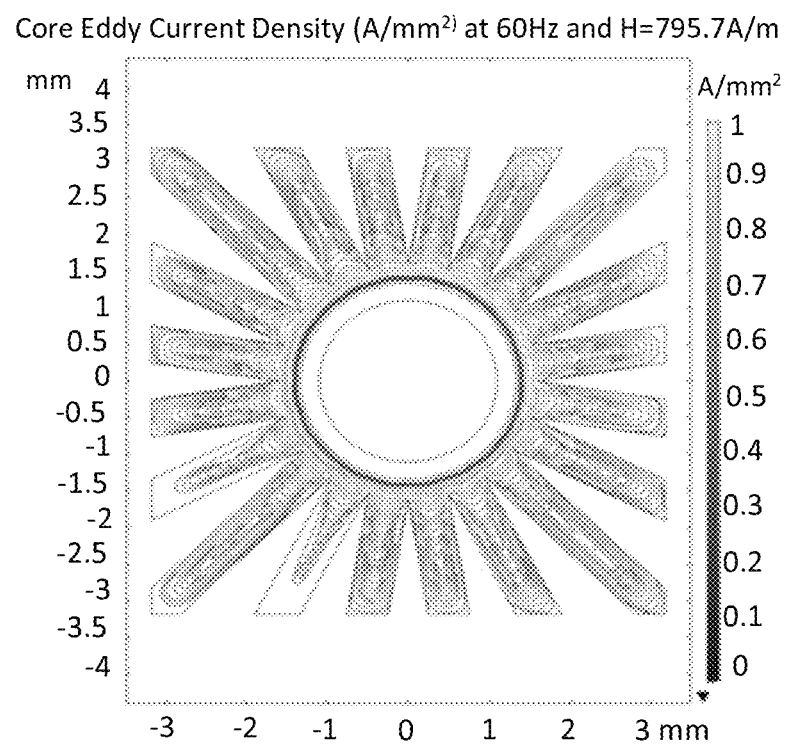
Figure 7A:
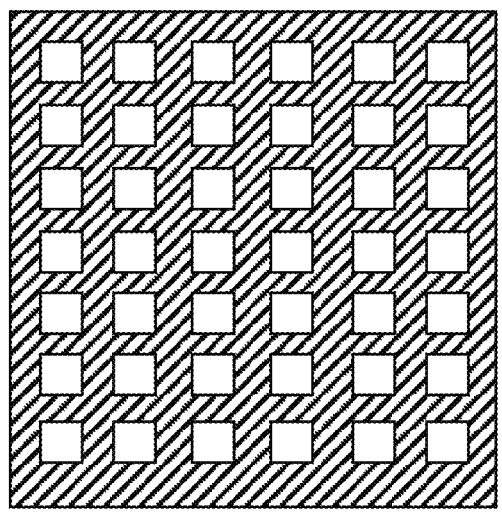
Figure 7B:
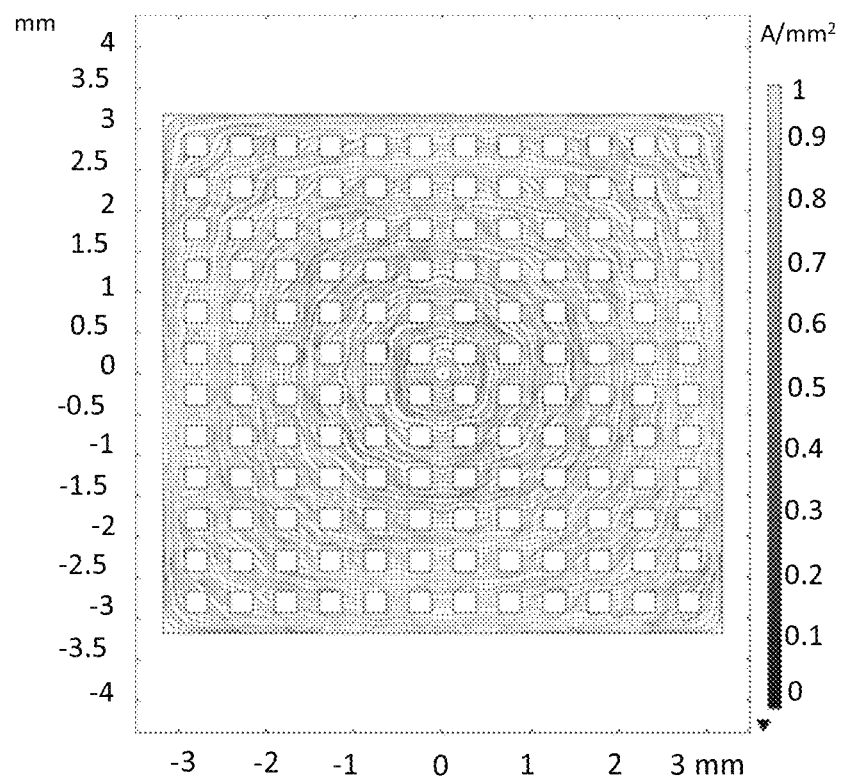
Figure 8A:
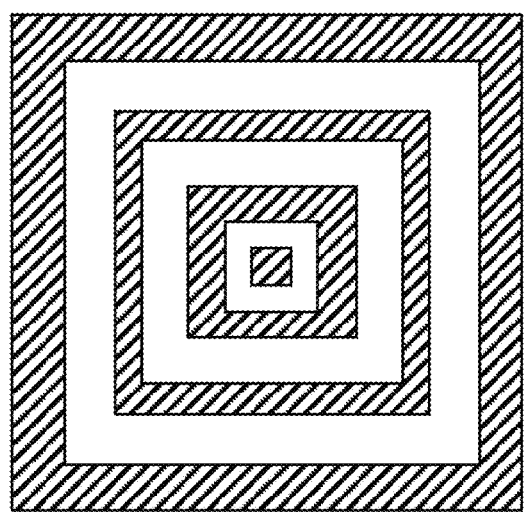
Figure 8B:
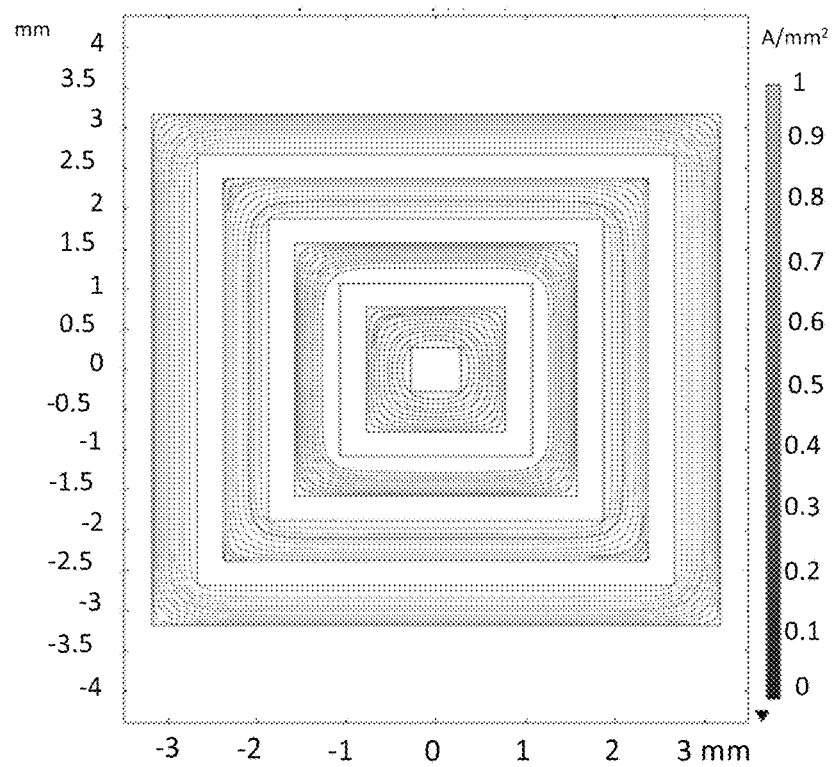

Solely by way of example, certain additively manufactured object embodiments described in the present application are shown in FIGS. 1A and 1B. FIG. 1A shows some comparative additively manufactured objects comprising non-continuous thin walls (e.g., parallel plates) formed using an Fe-3Si alloy embodiment (columns a-c) and additively manufactured objects having a continuous thin wall that is fabricated to have a radial pattern (column d). FIG. 1B shows additional representative embodiments of additively manufactured objects comprising different continuous thin wall geometries fabricated with an Fe-3Si alloy embodiment. Features of certain representative geometries are illustrated in FIGS. 2A, 3A, 4A, 5A, and 6A and models simulating corresponding eddy current densities are provided by FIGS. 2B, 3B, 4B, 5B, and 6B. In a representative embodiment, the object comprises a continuous thin wall of Fe—Si alloy that is fabricated to have a shape matching a Hilbert curve geometry. An exemplary Hilbert curve geometry is illustrated in FIG. 2A. As can be seen in FIG. 2A, fabricating the continuous thin wall in the exemplary Hilbert curve geometry provides a continuous thin wall 200 that has a first terminus 201 and a second terminus 202 that do not physically touch or meet. Also, the continuous thin wall comprises an external boundary 204 that does not touch along the path length of the continuous thin wall. A representative square spiral geometry is illustrated in FIG. 3A. The continuous thin wall fabricated to have this geometry also comprises a first terminus (300) and a second terminus (302) that do not touch or meet, as well as external boundary 304 that does not touch along the path length of the continuous thin wall. Void regions (e.g., void regions 206 and 306) also are present in both embodiments illustrated in FIGS. 2A and 3A. Additional geometries of continuous thin walls are illustrated in FIGS. 4A, 5A, and 6A. In some embodiments, the geometries illustrated in FIGS. 4A, 5A, and 6A can be used, but do not perform as well as embodiments illustrated in FIGS. 2A and 3A. As such, in an independent embodiment, the continuous thin wall does not have a radial geometry. Additively manufactured geometries that do not comprise a continuous thin wall according to the present disclosure are illustrated in FIGS. 7A and 8A and the corresponding eddy current density models are shown in FIGS. 7B and 8B, respectively. The embodiment illustrated in FIG. 8A comprises a non-continuous thin wall lacking at least two termini that do not touch or meet.

In particular representative embodiments, the continuous thin wall is fabricated with an alloy embodiment disclosed herein and has a Hilbert curve geometry or a square spiral geometry. Representative objects that can be formed with continuous thin wall alloy geometries of the present disclosure can include, but are not limited to, transformer cores, electric motors, and the like. In an independent embodiment, the object does not comprise a bulk structure or a laminated structure wherein the structure comprises individual planar sheets of the alloy that are laminated together. In yet another independent embodiment, the object does not comprise a structure formed from a single pre-formed sheet of a metal material.

Continuous thin wall embodiments of the present disclosure can have a thickness ranging from greater than 0 mm to 1.5 mm (or more), such as 0.01 mm to 1.5 mm, or 0.05 mm to 1.5 mm, or 0.5 mm to 1.5 mm, or 0.2 mm to 0.5 mm, or 0.1 mm to 0.2 mm. In some particular embodiments, the thin wall has a thickness of 0.1 mm, 0.2 mm, 0.4 mm, 0.5 mm, or 1.5 mm.

Method Embodiments

Also disclosed herein are embodiments of a method for making objects comprising the alloy embodiments described herein. In particular disclosed embodiments, the method is an additive manufacturing method that does not include a lamination technique. In some embodiments, the method comprises using a layer-by-layer manufacturing method that uses an energy source, such as direct metal laser sintering, direct energy deposition, electron beam melting, selective heat sintering, selective laser melting, selective laser sintering, laser powder bed additive manufacturing, and microinduction. Such techniques can be used to fabricate a continuous thin wall made of the alloy embodiments disclosed herein. In some embodiments, the continuous thin wall can be additively manufactured to have a pre-determined shape of the object, or a plurality of components comprising the additively manufactured continuous thin wall can be combined to construct the object. Using such additive manufacturing techniques to form the objects avoids having to use conventional lamination and deformation processing techniques. These conventional techniques are limited to particular alloy chemistries (e.g., low amounts of silicon) given the physical properties of the alloy. For example, while it can be desirable to increase the amount of silicon to promote better resistivity increases, doing so prevents the ability to laminate and subsequently deform the alloy into desired shapes due to the increased brittleness of the alloy that results from the increased silicon content. In contrast, the present inventors have developed alloy chemistries and geometries that can be made using additive manufacturing to provide objects having reduced power losses and increased magnetic properties that cannot be replicated using conventional fabrication methods, like lamination and deformation. The additive manufacturing method embodiments disclosed herein provide the ability to control the magnetic performance of the alloy. In some embodiments, such control is afforded by the ability of the additive manufacturing method to provide complex geometries of the fabricated continuous thin wall. In yet some additional embodiments, such control can be afforded by the ability to produce particular microstructures and compositions within the alloy. Various aspects of the method can be modified to provide desired results for the resulting fabricated object. For example, in some embodiments, geometry of the continuous thin wall is controlled as described herein. In other embodiments, the scan pattern used during fabrication can be controlled influence grain structure. In yet some other embodiments, post-process heat treatments can be used to influence the microstructure of the alloy making up the object.

In particular embodiments, the method comprises using a device, such as device used in a laser-based additive manufacturing method, to make the object from an alloy composition. The device can include a powder bed, an energy source, a build platform, a deposition apparatus capable of depositing the iron-based alloy feedstock (e.g., a roller, a blade, and the like), and other suitable components that will be recognized by a person of ordinary skill in the art with the benefit of the present disclosure. In some embodiments, the method comprises adding a first amount of an iron-based alloy feedstock to a build platform; exposing the first amount, or a portion thereof, of the iron-based alloy feedstock to an energy source to provide a first energy-treated region on the build platform, wherein the first energy-treated region comprises an iron-based alloy material; adding a second amount of the iron-based alloy feedstock to the build platform, wherein the second amount of the iron-based alloy feedstock is positioned immediately adjacent to the first energy-treated region on the build platform; and exposing the second amount, or a portion thereof, of the feedstock to the energy source to provide a second energy-treated region on the build platform, wherein the second energy-treated region comprises the iron-based alloy material. In some embodiments, the iron-based feedstock is contained in a powder bed that is coupled to the building platform.

Iron-based alloy embodiments of the present disclosure can be used in the method and are in the form of a feedstock. In particular embodiments, the feedstock is in the form of a powder. In some embodiments, the feedstock powder is a Fe—Si alloy powder. In some embodiments, the feedstock powder can be sieved to provide a particular size distribution. In representative embodiments described herein the size distribution can range from 1 μm to 100 μm, such as 5 μm to 70 μm, such as 10 μm to 50 μm, or 10 μm to 44 μm. However, other powder particle and/or grain sizes can be made depending on the additive manufacturing technique to be used. These would be recognized by person of ordinary skill in the art with the guidance of the present disclosure.

The energy source can be a laser or other energy source sufficient to provide sufficient energy to melt and consolidate the feedstock (e.g., a heater, a laser, an electron beam, or the like). In some embodiments, when exposed to the energy source, the feedstock is sintered and/or melted to provide an energy-treated region (e.g., a consolidated region). This region can be allowed to cool and solidify. The process is repeated to provide sequential layers of energy-treated regions that become fused together during the process, thereby producing the fabricated continuous thin wall. In some embodiments, the method can further comprise preheating the build plate upon which the alloy is deposited during fabrication. In some additional embodiments, the method can further comprise increasing or decreasing the cooling rate to change a thickness of the continuous thin wall. In particular embodiments, a scan pattern is used to modify the grain structure of the iron-silicon alloy during fabrication.

Overview of Several Embodiments

Disclosed herein are embodiments of an additively manufactured object having a shape, comprising: a continuous thin wall having a thickness ranging from greater than 0 mm to 1.5 mm and that occupies a fixed region of the object defined by the shape of the object, wherein the continuous thin wall is made of an iron-based alloy and comprises at least two termini that do not physically touch, and wherein external boundaries of the continuous thin wall do not touch along a path length of the continuous thin wall; and an internal void region defined by the external boundaries of the continuous thin wall.

In some embodiments, the iron-based alloy is an iron-silicon alloy.

In any or all of the above embodiments, the iron-silicon alloy comprises silicon in an amount ranging from 3 wt % to 6 wt %.

In any or all of the above embodiments, the iron-silicon alloy is not Fe-6.9Si.

In any or all of the above embodiments, the continuous thin wall has a path length that reduces eddy current loop formation.

In any or all of the above embodiments, the continuous thin wall is configured in a pattern that comprises at least one angled curve.

In any or all of the above embodiments, the angled curve ranges from greater than 0° to less than 180°.

In any or all of the above embodiments, the continuous thin wall is fabricated to have a geometry that adopts a Hilbert curve pattern.

In any or all of the above embodiments, the continuous thin wall is fabricated to have a shape matching a square spiral pattern.

In any or all of the above embodiments, the iron-based alloy is substantially free of carbon or oxygen interstitial elements.

In any or all of the above embodiments, the additively manufactured object is a transformer core or an electric motor.

In any or all of the above embodiments, the continuous thin wall does not comprise a single planar sheet of the iron-based alloy or a plurality of laminated planar sheets of the iron-based alloy.

Also disclosed herein are embodiments of a method, comprising: (a) adding a first amount of an iron-based alloy feedstock to a build platform; (b) exposing the first amount, or a portion thereof, of the iron-based alloy feedstock to an energy source to provide a first energy-treated region on the build platform, wherein the first energy-treated region comprises an iron-based alloy material; (c) adding a second amount of the iron-based alloy feedstock to the build platform, wherein the second amount of the iron-based alloy feedstock is positioned immediately adjacent to the first energy-treated region on the build platform; (d) exposing the second amount, or a portion thereof, of the iron-based alloy feedstock to the energy source to provide a second energy-treated region on the build platform, wherein the second energy-treated region comprises the iron-based alloy material; and repeating steps (a), (b), (c), and/or (d) to fabricate a continuous thin wall made up of the iron-based alloy material.

In any or all of the above embodiments, the method further comprises pre-heating a build plate upon which the iron-based alloy feedstock is added during fabrication.

In any or all of the above embodiments, the method further comprises increasing or decreasing cooling rate to change a thickness of the continuous thin wall.

In any or all of the above embodiments, a scan pattern is used to modify the grain structure of the iron-based alloy material during fabrication.

In any or all of the above embodiments, the iron-based alloy is an iron-silicon alloy.

In any or all of the above embodiments, the iron-based alloy is Fe-3Si or Fe-6Si.

In any or all of the above embodiments, the iron-based alloy feedstock is in the form of a powder.

Also disclosed herein are embodiments of an additively manufactured transformer core, or part thereof, comprising: a continuous thin wall made of an Fe-3Si or an Fe-6Si alloy and having a thickness ranging from 0.1 mm to 1.5 mm and that comprises (i) a first terminus and a second terminus, wherein the first terminus and the second terminus do not physically touch and (ii) an external boundary; and an internal void region defined by the external boundary of the continuous thin wall; wherein the continuous thin wall comprises at least one angled curve ranging from greater than 0° to 90°.

EXAMPLES

Example 1

In this example, process conditions and design of experiments to evaluate performance were determined. Additive manufacturing was performed using a Renishaw AM250 system. This system uses a pulsed laser, so that the primary process parameters are laser power, duration of the laser pulses (exposure time), spacing between pulses, hatch spacing, and layer thickness. A preliminary design of experiments was used to determine processing parameters that resulted in highly dense samples. The selected parameter sets are provided by Table 1. Feedstock powders of a Fe-3Si and Fe-6Si alloy were obtained from Praxair Surface Technologies and were determined to have the composition measured as shown in Table 2. The powders were sieved to obtain a particle size distribution between 10 and 44 μm.

TABLE 1

| Parameter | Value |
| --- | --- |
| Power (W) | 200 |
| Hatch spacing (μm) | 100 |
| Point spacing (μm) | 75 |
| Exposure time (μs) | 110 |
| Layer thickness (μm) | 50 |

TABLE 2

| Alloy | Fe | Si | C | N | O | Other |
| --- | --- | --- | --- | --- | --- | --- |
| Fe—3Si | Balance | 3.0 ± 0.3 | 0.04 | 0.001 | 0.027 | <0.10 |
| Fe—6Si | Balance | 6.0 ± 0.4 | 0.04 | 0.002 | 0.033 | 0.16 |

Figure 9:
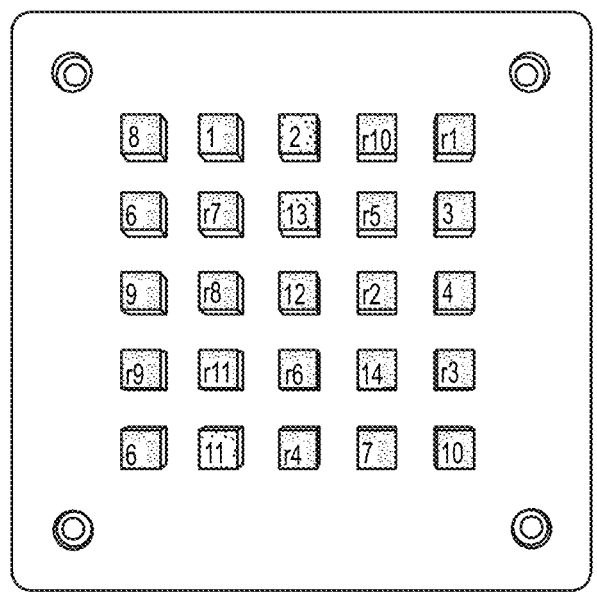
FIG. 9 is a photographic image of a build plate comprising various additively manufactured cubes made with an Fe-3Si alloy powder.
Figure 10:
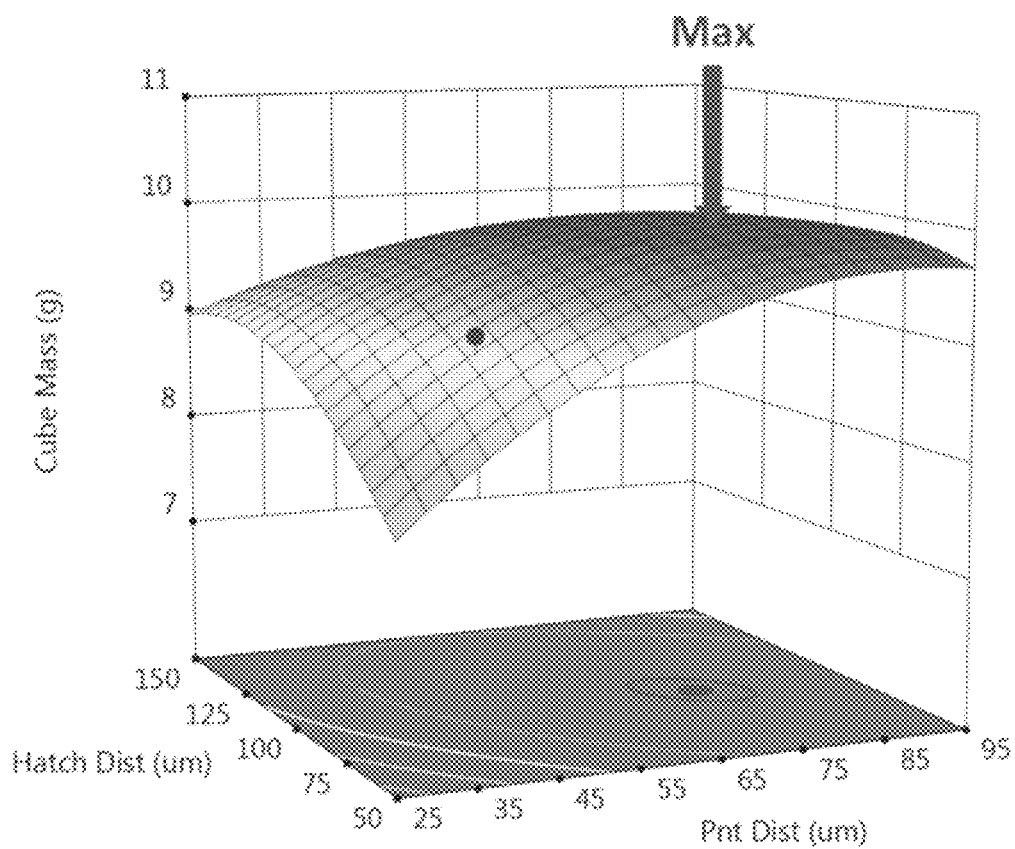
FIG. 10 illustrates the response surface for the cube mass of the cubes shown in FIG. 9 as a function of point spacing and hatch spacing.

The selected geometry of alloy embodiments in this example were 10 mm cubes, and the design of experiments was formulated using a Box-Behnken design with a total of 25 conditions and 10 replicates of the central parameter set. An example of the design of cubed samples made with the Fe-3Si alloy powder is shown in FIG. 9. Given that the geometry of all cubes was similar, their density was approximated by considering the mass of the cubes. The response surface for the mass of the Fe-3Si cubes as a function of the point spacing and hatch spacing is shown in FIG. 10, and the maximum mass, corresponding to a minimum in porosity defects, is indicated. A similar design of experiments was repeated with the Fe-6Si alloy powder. The same central process conditions were therefore used for both alloy embodiments.

Microstructural Characterization

Additively manufactured samples of the Fe—Si alloys were characterized using a variety of techniques. For metallography, the samples were mounted and polished using standard procedures. Where applicable, etching was performed using a 5% Nital solution. The grain structure of etches samples was imaged using a Leica DM 750P optical microscope. Samples were also imaged using a JEOL 6500 F scanning electron microscope. The same SEM was also used for characterization of the grain structure by electron backscatter diffraction (EBSD). Additional characterization of the Fe-6Si alloy was performed by transmission electron microscopy (TEM) using an FEI Talos F200x microscope and neutron diffraction measurements performed at ORNL High Flux Isotope Reactor.

Magnetic Testing

Additively manufactured components can exhibit significant crystallographic textures with <001> type direction aligned along the build direction. Considering that the soft-magnetic behavior of Fe—Si is texture dependent, particular geometries were designed, along with a magnetic test rig capable of isolating a specific direction rather than use the standard ring geometry. The test fixture was designed to mimic the ASTM A773 sample size and key aspect ratios typically used for accurate magnetic property evaluation. Finite-element simulations were used to calibrate the effective magnetic path length of the test cell used to calculate the magnetic field intensity from the primary winding current measurements. The selected geometry was a 6.35 mm square cross-section, 63.5 mm in length. Four such cross-sections were manufacturing for a given example, the edges were beveled using electrical discharge machining, and assembled in a "picture frame." Using this approach, a single direction relative to the additive manufacturing build direction could be isolated within all four legs of the test frame.

Figure 11A:
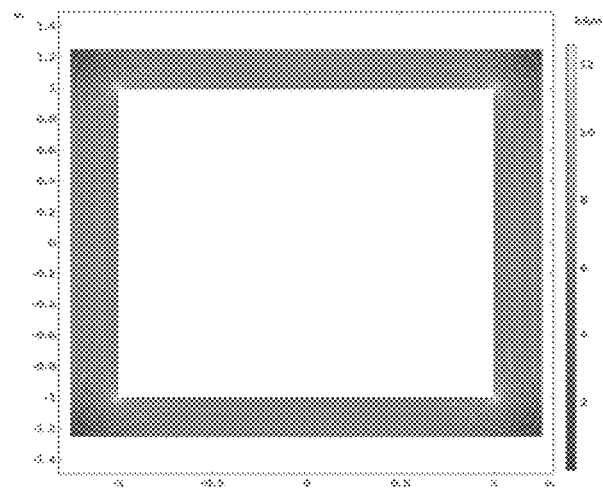
Figure 11B:
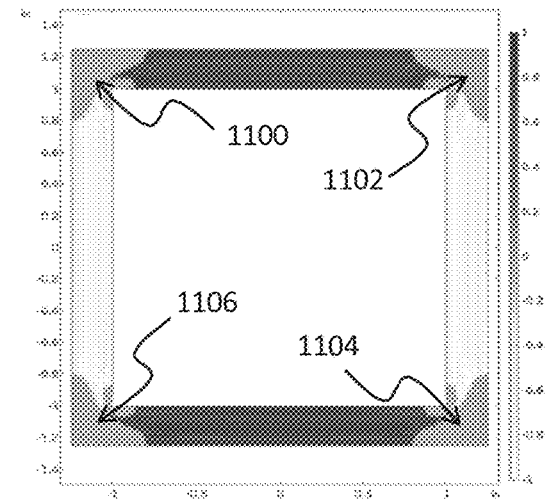
FIG. 11B shows four corner areas where the direction of flux deviates from the axis of the cell's legs by greater than 5%, and FIG. 11C show a photographic image of the constructed cell with a frame in place.
Figure 11C:
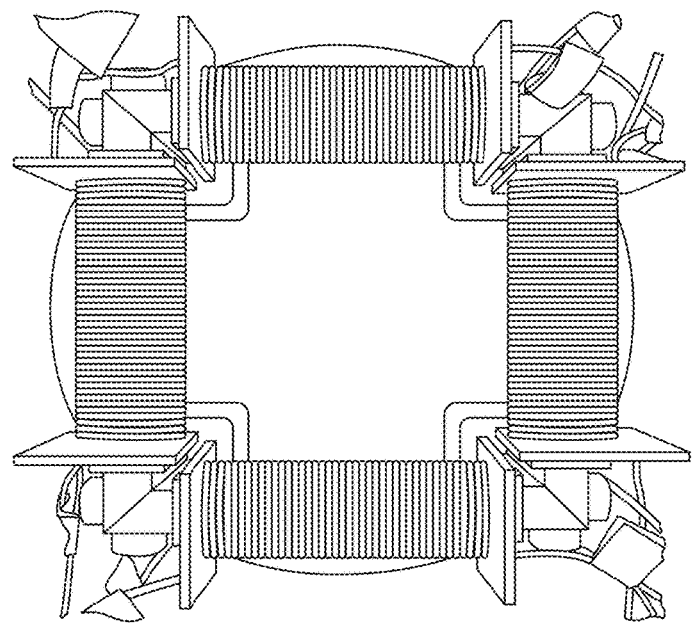

Given the test geometry, edge effects near the corners were anticipated. The current flow through the test setup was simulated as shown in FIG. 11A. Based on these results, FIG. 11B highlights the areas of the current (regions 1100, 1102, 1104, and 1106) where the flux direction deviates from the axis of the sample by greater than 5% from the nominal flux direction. From these results, the modular test rig shown in FIG. 11C was designed and built in which the coils only surround material where the flux is along the desired direction. A Brockhaus MPG200 system was used to automate measurement and data post-processing with good repeatability.

The power losses were decomposed the classical loss model. The behavior of the tested components was characterized by describing the total power losses using Equation 1:

$$P_{cycle} = c_{hyst}(B)f + c_{eddy}(B)f^2, \quad (1)$$

where $P_{cycle}$ is the total power loss per cycle, f is frequency, $c_{hyst}$ is a coefficient associated with hysteresis (materials) losses, and $c_{eddy}$ is a coefficient associated with eddy current losses. The inclusion of an anomalous loss term $c_{anom}(B)f^{3/2}$ in the model did not improve explanation of the measured data so it was ignored. Similarly, the energy loss per cycle, $E_{cycle}$ may be described using Equation 2:

$$E_{cycle} = c_{hyst}(B) + c_{eddy}(B)f \quad (2)$$

Figure 12A:
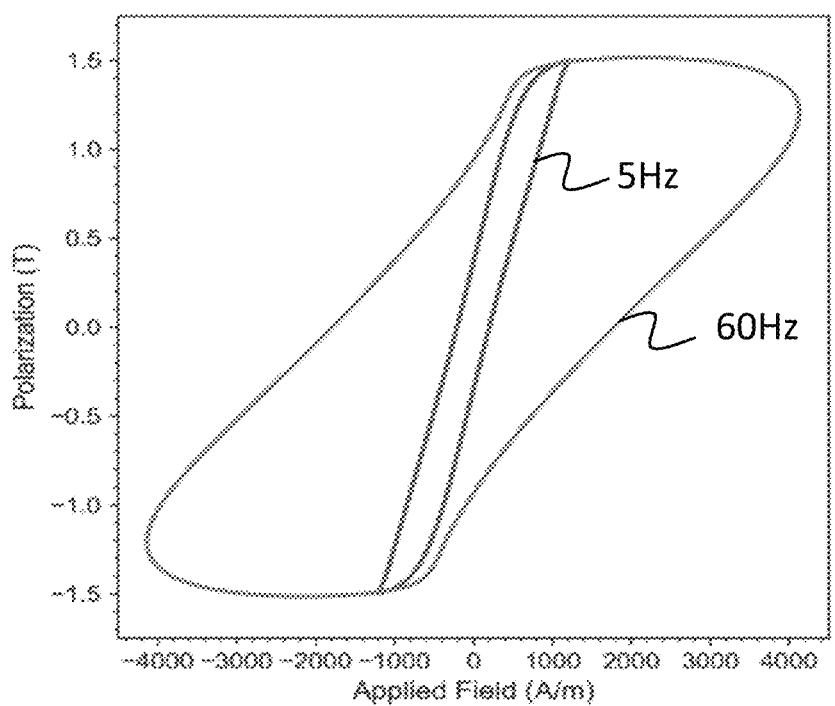
FIGS. 12A and 12B show results obtained from analyzing an additively manufactured structure for energy loss using $B_{max}$=1.5 T.
Figure 12B:
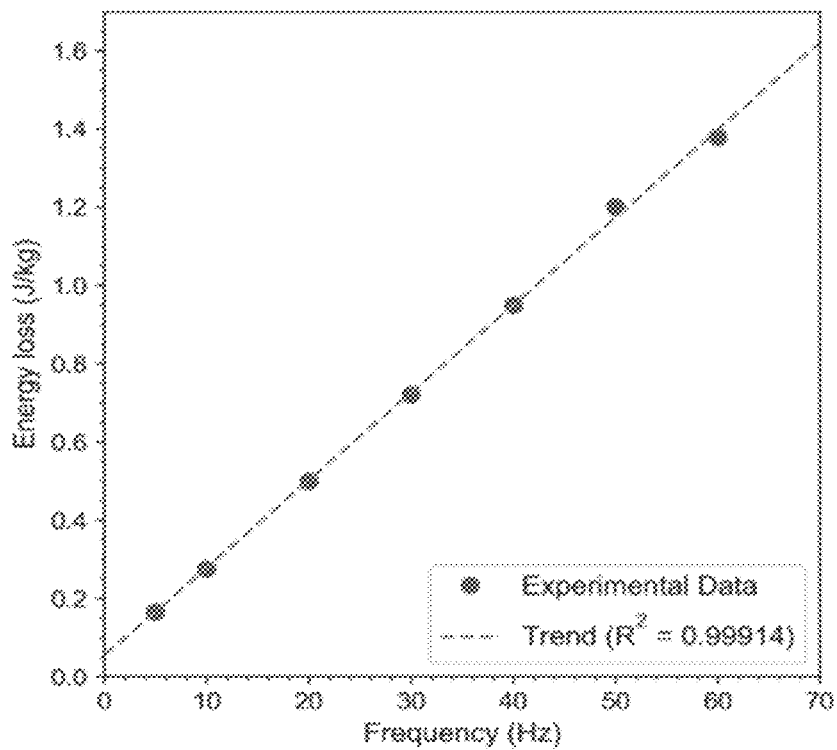

The total energy loss for a given cycle is equal to the integrated area of the hysteresis loop, as shown in FIG. 12A for an additively manufactured sample at two different frequencies. The loss coefficients are determined experimentally by measuring the total energy loss per cycle for a fixed flux density amplitude while varying the frequency from 10 Hz to 60 Hz in 10 Hz increments. A linear least-square fit was performed on this data using Equation 2. FIG. 12B shows the total energy loss as a function of frequency for the same sample. The loss behavior as a function of frequency clearly follows the linear trend described by Equation 2, demonstrating that this approach for decomposing the origins of the energy losses is reasonable for this material. Consequently, the coefficients $c_{hyst}$ and $c_{eddy}$ may be used as quantitative indicators of the material and eddy current losses under different conditions. In addition, the fraction of power losses associated with eddy current development, $f_{eddy}$, may be easily calculated:

$$F_{eddy} = \frac{c_{eddy}f}{c_{hyst} + c_{eddy}f} \quad (3)$$

Electromagnetic Modeling

The development of eddy-currents results in the skin effect, which concentrates the magnetic flux near the outer surface of the cross-section. The skin depth, δ, may be approximated as $$\delta = \sqrt{\frac{2\rho}{\omega\mu}} \quad (4)$$

where ρ is the electrical resistivity, ω angular frequency, and μ magnetic permeability. When the skin depth is small compared to the sample thickness, eddy-current losses are expected to be high.

A more detailed analysis of the eddy-current development can be performed by simulating the electromagnetic fields within a given geometry. When the frequencies of interest are low enough so that electromagnetic wave propagation can be ignored, the phenomena of electromagnetic eddy currents is captured by a subset of Maxwell's equations, $$\nabla \times \vec{H} = \vec{J}, \quad (5)$$

$$\nabla \cdot \vec{B} = 0, \quad (6)$$

$$\nabla \times \vec{E} = -\frac{\partial \vec{B}}{\partial t}, \quad (7)$$

where $\vec{H}$ is the magnetic field intensity, $\vec{B}$ the magnetic flux density, $\vec{E}$ the electric field intensity, and $\vec{J}$ the electric current density. Generally, $\vec{H}$ and $\vec{B}$ are related through the nonlinear material permeability tensor $\vec{\mu}$ (or, equivalently, a relative permeability tensor $\vec{\mu}_r$):

$$\vec{B} = \vec{\mu} \cdot \vec{H} = \mu_0 \vec{\mu}_r \cdot \vec{H}. \quad (8)$$

When the fields are constrained to a single direction, it is possible to define equivalent scalar permeability μ and scalar relatively permeability $\mu_r$ as $$\mu = \mu_0 \mu_r = \frac{|\vec{B}|}{|\vec{H}|}. \tag{9}$$

Assuming ohmic conduction, the current density and electric field intensity are related through the electrical conductivity σ:

$$\vec{J} = \vec{E}. \tag{10}$$

It is the electrical conduction model that links the varying flux density in Faraday's law to the magnetic fields in Ampere's law. Using some mathematical identities from vector calculus, equations 5-7 and the constitutive laws of 8 and 10 can be combined to describe low frequency eddy current dynamics, $$\nabla \times (\vec{\mu}^{-1} \cdot \nabla \times \vec{A}) = \sigma \cdot \left( \nabla \phi + \frac{\partial \vec{A}}{\partial t} \right) \tag{11}$$

$$\vec{B} = \nabla \times \vec{A} \tag{12}$$

$$\vec{E} = \nabla \phi + \frac{\partial \vec{A}}{\partial t} \tag{13}$$

where $\vec{A}$ is the magnetic vector potential and φ the electric scalar potential (voltage). These equations were solved numerically for various cross-sections using COMSOL Multiphysics. The models were driven by a current source assuming a cylindrical winding. Standard second order triangular elements were used for meshing the 2D problems, and second order tetrahedral elements for the 3D problem. Default meshing was used on the 'extra fine' setting.

Heat Transfer Process Modeling

To understand microstructure evolution during additive manufacturing, the heat transfer in the material in response to the moving heat source can be determined. In some examples, simplified semi-analytical models which make certain assumptions about the heat transfer effects are developed to greatly improve computational efficiency. In this example, a model specifically for use in helping to correlate process conditions to solidification structure evolution was used and is summarized below.

For linear heat conduction around a moving volumetric Gaussian energy source, the temperature T at time t for a given location was derived:

$$T - T_0 = \tag{14}$$

$$\frac{2\eta Q}{\rho c(\pi/3)^{3/2}} \int_0^t \frac{1}{\sqrt{\phi_x \phi_y \phi_z}} \times \exp\left( \frac{-3x(t')^2}{\phi_x} - \frac{3y(t')^2}{\phi_y} - \frac{3z(t')^2}{\phi_z} \right) dt'$$

where $$\phi_i = 12\alpha(t_2 - t') + \alpha_i^2, \text{ for } i=x,y,z, \tag{15}$$

$T_0$ represents the initial (or preheat) temperature, the power absorbed by the material is described by the product of Q, the beam power, and η, the absorption efficiency, and α=k/ρc the thermal diffusivity of the material. The volumetric heat source is described by widths $\sigma_x$, $\sigma_y$, and $\sigma_z$. The coordinates x=(x,y,z) are the relative distances between the point of interest $x_p$ and the transient position of the beam $x_b(t')$:

$$x(t') = x_p - x_b(t'). \tag{16}$$

The beam position is described using piece-wise time varying functions. Because the derived solution from relies on the linear superposition of stationary heat sources integrated over the heat source path, Equation 14 is suitable for any form of the relative coordinates describing the heat source path. In this example, the beam motion for path segment p is defined as having a constant velocity vector $v_p$, and any arbitrary number of segments may be connected to simulate complex paths with varying process conditions. With this approach for generally considering complex paths, Equation 14 cannot be easily integrated analytically, requiring selection of an appropriate numerical integration scheme.

The challenge of designing an appropriate integration scheme may be illustrated by considering a simple example of a quasi-static situation in which a heat source is moving at a constant velocity. Here, IN718 was used as an example material and a representative set of process conditions (Q=600 W, η=0.82 [51], $T_0$=1273 K). If a simple Riemann sum is used for integration, then the quality of the solution depends on the time step (Δt'). The solution for three integration step size is compared to the analytically exact solution for this situation from the Rosenthal equation. Integrations steps that are too large have the effect of discretizing the moving heat source position too coarsely, resulting in an unrealistic depiction of the process. Small step sizes result in the correct solution, but have a greater computational expense. In between, the solution is poor near the instantaneous location of the heat source, but becomes increasingly smoother at larger distances. This result suggests that an efficient and accurate integration scheme may be designed by using a fine integration step near the heat source (in time) and using progressively coarser integration parameters for increasing times.

An adaptive integration approach was designed by first nondimensionalizing Equation 14. A series of nondimensional parameters were introduced:

$$s = \frac{\alpha}{\sigma_{xy}^2} t, \ s' = \frac{\alpha}{\sigma_{xy}^2} t', \ X = \frac{x}{\sigma_{xy}}, \ Y = \frac{y}{\sigma_{xy}}, \ Z = \frac{z}{\sigma_{xy}}, \ \delta = \frac{\sigma_z}{\sigma_{xy}}, \tag{17}$$

Where s"=s−s' is also defined as a nondimensional conduction time. The nondimensional integral is then:

$$T(s) - T_0 = \frac{2\eta Q \sigma_{xy}^{1/2}}{k(\pi/3)^{3/2}} \int_0^s \frac{1}{(12s''+1)\sqrt{12s''+\delta}} \tag{18}$$

$$\exp\left( -\frac{3(X(s')^2 + Y(s')^2)}{12s''+1} - \frac{3Z(s')^2}{12s''+\delta} \right) ds''.$$

For simplicity, the integrand is represented as a function of the nondimensional conduction time:

$$f(s'') = \frac{1}{(12s''+1)\sqrt{12s''+\delta}} \exp\left( -\frac{3(X(s')^2 + Y(s')^2)}{12s''+1} - \frac{3Z(s')^2}{12s''+\delta} \right). \tag{19}$$

A Gaussian quadrature approach was used to numerically compute the integral in Equation 18. The quadrature scheme gives an exact solution for integrating polynomials of $2\Omega-1$ or less, where $\Omega$ is the quadrature order. Based on this feature of the quadrature technique, the required order of the Gaussian quadrature for a nondimensional time segment depends on the linearity of the underlying function. If a simple stationary heat source is considered, then it may be shown that the linearity of the integrand increases with increasing conduction time.

Although the nondimensional integrand is not a polynomial, the accuracy of the quadrature may be approximated by calculating the truncation error of approximating the integrand as a given polynomial order by using a Taylor series expansion, where the order of the expansion is implicitly linked to the quadrature order. Setting a limit on the truncation error therefore implicitly defines an appropriate order for the underlying quadrature technique. Applying this approach, it may be shown that the polynomial approximation error is bounded by a function of the form:

$$Err < \left(\frac{\Delta s''}{s''}\right)^{m+1} \frac{1}{72\sqrt{s''(m+1)}}. \tag{20}$$

This functional dependence suggests several important features of the accuracy of the integration. As the conduction time increases, the error decreases. Therefore, the order of integration may be decreased with increasing conduction time in the same proportion that the size of the integration segment may be simultaneously increased. For an integration segment n+1, the appropriate quadrature order is therefore $\Omega_{n+1}=\Omega_n/2$, and the integration segment size may then be calculated as:

$$\Delta s'' = 2^{\lfloor \log_2(s''+1) \rfloor}. \tag{21}$$

This integration scheme is effective for a stationary heat source, but must be modified for a moving heat source. A nondimensional heat source velocity is defined for this purpose:

$$V_p = \frac{\sigma_{xy} \bar{v}_p}{\alpha}. \tag{22}$$

The effect of the beam velocity may be divided into three possible conditions, namely V=0, V>0, and V→∞. For a finite velocity, thermal diffusion causes the heat around a specific discrete heat source (or integration node) to be more spread out. To obtain a smooth solution for the thermal field which is constructed from superposition of the discrete source contributions, it is necessary to identify a criterion for the overlap between neighboring integration nodes.

For the purpose of defining the overlap between discrete heat source locations, the source overlap parameter $\xi$ is defined, such that for two neighboring integration nodes, $f(s_n'', X_p)=\xi f(s_{n+1}'', X_p)$. A smooth solution may be obtained by setting an appropriate value for $\xi$ (closer to unity is a smoother solution) and solving for the appropriate distance between integration nodes for a given velocity. However, this problem is not analytically tractable for the general case, so instead, the extreme condition of an effectively infinite beam velocity is considered, that is, a case in which the thermal diffusion between heat source locations is negligible. Under this circumstance, the relationship between $\xi$ and the distance between heat sources is:

$$\Delta R = \sqrt{\frac{12s_n''+1}{3}\ln\xi}, \tag{23}$$

which recovers the anticipated square root dependence of conduction distance with conduction time.

The value of $\xi$ may now be selected such that the moving heat source solution is consistent with the stationary heat source. This analysis shows that $\xi=2^{3/2}$. The velocity dependent integration scheme is more easily implemented by writing the criteria for a smooth solution in terms of the allowable size of the integration segment:

$$\Delta s'' = \frac{\sqrt{(12s_n''+1)\ln\sqrt{2}}}{V}. \tag{24}$$

This form presents a problem in that it approaches a singularity for small velocities. The stationary heat source solution must therefore be used when it is less conservative, which is found to be when V<0.59.

Implementation of this scheme for a wide range of heat source velocities shows that a smooth solution is always obtained, and that the number of required integration nodes is carefully controlled to maintain a low computational cost under all conditions. This scheme was then demonstrated on a simple geometry (equilateral triangle), but of a sufficient size to be impossible to simulate using a conventional numerical approach. For an example using IN718, a simulation was completed in 32.9 min utilizing four parallel cores on an Intel Core i7-7820x CPU.

Additional advances in parallelization have further improved both the speed and scalability of the algorithm. A hybrid spatiotemporal multi-level OpenMP+MPI decomposition scheme was implemented. An initial time decomposition is performed via MPI to distribute the load between nodes. A second time decomposition within nodes is then performed using OpenMP, and a final, minimal spatial decomposition, again using OpenMP, is performed between groups of processors.

By utilizing this parallelization approach, the scalability of the code is dramatically improved by better utilizing computing resources, minimizing memory transfer, and a greater fraction of the code is executed in parallel.

Example 2

In this example, a series of samples comprising a Fe-3Si alloy were initially produced for preliminary characterization for both the magnetic properties and microstructural features. Samples were built as pillars with a square cross-section (6.35 mm) suitable for testing with the magnetic test cell previously described. The samples were removed from the build plate and mitered to construct the "picture-frame" test geometries using wire electrical discharge machining. In some examples, fracturing of the samples made with a Fe-6Si alloy embodiment was prevented by turning on the build heater and pre-heating the substrate to approximately 170° C. By heating the build plate, the effective thermal gradients that could lead to thermal stresses due to variations in thermal expansion were reduced enough to avoid fracturing during processing.

Figure 13A:
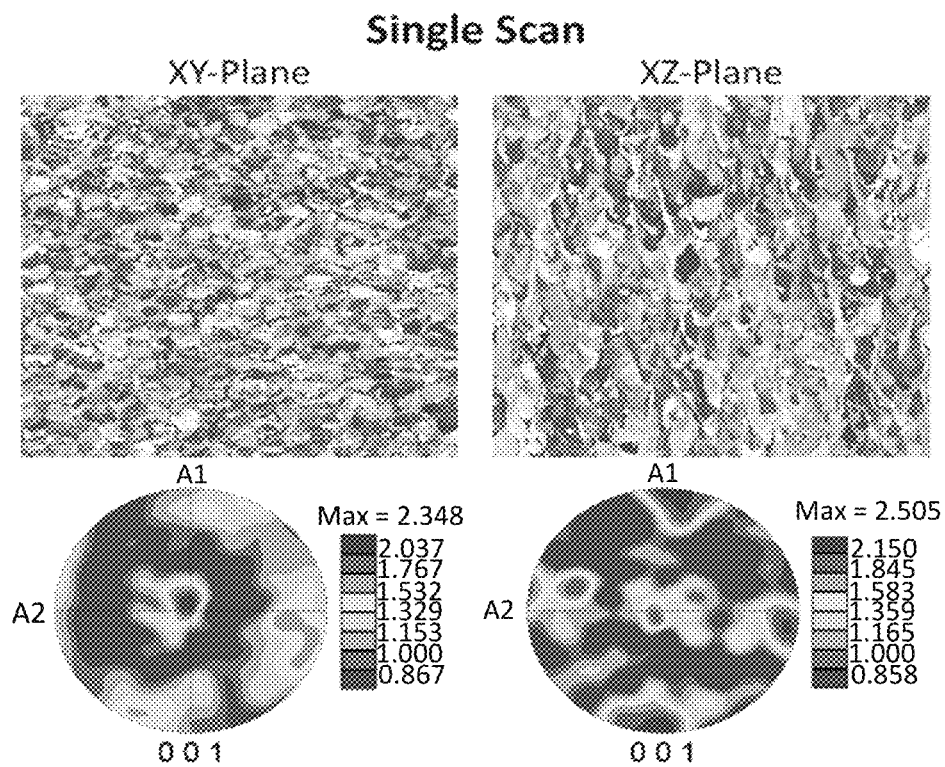
FIGS. 13A and 13B are electron backscatter diffraction (EBSD) images comparing the microstructure resulting from a single scan protocol for an Fe-3Si alloy embodiment (FIG. 13A) and using a double scan protocol for an Fe-3Si alloy embodiment (FIG. 13B).
Figure 13B:
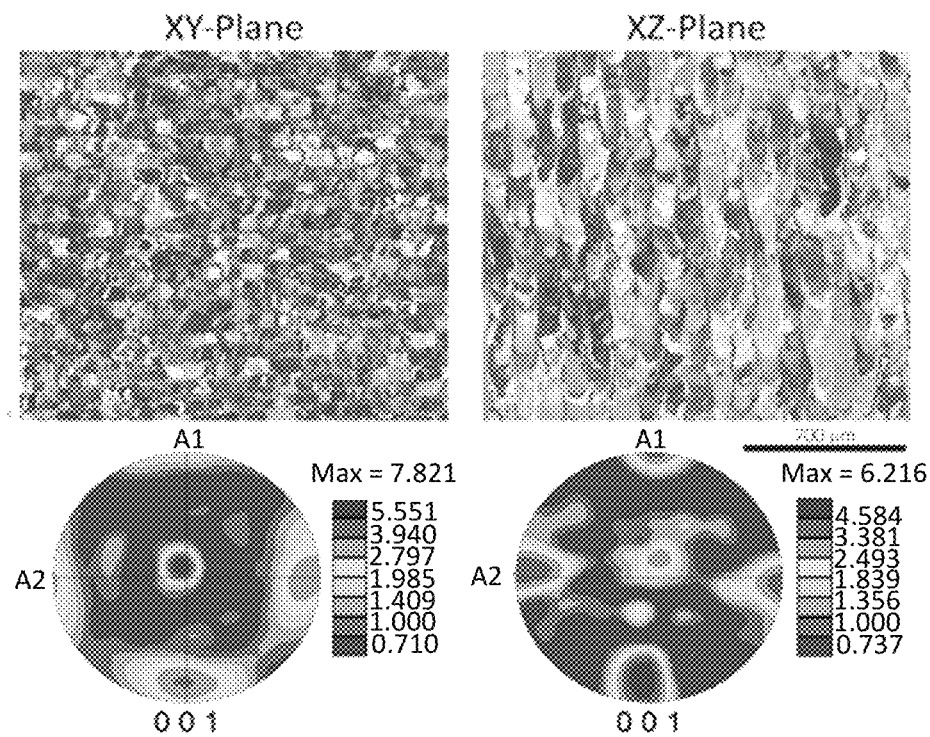

Several different scan patterns were evaluated during these initial builds. A particular comparison of interest in some examples was the variation in microstructure, such as that shown in FIGS. 13A and 13B. The first scan pattern is a conventional single scan (FIG. 13A), in which the nominal process parameters were used, and the scan pattern was rotated by 67° between each layer. In the double scan pattern (FIG. 13B), the same approach as the single scan was used first for each layer, but before proceeding to the subsequent layer, a second scan was performed, in which no scan rotation was applied. The first scan in this case acts to increase the effective preheat of the second scan, which is in turn, results in deeper melt pools. The lack of scan rotation also tends to align the dendrite growth direction during solidification across multiple layers, such that fewer grains have an opportunity to nucleate. The result of this change in scan strategy is a dramatic difference in the grain morphology and strength of the crystallographic texture. As shown in FIGS. 13A and 13B, in some embodiments, the single scan (FIG. 13A) results in a relative weak <001> type fiber texture aligned with the build direction, where the maximum multiple of random is roughly 2.5. When utilizing the double scan (FIG. 13B) without scan rotations, the pole figures exhibits a cube texture, with a much stronger multiples of random of between 6.2 and 7.8. These changes in the grain structure can have an impact on the magnetic properties due to the anisotropy of the magnetization in certain iron-based alloys, particularly Fe—Si alloy embodiments.

Figure 14A:
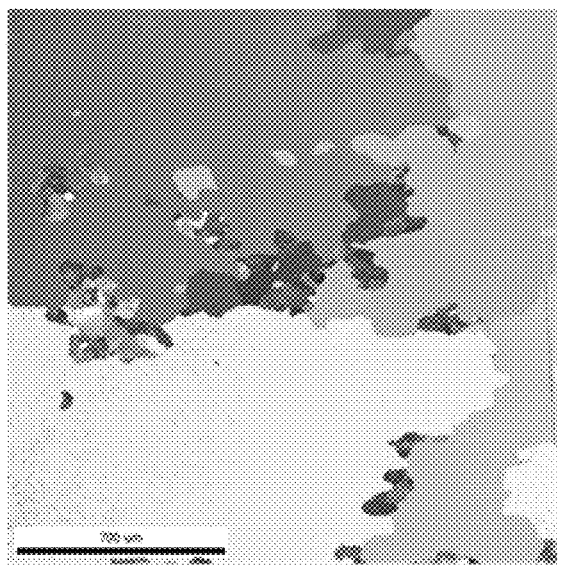
FIGS. 14A and 14B are EBSD images showing the grain structure of bulk Fe-3Si samples following a hot isostatic pressing (HIP) treatment using a single scan protocol (FIG. 14A) and a double scan protocol (FIG. 14B).
Figure 14B:
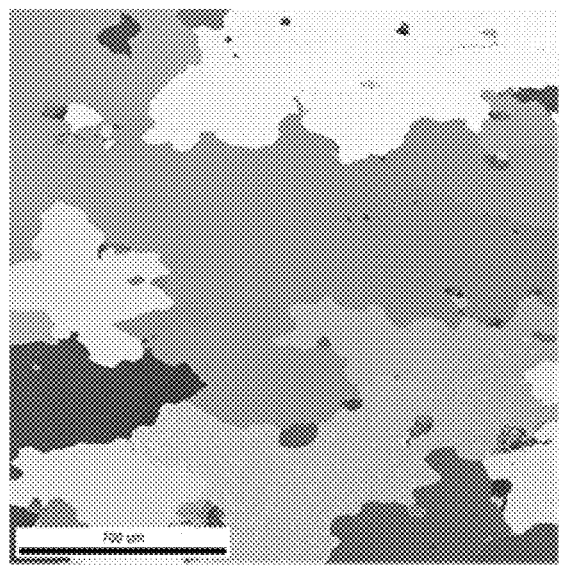

Samples were also subjected to a hot isostatic pressing (HIP) treatment to consolidate residual porosity and to allow grain growth to occur, which may reduce hysteresis losses. The HIP cycle used was 1150° C. for 2 hours at a pressure of 200 MPa. Representative samples of the grain structures are shown in FIGS. 14A and 14B for both the single and double scan of Fe-3Si, respectively. Bimodal distribution of grains was observed, with mostly large grains, but occasional populations of small residual grains. This distribution of grain size is consistent with abnormal grain growth which is commonly observed during annealing of conventional electrical steel sheet metal. Also, the corrugated shape to the grain boundaries indicates the potential presence of nanoscale inclusions, such as oxides and carbides, which could have the effect of locally pinning grain boundary mobility.

Figure 15A:
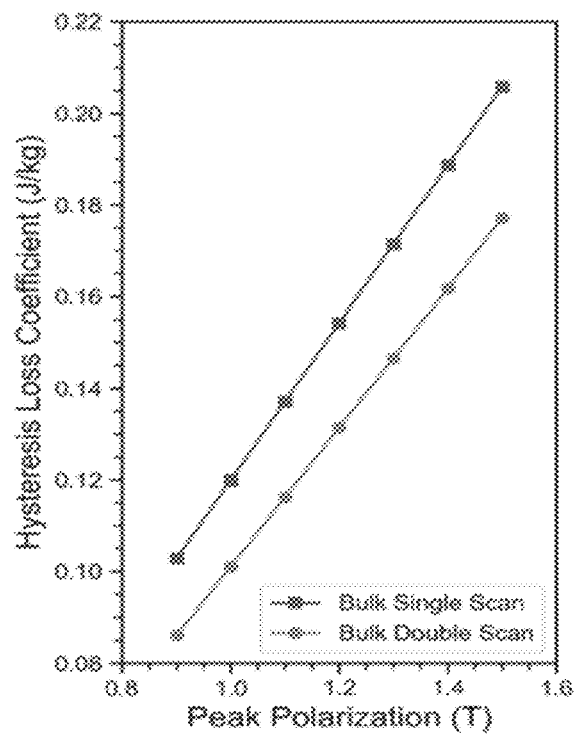
FIGS. 15A-15C are graphs showing the results of magnetic characterization of two Fe-3Si bulk cross-sections with different scan patterns showing (i) the hysteresis loss coefficients as a function of peak polarization (FIG. 15A); (ii) eddy current loss coefficients as a function of peak polarization (FIG. 15B), and (iii) the fraction of the total losses accounted for by the eddy current development as a function of peak polarization for an operating frequency of 60 Hz (FIG. 15C).
Figure 15B:
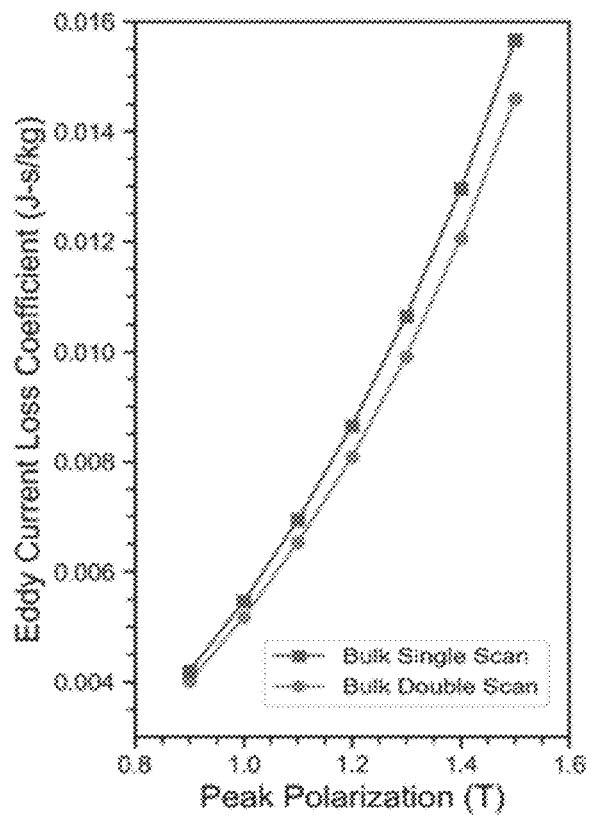
Figure 15C:
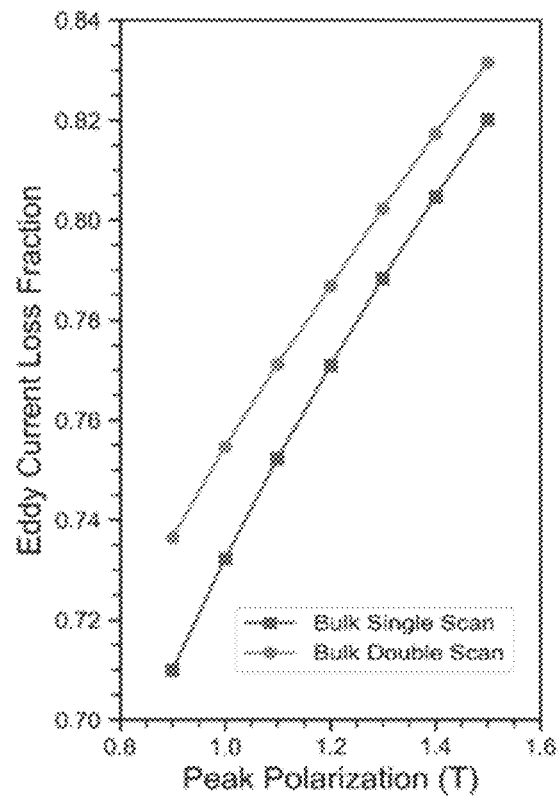

The samples shown in FIGS. 14A and 14B were tested for the AC magnetic performance. These results are summarized in FIGS. 15A-15C. The hysteresis loss coefficient is shown in FIG. 15A and demonstrates that the variation in crystallographic texture has a measurable impact on the intrinsic material properties, such that the increased alignment of the <001> easy magnetization directions with the build direction, and therefore with the magnetic flux in the test cell, reduces the overall power losses. However, the eddy current loss coefficients, which are dominated by geometric effects, are largely the same for both samples (FIG. 15B). In some examples, the relative contribution of hysteresis and eddy current losses was not evenly distributed and the eddy currents accounted for a significant fraction of the total power losses. As shown in FIG. 15C, in both cases, the eddy current loss accounts for greater than 70% of total losses at 60 Hz across all polarization conditions. Therefore, it was determined that in some samples, the geometric effects of eddy current formation can dominate the overall device performance for AC applications regardless of the quality of the material microstructure or the alignment of the grain structure with the magnetic flux direction.

Figure 16A:
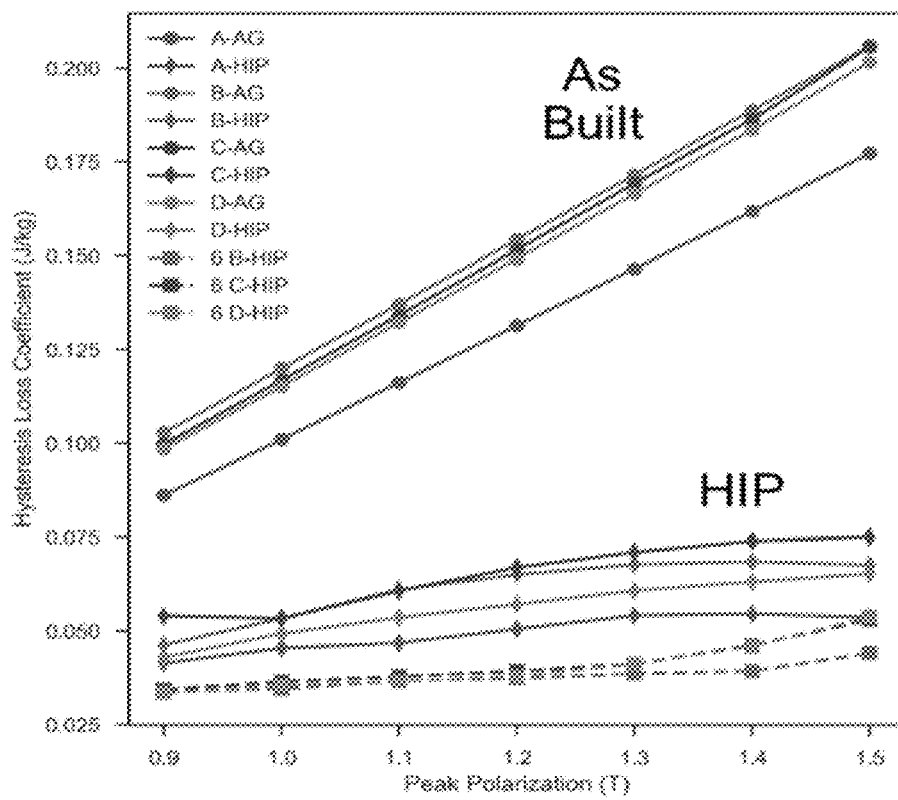
FIGS. 16A and 16B are graphs showing magnetic results before and after HIP annealing heat treatments, wherein Fe-3Si embodiments are shown in solid lines while Fe-6Si embodiments are shown in dotted lines.
Figure 16B:
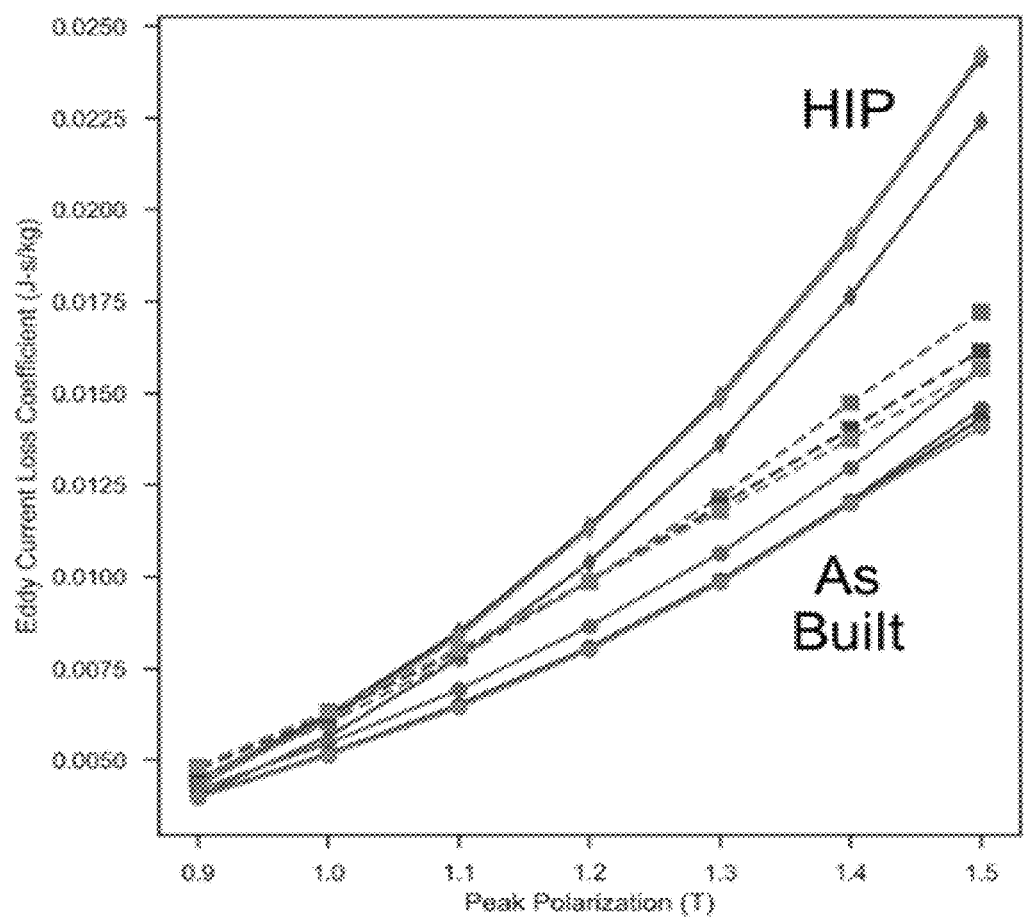

The Fe-3Si as-fabricated bulk samples with various scan patterns were also compared to HIP'd samples, as well as against HIP'd Fe-6Si. The build heater was used during the fabrication of the bulk Fe-6Si samples, and to avoid fracture due to the redistribution of residual stresses during machining, the Fe-6Si samples were subjected to the HIP treatment before being removed from the build plate, meaning that as-fabricated magnetic data is not available for this alloy. In FIG. 16A, the HIP treatment on the Fe-3Si has the effect of dramatically reducing the hysteresis loss coefficient. Without being limited to a single theory, it currently is believed this may result from the dramatic grain growth observed during annealing, but also potentially due to the reducing in residual stress. The HIP'd Fe-6Si also exhibits a lower hysteresis loss than the Fe-3Si. In some examples, the HIP's Fe-3Si exhibited an increase in eddy current losses caused by the worsening of the skin effect due to increased magnetic permeability. In some samples, the eddy current loss coefficients of the Fe-6Si samples were better than that of the Fe-3Si owing to the increased electrical resistivity (FIG. 16B).

Example 3

Based on the results of the magnetic testing for simple bulk geometries of Example 2, it was determined that the geometric effects of eddy current formation should considered to effectively additively manufacture soft-magnetic devices for AC applications. In this example, thin wall structures were evaluated to determine whether eddy currents could be confined.

When additively manufacturing high aspect ratio thin walls, the relationship between the scan strategy and the sample geometry should be considered. When a conventional raster pattern is used, the beam may scan transverse or longitudinal to the wall, or through any number of variations in angle between. To begin investigating the effect of these variations on the microstructure, three extreme scan patterns were evaluated: (1) always transverse to the wall, (2) always longitudinal, or (3) a 67° rotation between layers (these are summarized in FIG. 17, wherein the left-most image show the transverse direction, the middle image shows the longitudinal direction, and the right-most image shows the rotated direction between layers).

Figure 17:
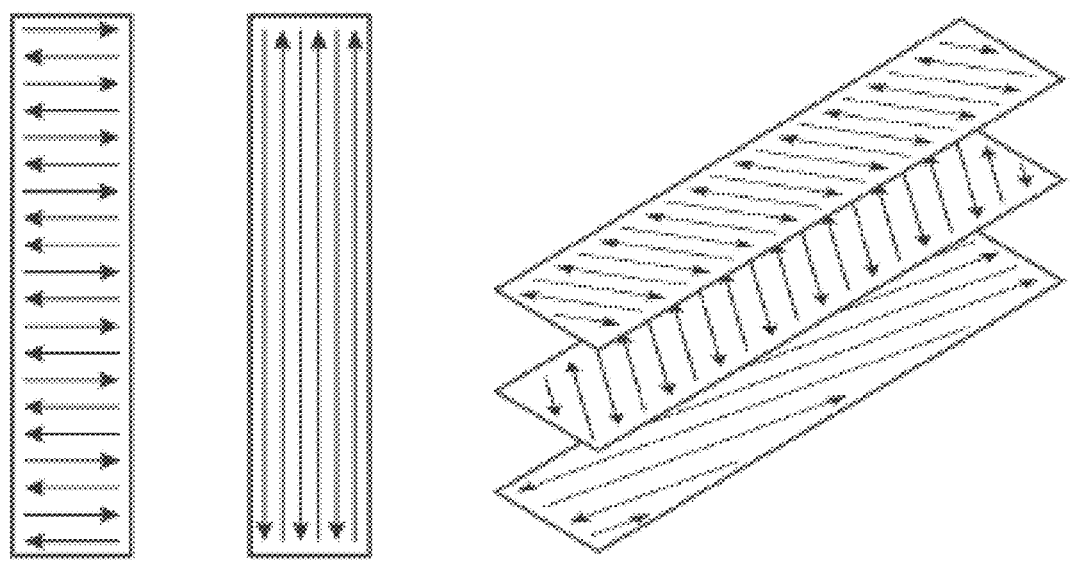
FIG. 17 illustrates representative scan patterns used to additively manufacture certain objects comprising a continuous thin wall made of an Fe—Si alloy.
Figure 18A:
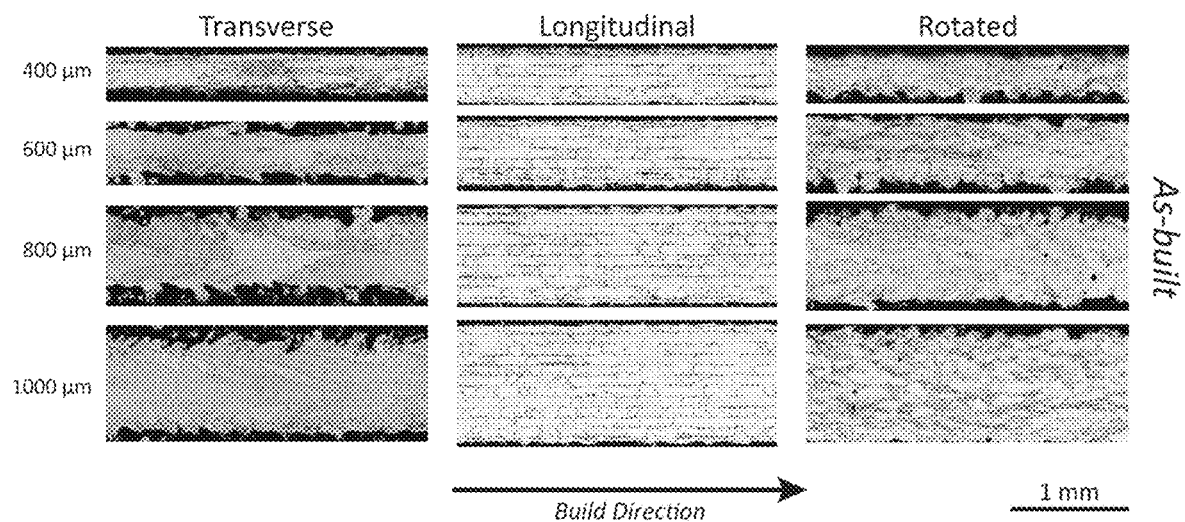
FIGS. 18A and 18B are optical microscopic images of etched thin wall embodiments comprising Fe-3Si before heat treatment (FIG. 18A) and after heat treatment (FIG. 18B), wherein the thin wall embodiments were fabricated using additively manufacturing with a transverse, longitudinal, or rotated scan pattern.
Figure 18B:
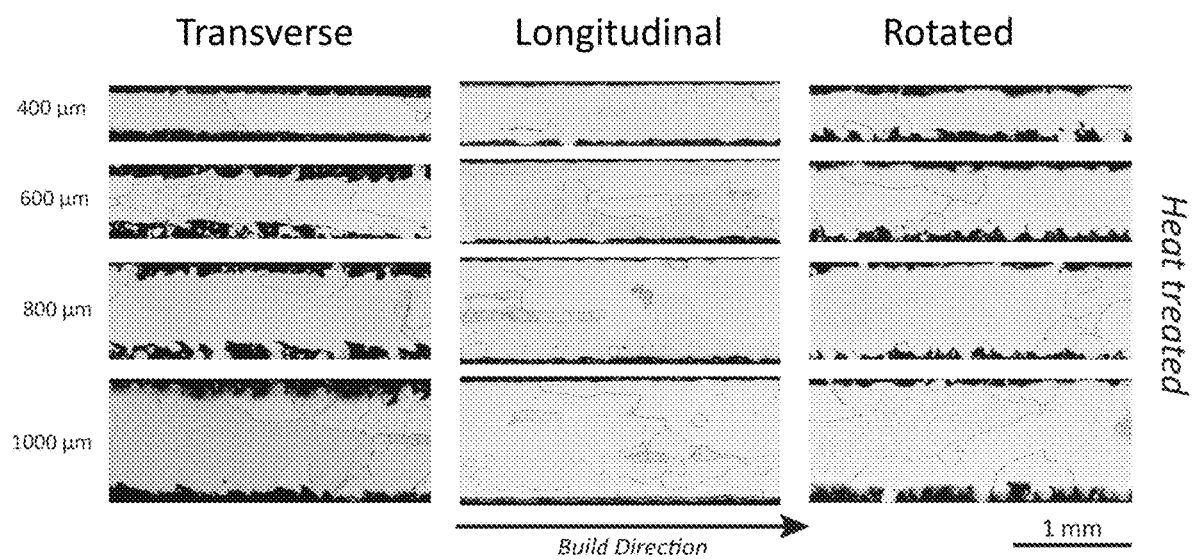
Figure 19:
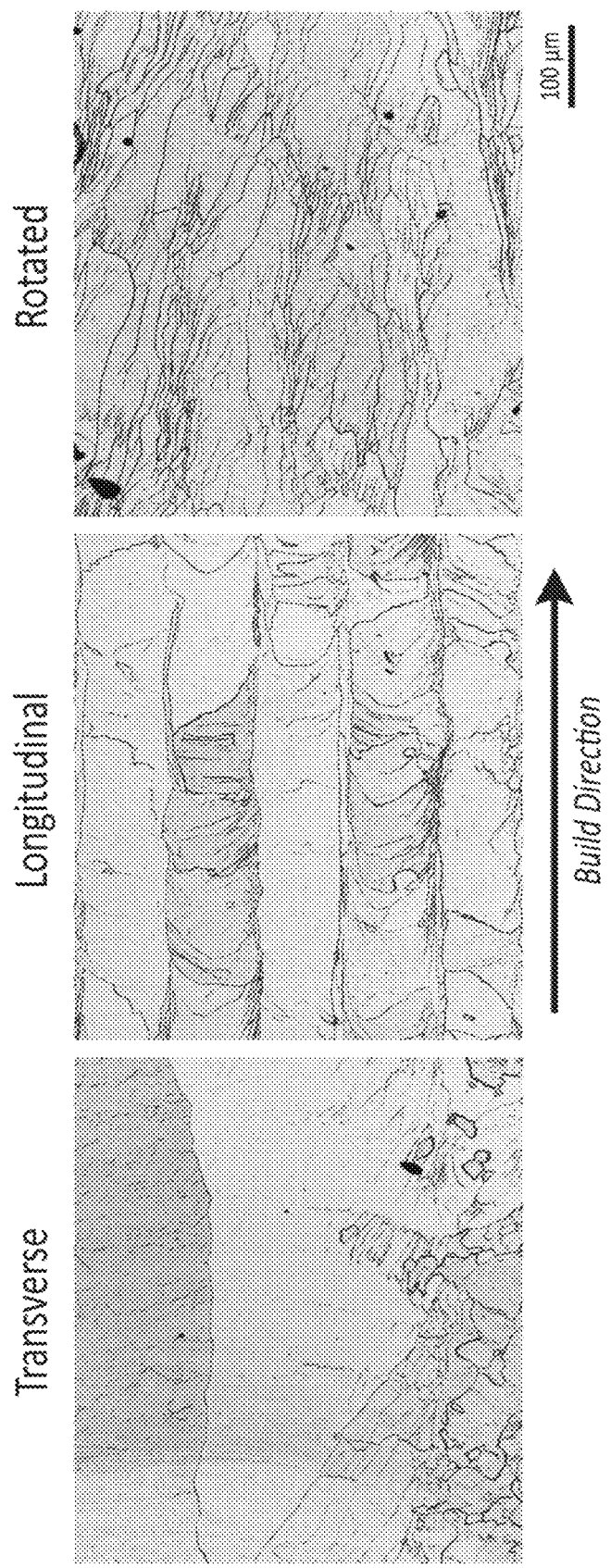
FIG. 19 shows optical microscopic images showing the as-fabricated grain structure of a thin wall comprising Fe-3Si additively manufactured using a transverse, longitudinal, and rotated scan pattern.

Thin walls of the Fe-3Si alloy were fabricated for each of the scan patterns shown in FIG. 17 and characterized for their grain structure in both the as-fabricated and HIP conditions. A summary of these grain structures is shown in optical microscopy of etched samples in FIGS. 18A (as-built) and 18B (after heat treatment). Higher magnification of the as-fabricated structures also is shown in FIG. 19. The transverse scan pattern shown large grains that tend to grow inwards from the sample edges and along the build direction. The longitudinal scan pattern shown grains that are confined to the hatch spacing and tend to be smaller, growing in the build direction. The rotated scan pattern has a more mixed structure, with smaller grain and lower aspect ratios. Following heat treatment, all samples exhibit a much larger grain size, with grains large enough to cover the full thickness of the thin walls (FIG. 18B). The higher magnification of the as-fabrication structure (FIG. 19) shows that the change in scan pattern influences the fundamental characteristics of the grain structure in response to process conditions.

Figure 20:
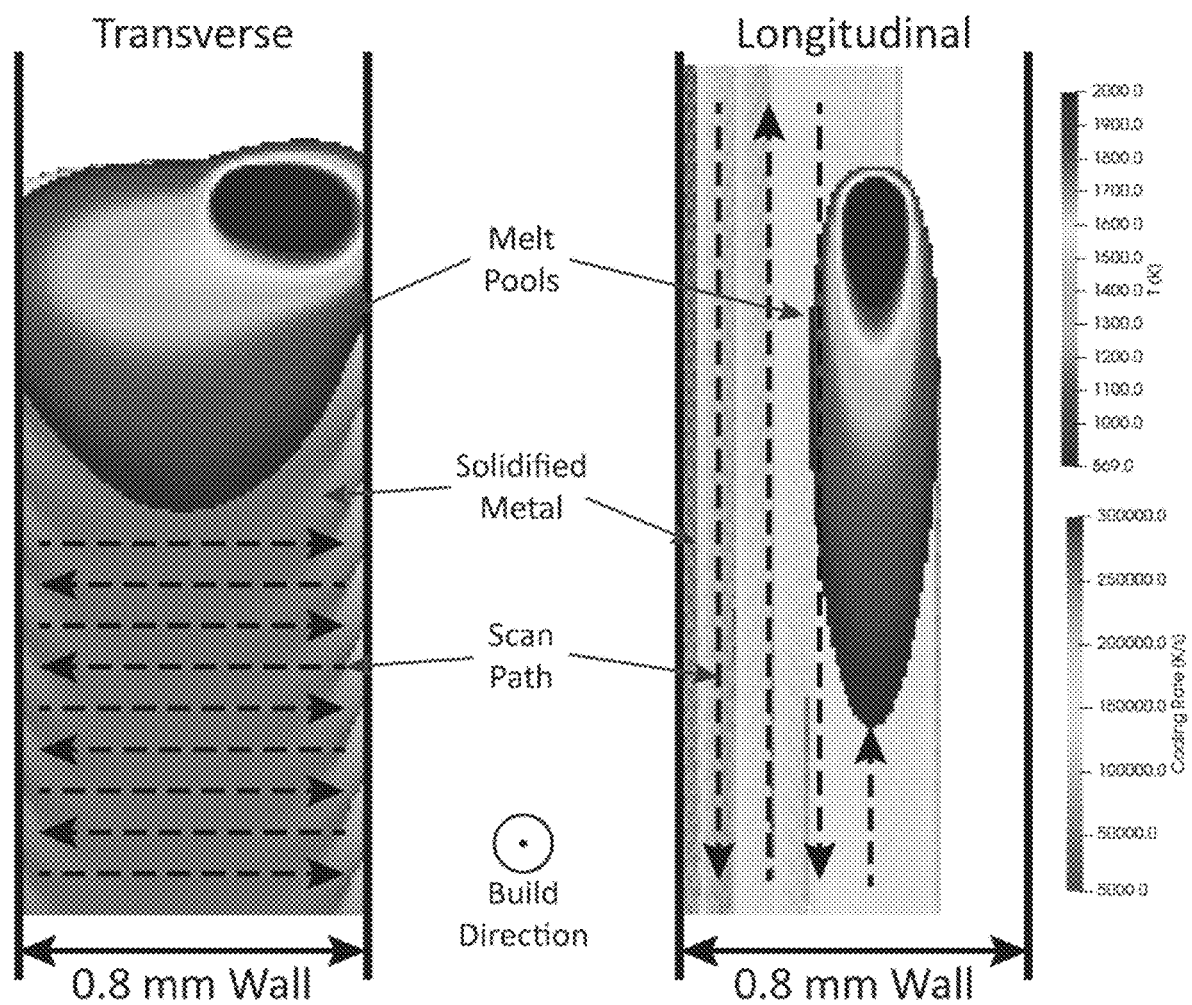
FIG. 20 is an image showing the melt pool shape and resulting cooling rate predicted by a thermal process model for transverse and longitudinal scan patterns.

To help understand the difference in grain structure as a function of scan pattern, the thermal process model was applied to the extreme transverse and longitudinal scan patterns (FIG. 20). The model results show that the variation in scan pattern has a dramatic effect on the melt pool shape and the resulting solidification cooling rate. The longitudinal scan pattern has an elongated tear-drop shaped melt pool that is similar to the quasi-static conditions modeled by the classic Rosenthal solution; however, the transverse scan pattern results in melt pool that overlap between neighbor scan vectors, which are extremely short due to the confinement of the thin wall. Due to the change in melt pool shape, the solid-liquid interface velocity and cooling rate are dramatically lower in the transverse case than in the longitudinal. Based on solidification theory, this change in conditions has a dramatic effect on the grain structure, where lower cooling rates tend to promote larger grains.

Figure 21A:
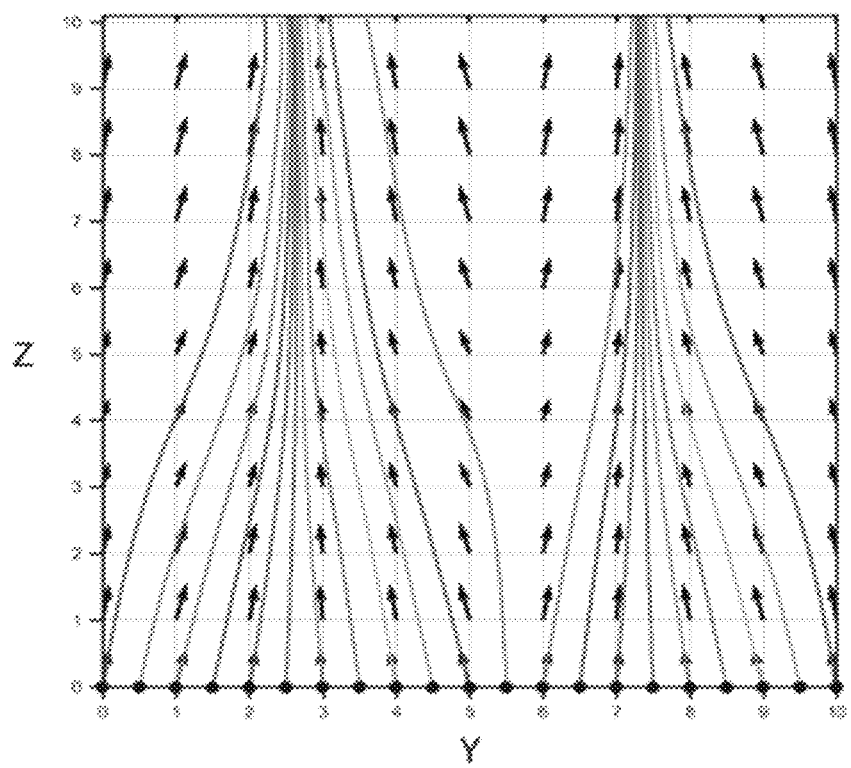
Figure 21B:
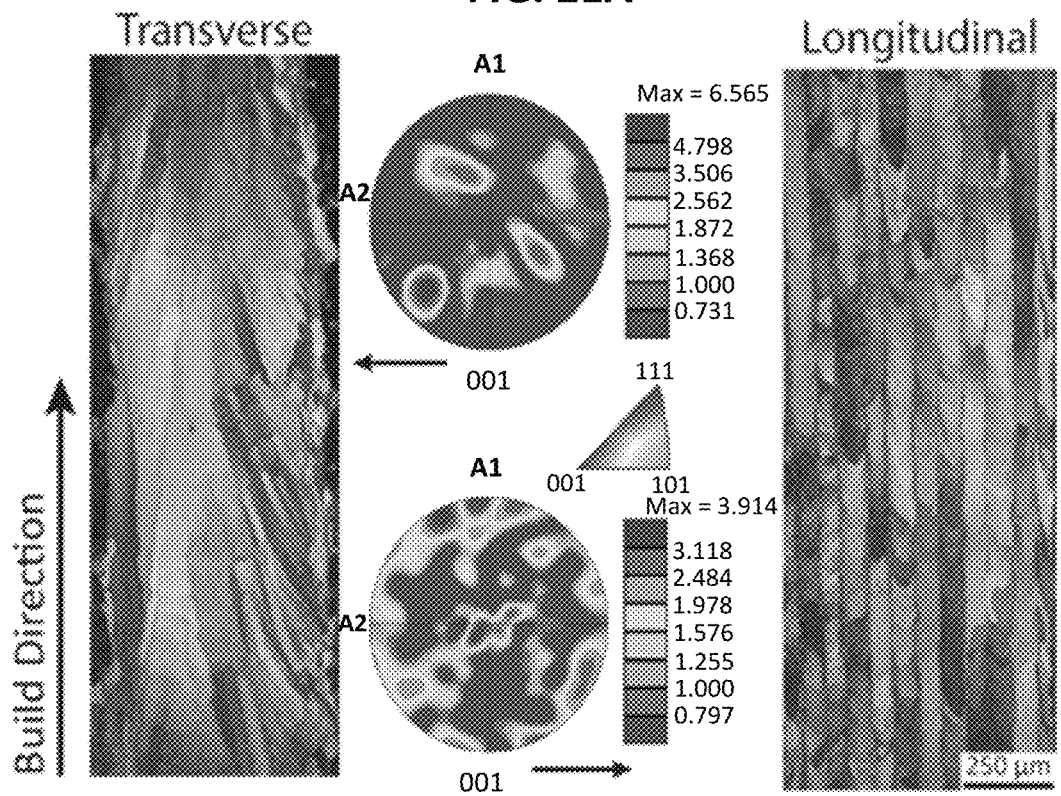
Figure 21C:
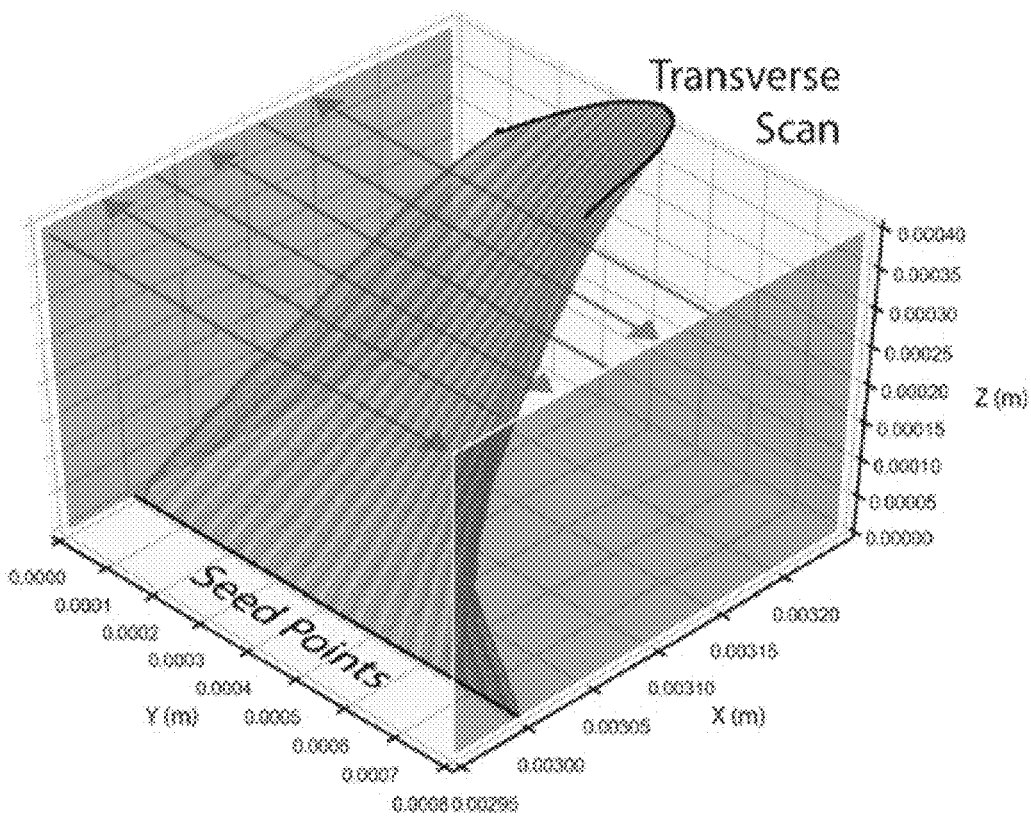
Figure 21D:
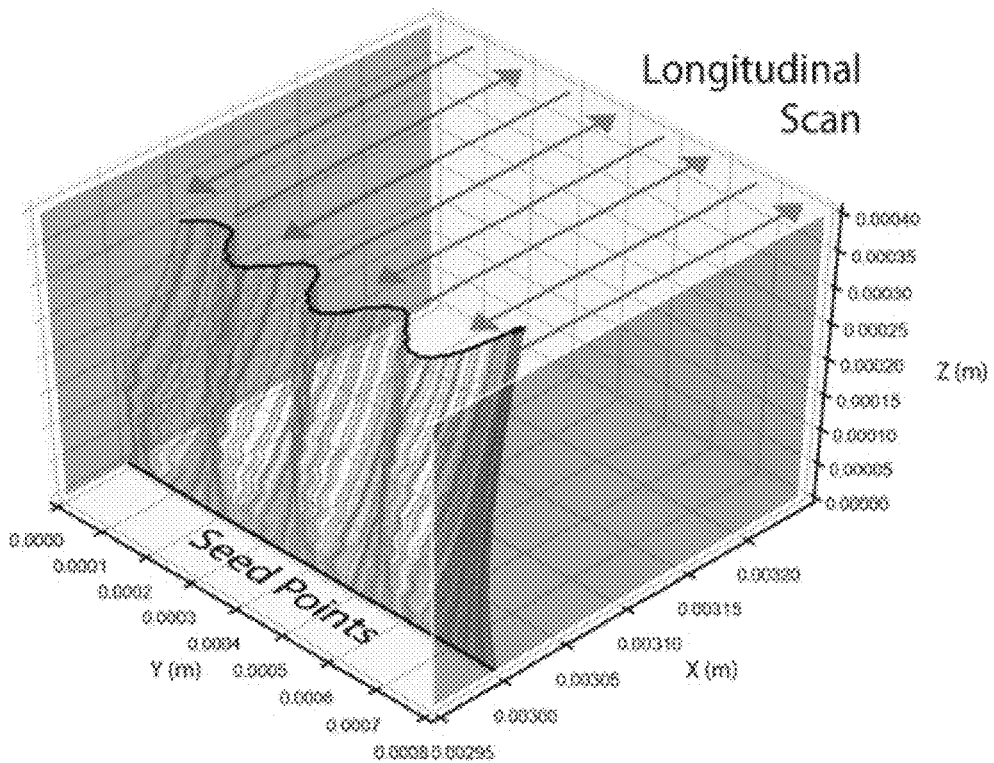

A more detailed analysis of the model results can be performed if the solidification conditions across multiple layers are considered. The dendrite growth direction for cubic crystals (such as the BCC structure of Fe—Si) is generally confined to the <001> type crystallographic directions being along the resultant thermal gradient vector. By recording the thermal gradient directions across multiple layers and constructing streamlines through the resulting vector field, the thermal field may be linked to the observed grain structure (see FIGS. 21A and 21B). For the longitudinal scan pattern, the resulting streamlines are generally vertical and confined to the raster path with a spacing equal to the hatch spacing (FIG. 21D). The streamlines for the transverse scan pattern (FIG. 21C) however, are much smoother, curving inward from the outer boundaries. The decreased curvature of the transverse pattern correlates to the greater strength of the crystallographic texture through a reduction in the propensity for grain nucleation. The inclination of the streamlines away from the build direction also correlates to the tilt in the <001> pole figure away from center.

Example 4

Figure 22:
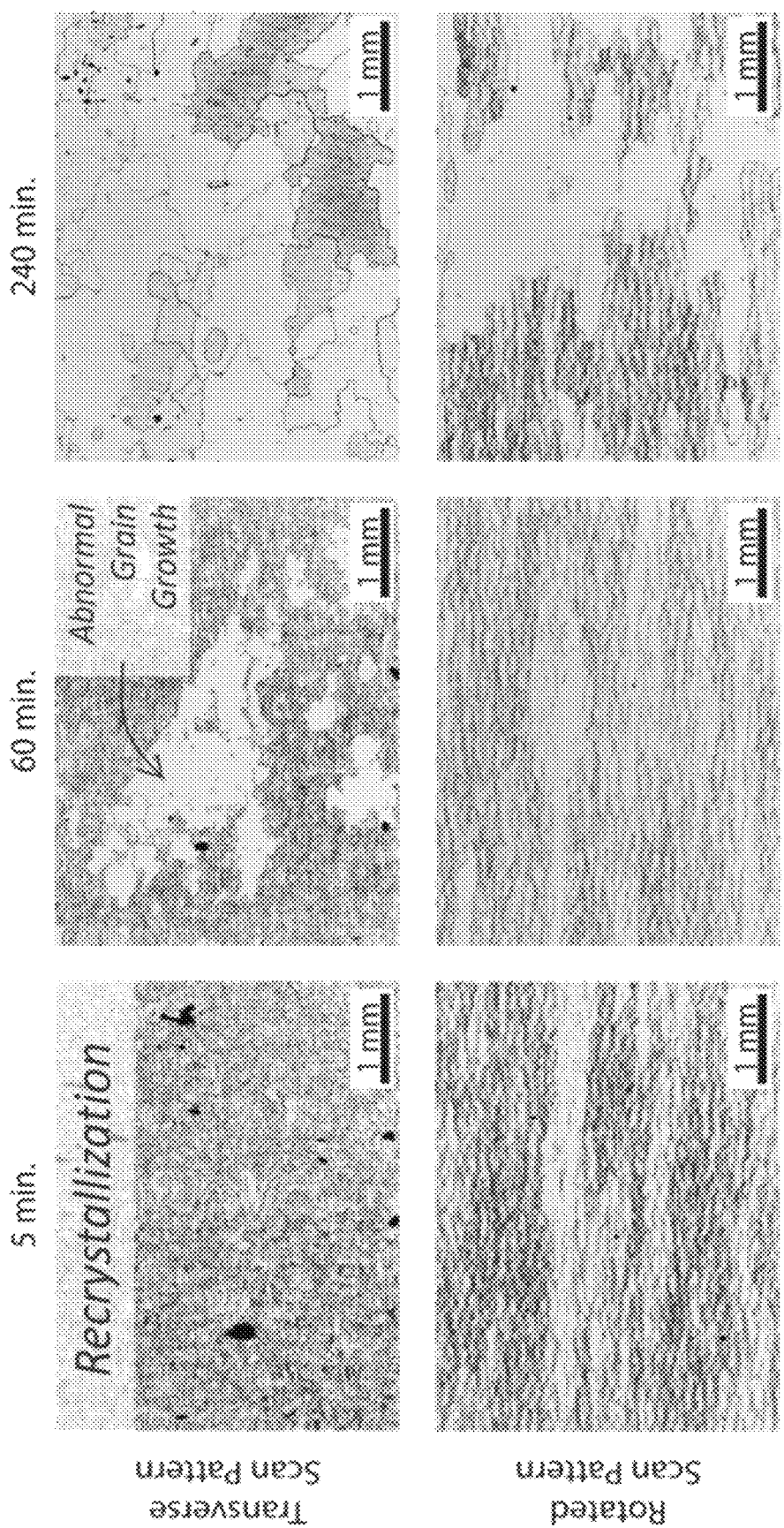
FIG. 22 shows the grain structure of thin walls comprising Fe-3Si following heat treatment at 1000° C. for various times (5 minutes=left column; 60 minutes=middle column; and 240 minutes=right column) and as a function of scan pattern (transverse=top row; and rotated=bottom row).

The grain structure of the thin walls following heat treatment were also investigated as a function scan pattern. An example of the resulting grain structures is shown in FIG. 22 for the transverse (top row) and rotated scan patterns (bottom row), compared for various heat treatment times at 1000° C. It was observed that the grain structure tended to partially or completely recrystallize in the early stages of heat treatment, and that following recrystallization, abnormal grain growth clearly takes place. Interestingly, the recrystallization and abnormal grain growth kinetics are not identical for both scan patterns. The transverse scan pattern resulted in a grain structure that appeared to be completely transformed following 240 minutes at 1000° C. while the rotated scan pattern still contains a clearly bimodal grain size distributions, suggesting that the abnormal grain growth is less pronounced, or that the kinetics of grain growth are significantly slower. These results suggest first that the activation of abnormal grain growth mechanisms may be an avenue for achieving highly texture additively manufactured electrical steels. Second, the grain growth characteristics are clearly a function of the scan pattern; therefore, it may be possible to tune the annealed grain structure through the manipulation of process conditions.

Example 5

In this example, Fe-6Si thin walls were fabricated for further characterization. Transmission electron microscopy was first used to identify nano-scale microstructure constituents. Using a combination of imaging and energy dispersive spectroscopy (EDS), it was found that small carbide particles and aluminum oxide particles were present in the microstructure of some samples. These particles can impact the magnetic properties by reducing magnetic permeability and/or increasing the time and/or temperature needed to achieve a fully annealed state. In particular embodiments, these particles are not present, or their amounts are minimized so as to reduce these effects.

Figure 23A:
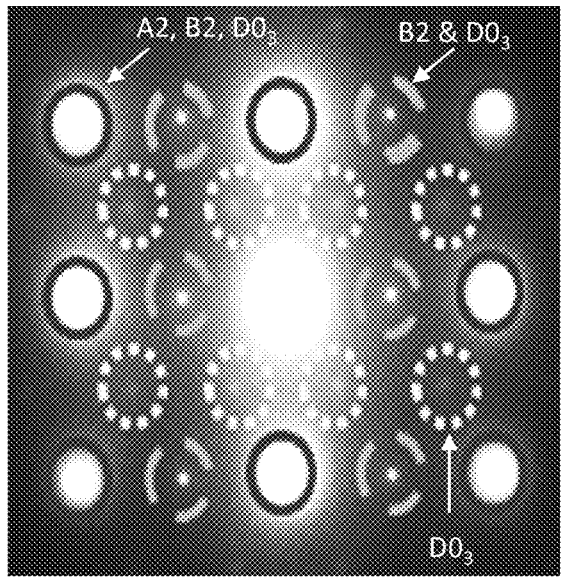
FIGS. 23A and 23B are electron diffraction images obtained from analyzing thin wall embodiments comprising an Fe-6Si alloy using transmission electron microscopy (TEM), which show superlattice spots associated with B2- and D0$_3$-type atomic ordering with a preheat treatment (FIG. 23A) and without a preheat treatment (FIG. 23B).
Figure 23B:
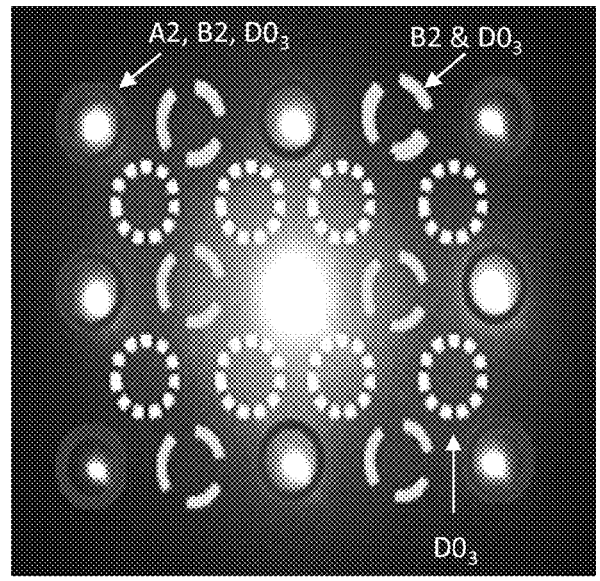
Figure 24A:
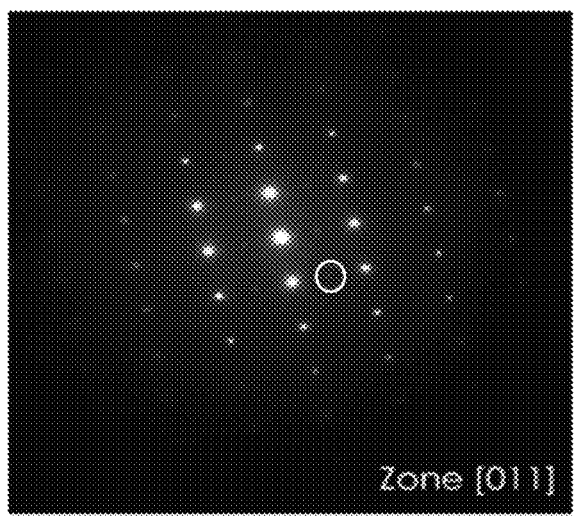
FIGS. 24A and 24B are images of a [−1 −1 1] superlattice reflection.
Figure 24B:

The brittle nature of the Fe-6Si alloy may be due to atomic ordering of the disordered A2 structure, into ordered B2 and/or $DO_3$ crystal structure, during cooling. The high cooling rates of metal additive manufacturing may be sufficient to kinetically suppress the order phase transformation. A series of Fe-6Si thin walls under different conditions and with varying thicknesses were made in an attempt to identify the ordering behavior using different advanced characterization techniques. First, thin walls were produced with and without the build heat activated, the rationale being that turning off the heater would tend to increase cooling rates, and potentially suppress the ordering phase transformations. The results of selected area electron diffraction for these cases is shown in FIGS. 23A and 23B, where superlattice reflections associated with the ordered crystal structures is visible for the preheated thin wall but absent for the wall built without preheat. It is possible that in this case, the ordering transformations were partially or completely suppressed by the rapid cooling during fabrication. For the case where ordering is apparent, it is possible to image the ordered domains directly by using dark field imaging over one of the superlattice reflections as shown in FIGS. 24A and 24B.

Figure 25:
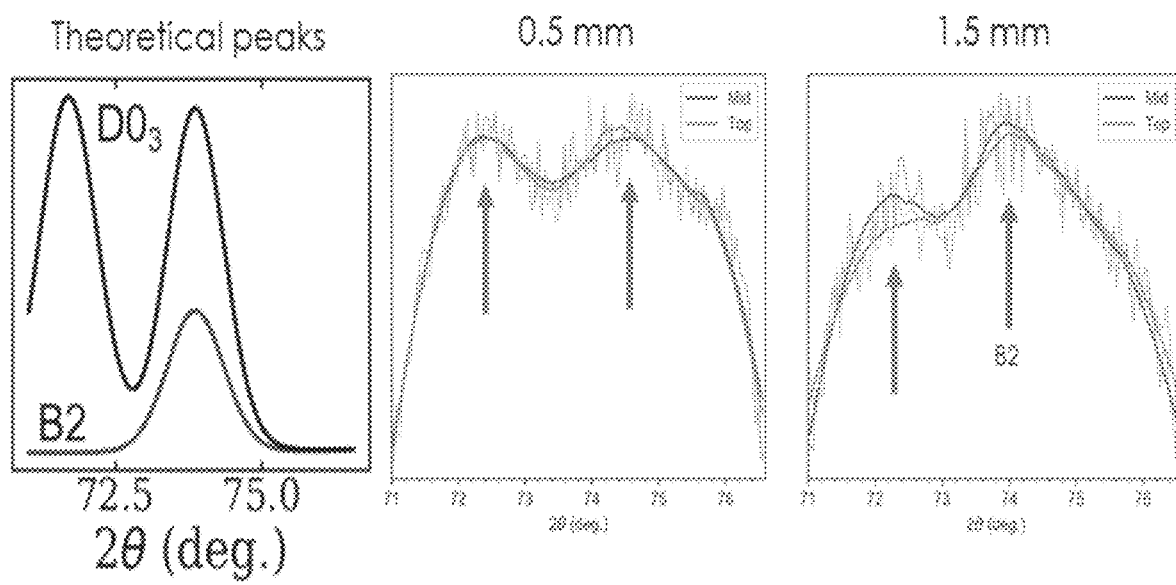
FIG. 25 includes graphs showing neutron diffraction results for Fe-6Si thin wall embodiments for two different wall thicknesses (0.5 mm=middle graph; 1.5 mm=rightmost graph) compared to the theoretical peaks expected from the ordered crystal structures (left-most graph).

Electron diffraction is a local approach to investigating ordering, but it is unclear whether these results are generalizable to the bulk additively manufactured microstructure, which are known to be highly heterogeneous. Neutron diffraction at ORNL high flux isotope reactor (HFIR) was used to prove the ordering behavior on an average level. The neutron interaction volume is roughly 1 $mm^3$, giving a general sense of the behavior without the local detail of TEM. Results for two samples (both manufactured with preheat) of differing wall thickness are shown in FIG. 25. The difference in wall thickness is expected to influence the average cooling rate of the ordering transformation, though not as dramatically as turning off the preheat. From these results, it is clear that the effect of the wall thickness is in the relative type of ordering that occurs. In some embodiments, a thinner wall (slower cooling rate) appears to favor $DO_3$ type atomic ordering, while the B2 peak is more pronounced in a thicker wall (e.g., 1.5 mm wall), suggesting that higher cooling rates partially or fully suppressed $D0_3$ ordering, which would be anticipated to be suppressed first, as it occurs at a lower temperature.

Figure 26:
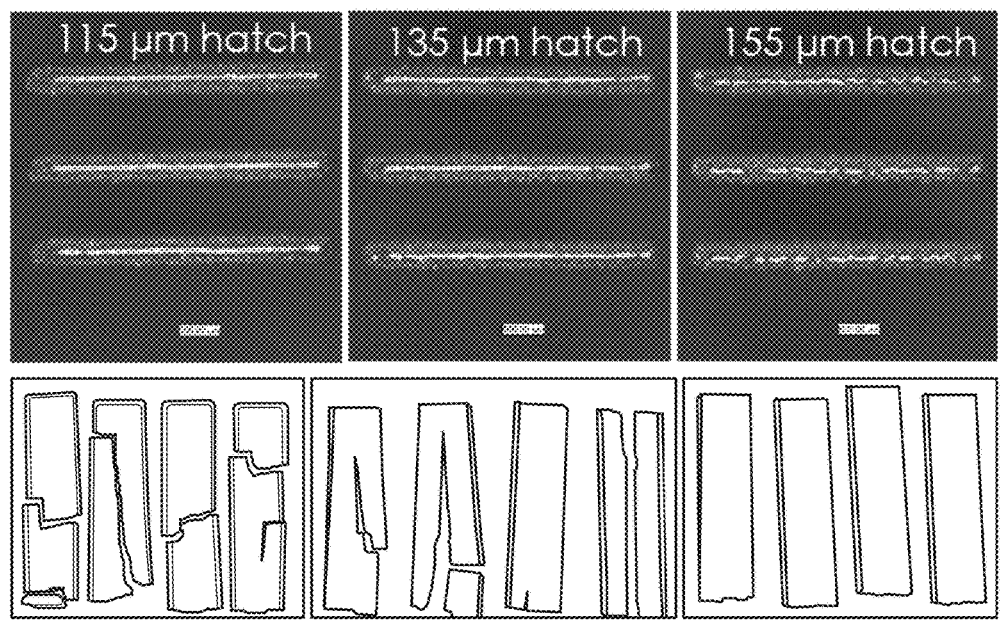
FIG. 26 includes melt track images (top row) and fracture behavior (bottom row) of thin wall embodiments comprising an Fe-6Si alloy as a function of hatch spacing.

To improve processing of Fe-6Si, the fraction behavior of thin wall specimens as a function of process conditions was also observed as a function of the hatch spacing for a transverse scan pattern (FIG. 26). As the hatch spacing increased, the weld track on the top surface of the thin walls was observed to become more discontinuous. Although this behavior of the melt pool is expected to produce some build defects in the form of porosity, the part scale fraction behavior was significant improved compared to smaller hatch spacings, where the thin walls exhibited exceedingly brittle behavior.

Example 6

Figure 27A:
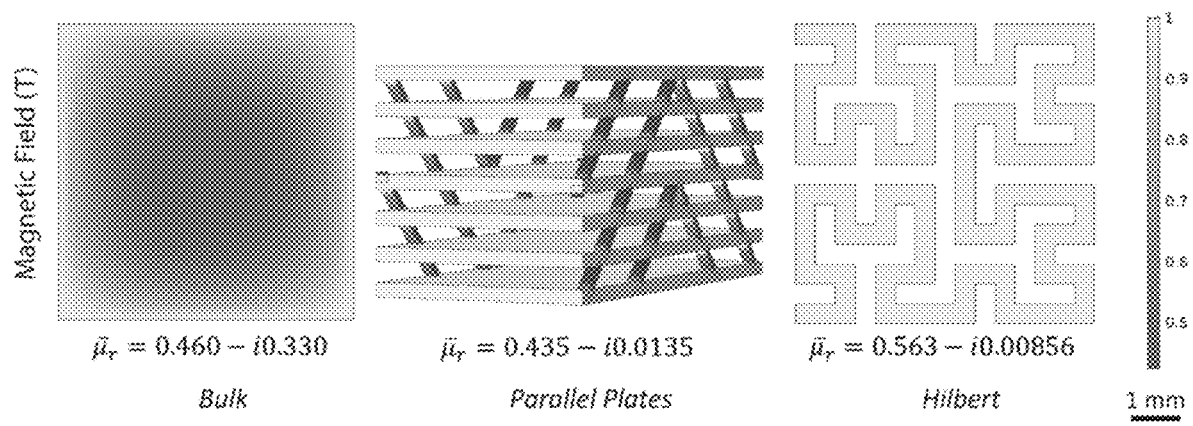
FIGS. 27A and 27B show simulations of magnetic field (FIG. 27A) and electric current density (FIG. 27B) for a bulk sample, a sample comprising a non-continuous thin wall geometry (e.g., parallel plates), and a sample comprising a continuous thin wall geometry (e.g., a Hilbert curve geometry).
Figure 27B:
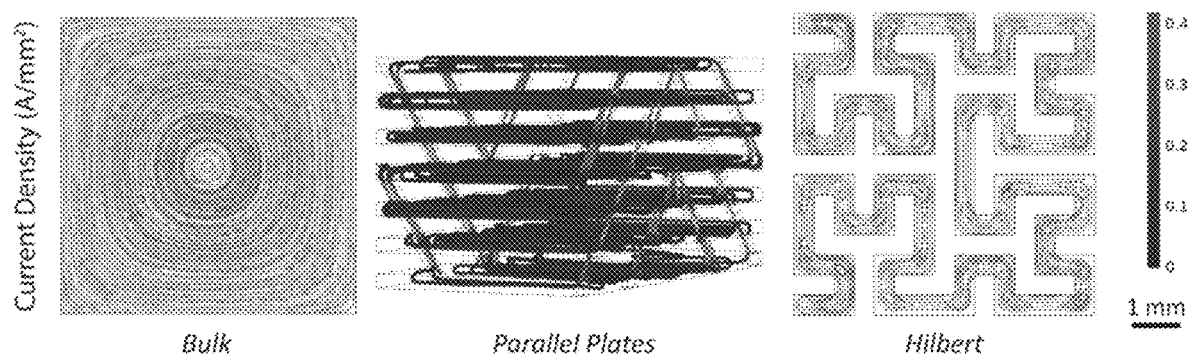

In this example, electromagnetic simulations were performed on a variety of cross-sectional geometries to understand their potential influence on eddy current development. A subset of these simulations is summarized in FIGS. 27A and 27B. The bulk cross-section previously characterized is shown as a reference (left-most images in FIGS. 27A and 27B). It is clear in this case that the eddy current development is significant and that the magnetic flux is concentrated near the outer edge of the cross-section due to the resulting skin effect. A parallel plate construction is also shown (middle images in FIGS. 27A and 27B). The parallel plates are intended to simulate conventional laminations; however, due to the constraints of additive manufacturing processing, struts are required to bond the plates together. The simulations show that these struts are effective pathways for eddy currents to develop. A Hilbert curve geometry was also simulated (right-most images in FIGS. 27A and 27B). The open nature of the path in this geometry gives a maximum path length for eddy current development and effectively reduces eddy current loss, resulting in an even distribution of the magnetic flux across the cross-section.

Based on the simulation results from this example, a series of geometries were selected for fabrication with a bounding geometry suitable for characterization with the magnetic test cell. The wall thickness in all cases was nominally 400 µm. Parallel plate geometry was fabricated with integer numbers of plates ranging from 6 to 13, inclusive, resulting in different stacking factors, but also varying the likelihood of potential electrical shorts between neighboring plates. These geometries and an example build of the Fe-3Si alloy is shown in FIGS. 1A and 1B.

Figure 28A:
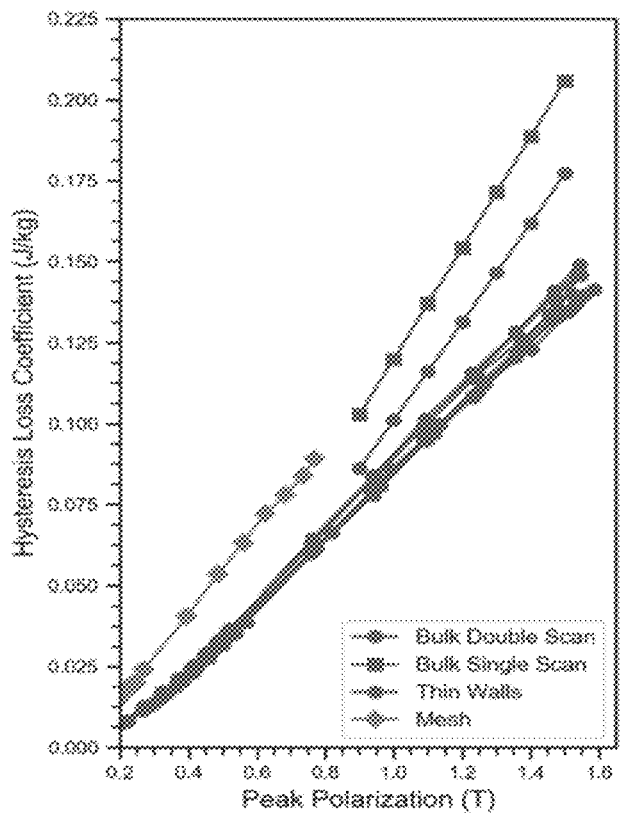
FIGS. 28A-28C are graphs showing a comparison of the loss behavior for bulk, non-continuous thin wall, and mesh cross-sections of additively manufactured objects comprising an Fe-3Si alloy, wherein FIG. 28A compares the hysteresis loss coefficient, FIG. 28B compares the eddy current loss coefficient as a function of peak polarization.
Figure 28B:
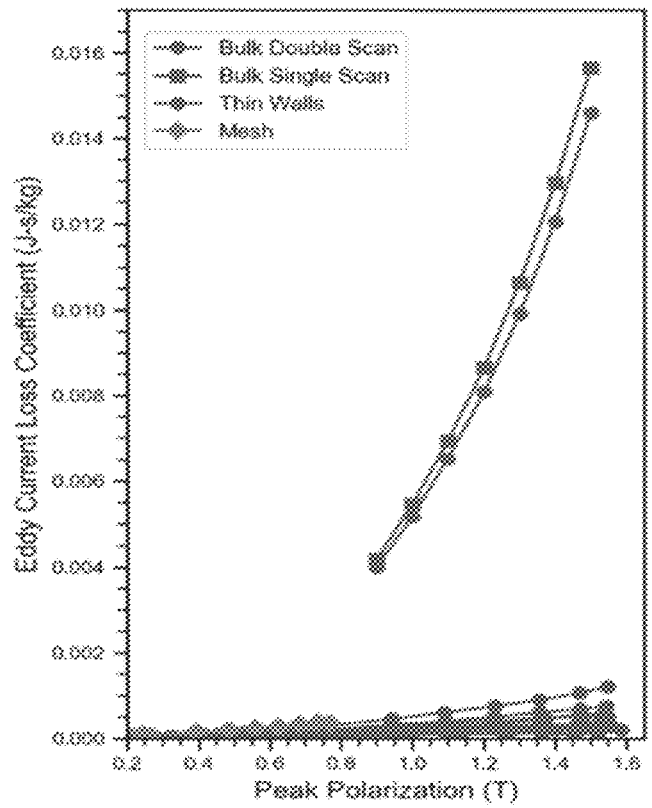
Figure 28C:
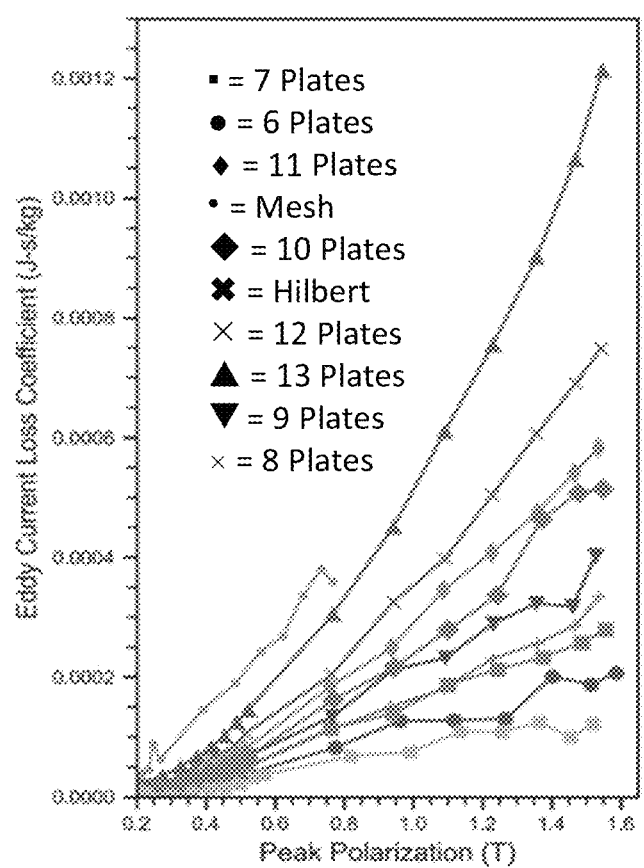
Figure 29A:
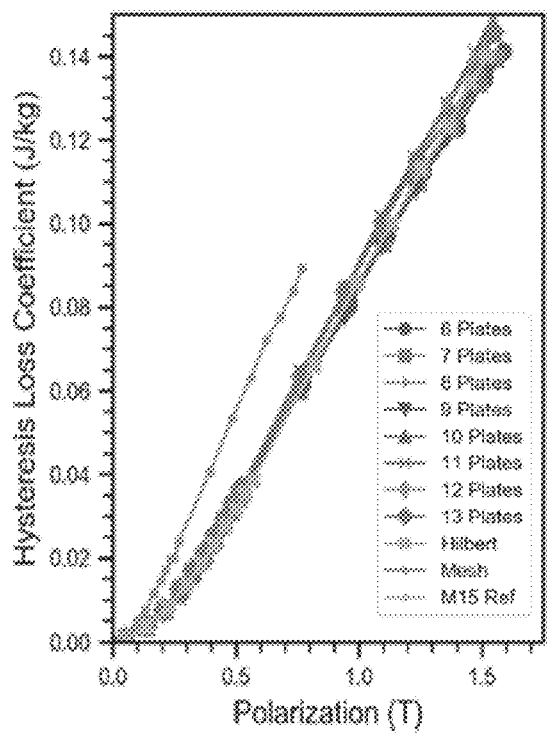
Figure 29B:
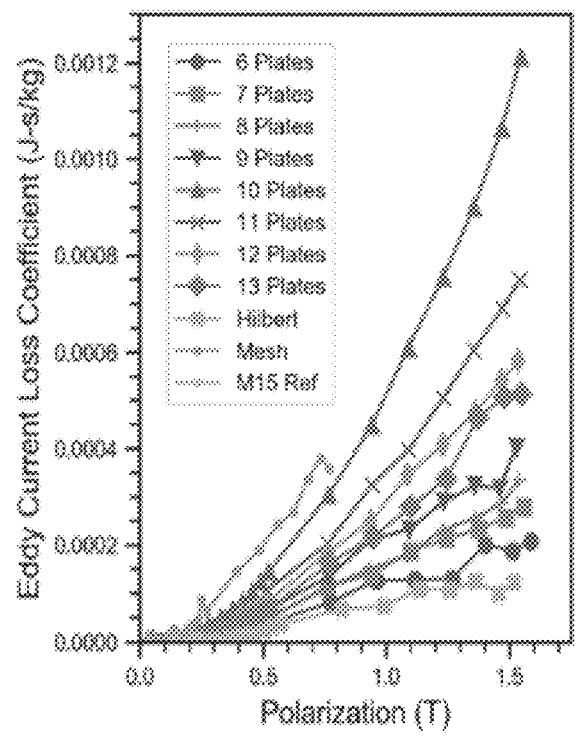
Figure 29C:
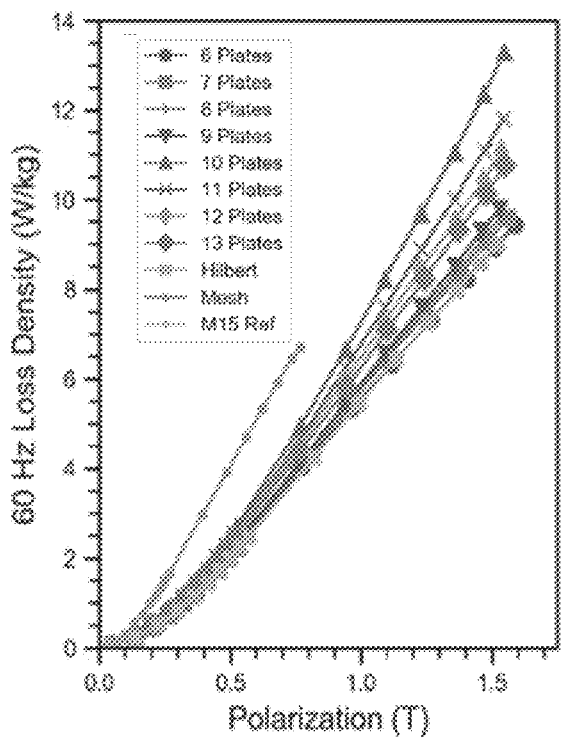
Figure 29D:
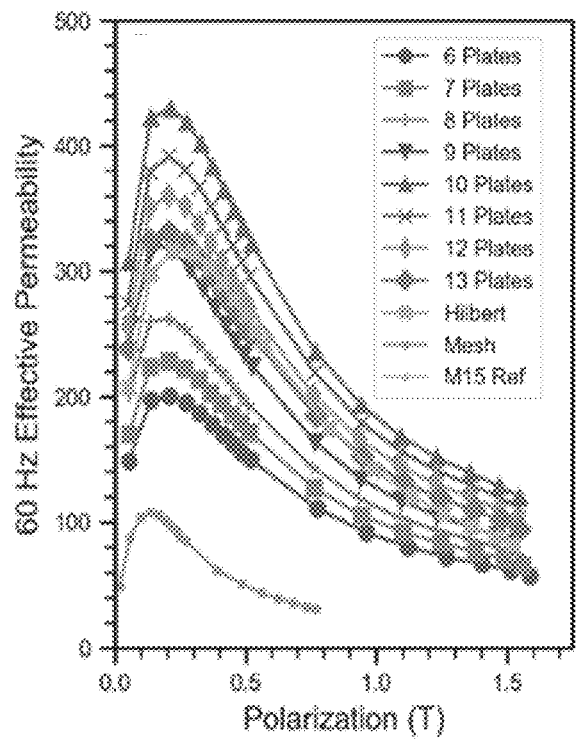
Figure 29E:
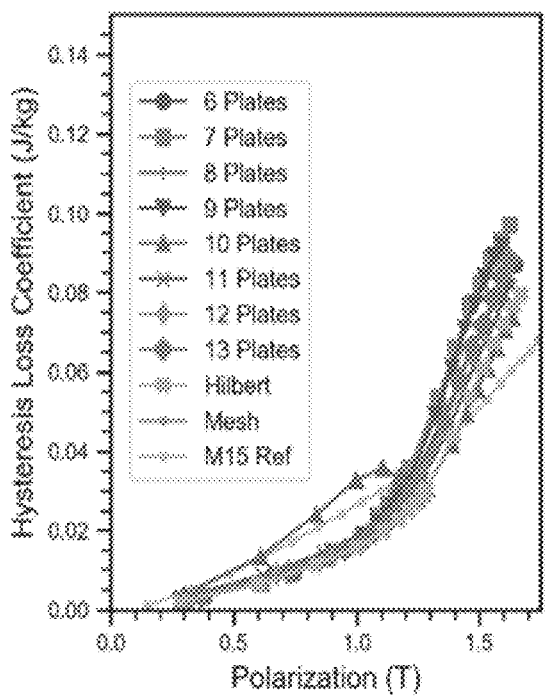
Figure 29F:
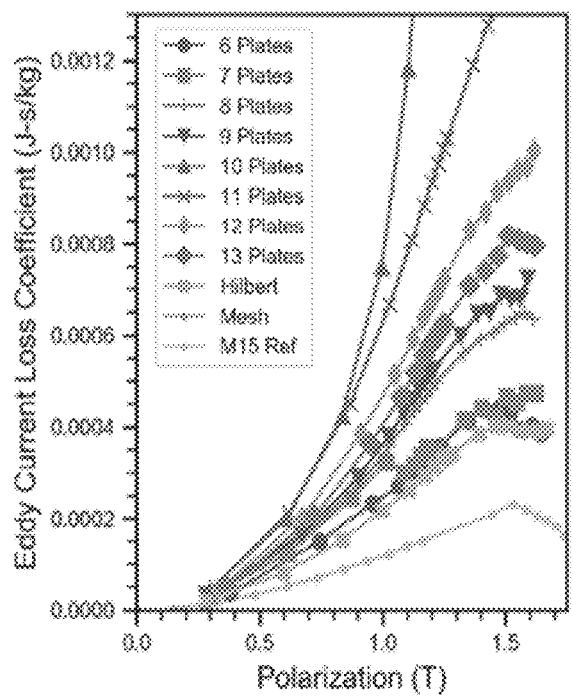
Figure 29G:
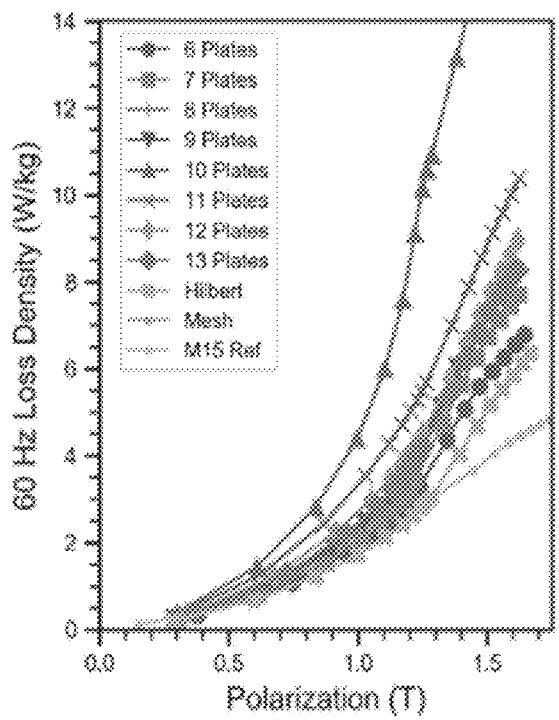
Figure 29H:
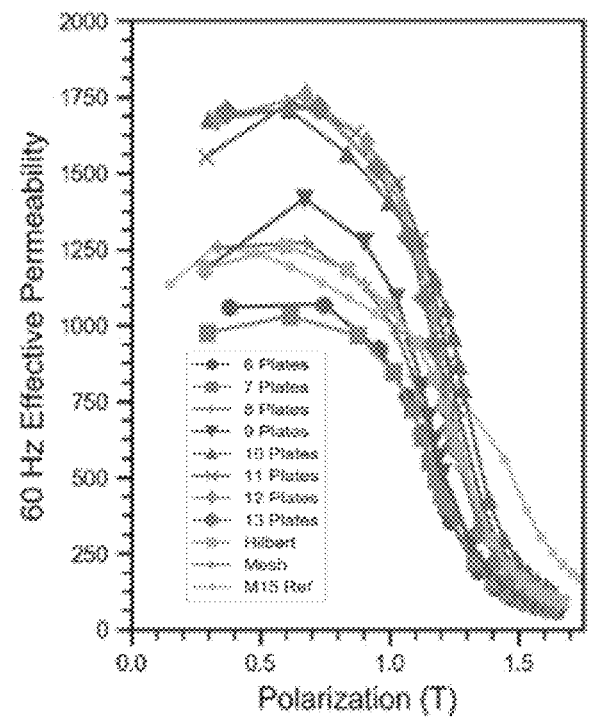

Magnetic testing of the as-fabricated Fe-3Si samples of the geometries is summarized in FIGS. 28A-28C. The hysteresis loss coefficient of the samples is somewhat lower than that of the bulk samples previously characterized (FIG. 28A). This effect is likely caused by variations in the crystallographic texture, where a sharper texture and potentially larger grains would be present in the thin wall specimens. The mesh structure, by comparison, shows poor hysteresis loss. The eddy current coefficients are noticeably smaller than the bulk samples by roughly one to two orders of magnitude (FIG. 28B). Zooming in on the eddy current coefficients (FIG. 28C) shows several interesting trends. First, the eddy current loss of the mesh structure is poorer than the other geometries owing to the closed paths produced by the tight mesh. The parallel plate geometries tend to exhibit high eddy current losses per unit mass for larger numbers of plate, suggesting electrical shorts between the closely spaced walls. In this example, the Hilbert curve geometry shows the best overall performance as compared to the other geometries, with eddy current loss coefficients roughly two orders of magnitude smaller than the initial bulk designs.

The as-fabricated results were summarized and compared to HIP'd samples and a reference M15 non-oriented steel lamination that was produced in the same test geometry and measured using the same test cell (FIGS. 29A-29H). In some examples, annealing the samples tends to reduce the loss density at 60 Hz due to grain growth and the reduction in residual stress. For particular examples, samples fabricated to have a Hilbert geometry performed the best. The effect of annealing was clear in the reduction of the hysteresis loss coefficient; however, in some samples, this effect was partially offset by the increase in the eddy current loss coefficient caused by the increase the effective magnetic permeability.

Figure 30A:
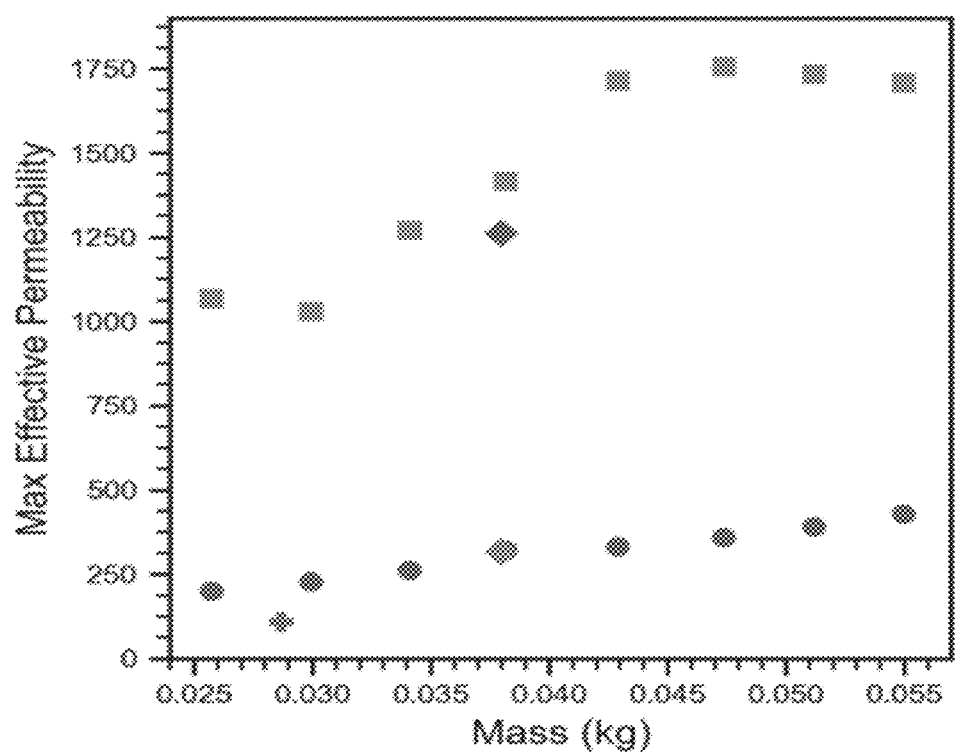
FIGS. 30A and 30B are graphs showing magnetic test results for the maximum permeability cases showing an increase in maximum effective permeability for heat-treated samples (FIG. 30A) and a decrease in the total loss density (FIG. 30B) at an applied field of 3000 A/m demonstrating shorting in closely spaced thin walls and apparent sintering during heat treatment for the highest density sample; "AB"=as-built condition, and "HT"=heat treated condition.
Figure 30B:
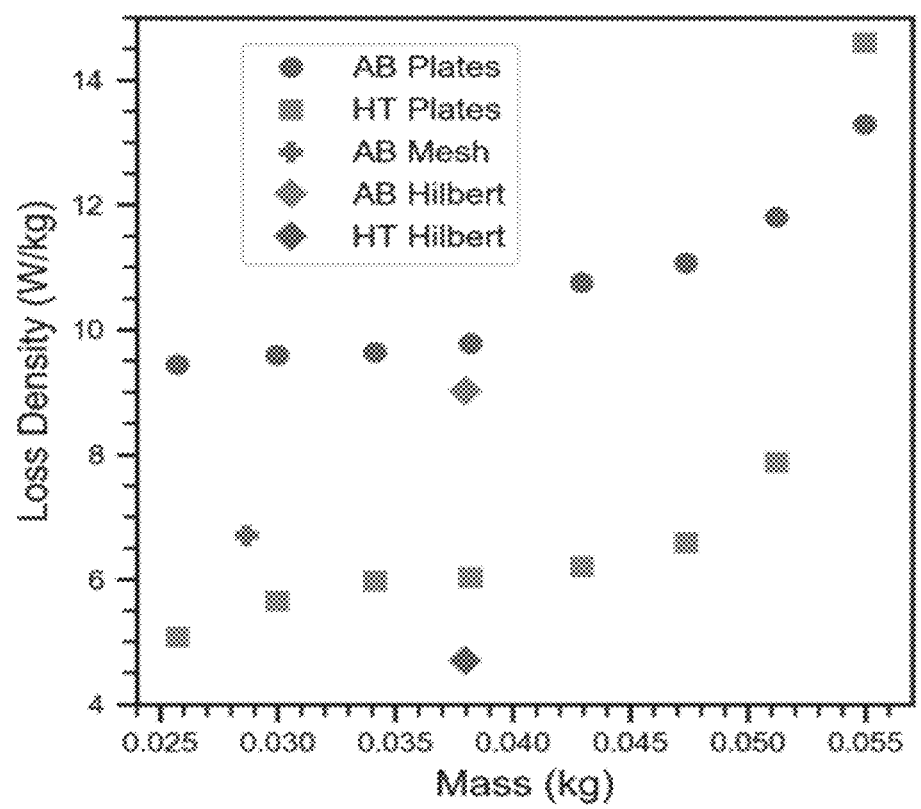

The effect of heat treatment on some examples is highlighted in FIGS. 30A and 30B as a function of the sample mass. In some samples, annealing improved both the maximum effective permeability (FIG. 30A) and reduced the loss density (FIG. 30B). It is interesting to note that for the parallel plate samples, the loss density tends to increase with sample mass, which correlates to the number of parallel plates. This effect is believed to support the current working theory that increasing electrical shorting between plates due to excess surface roughness plays a role in the magnetic performance. For similar mass, however, the Hilbert geometry achieved better performance.

Figure 31A:
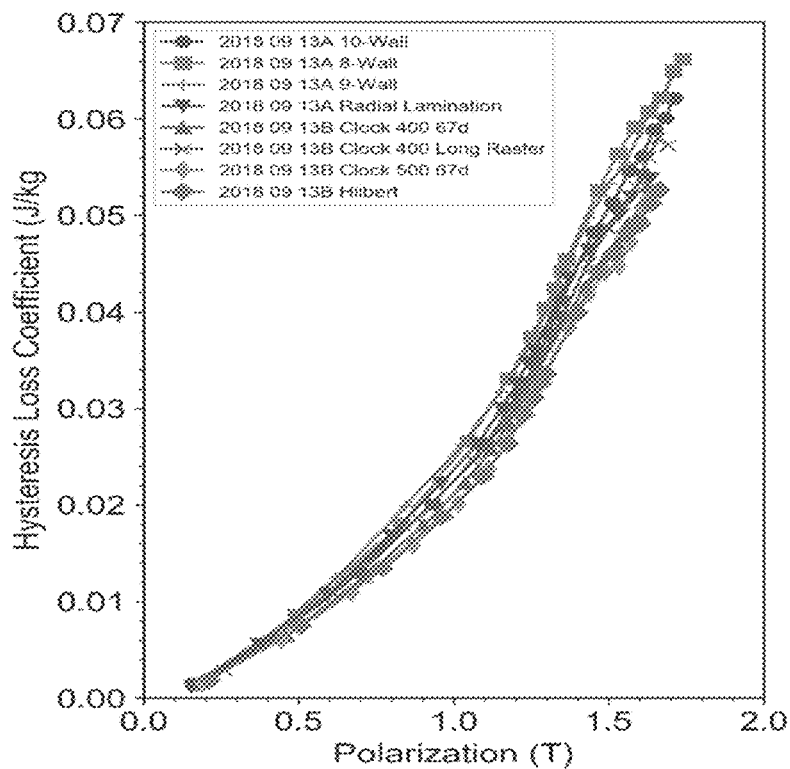
Figure 31B:
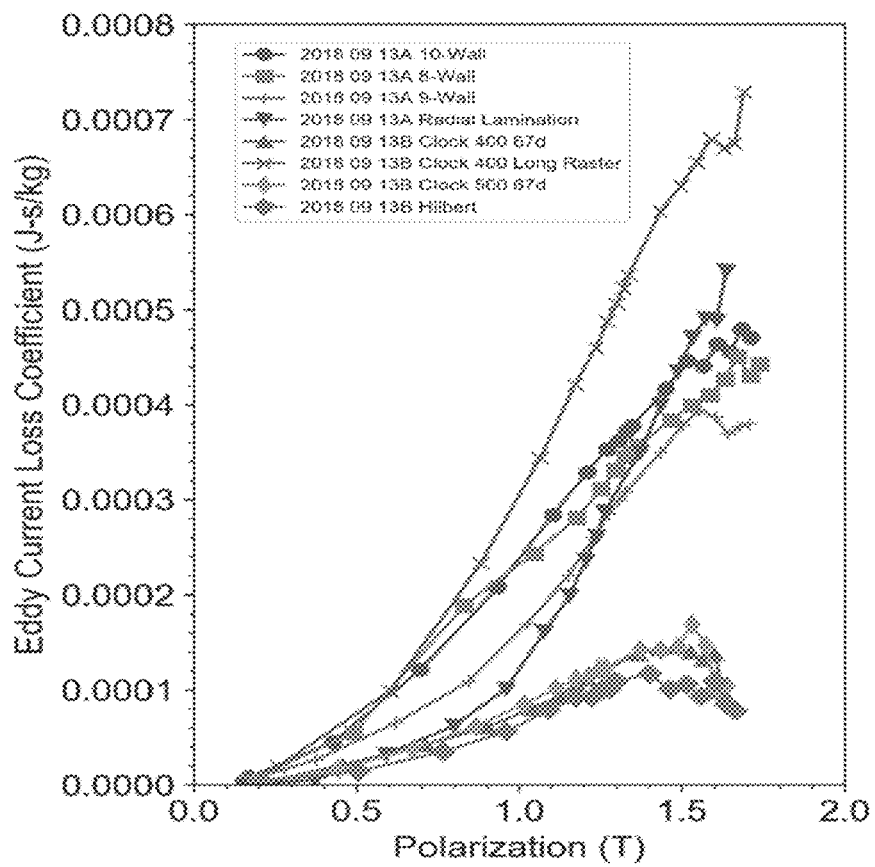
Figure 31C:
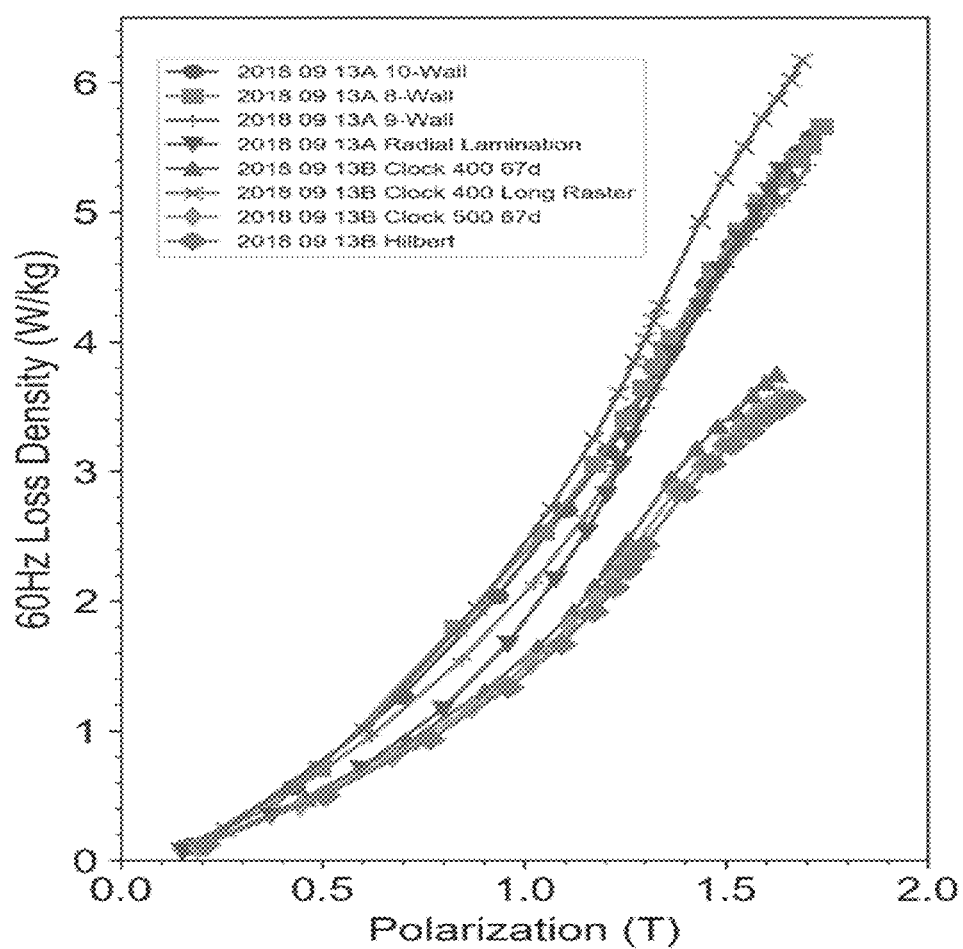

Similar geometries were also fabricated from the Fe-6Si alloy. In these samples, the heater was activated to maintain the build substrate at approximately 170° C. to reduce cracking tendency caused by thermal stresses. Also, prior to removal from the plate, the annealing heat treatment was performed to modify the microstructure and to relieve residual stresses. The geometries for the Fe-6Si samples were characterized for magnetic performance in the annealed conditions (FIGS. 31A-31C). Similar to the observations from the Fe-3Si samples, the parallel plate geometries performed more poorly with increasing numbers of plates. Some examples comprising a square spiral geometry showed good performance, particularly when the scan pattern used was the 67° rotation. Confining the scan pattern to be longitudinal along the thin walls tended to result in reduced performance in some samples, potentially caused by electrical shorting as a result of contact between walls caused by thermal distortion. Samples fabricated with a Hilbert geometry exhibited the best overall performance for the Fe-6Si samples.

Figure 32A:
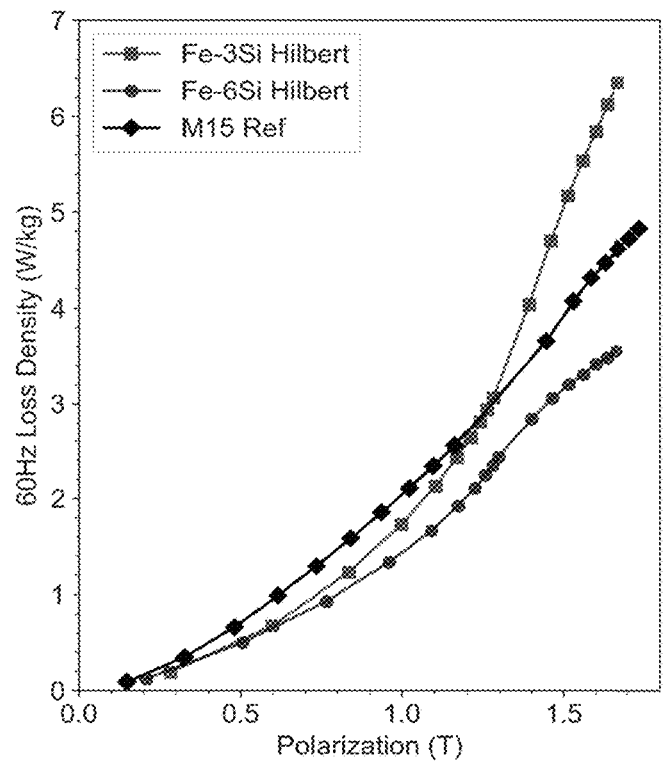
FIGS. 32A and 32B are graphs showing magnetic test results (FIG. 32A=loss density at 60 Hz.
Figure 32B:
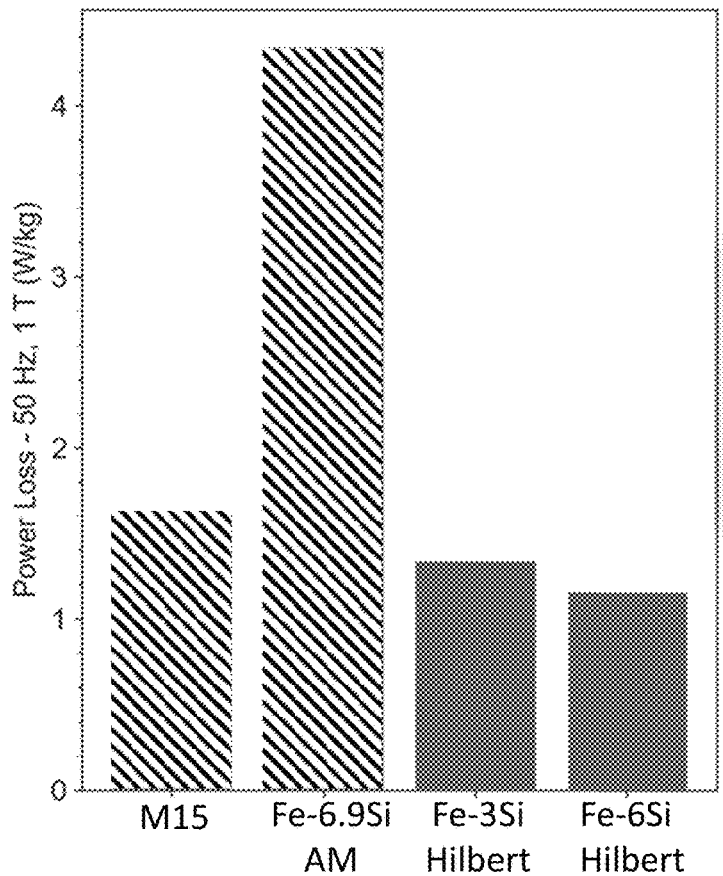

The magnetic performance of the Fe-6Si Hilbert sample was characterized and compared directly to the heat-treated Fe-3Si and reference M15 non-oriented steel samples (FIGS. 32A and 32B) and was even better than an additively manufactured Fe-6.9Si alloy product reported by Garibaldi et al. at 50 Hz and 1 T. The Fe-6Si steel achieves reduced losses compared to both the Fe-3Si and reference M15 materials across all measured peak polarization values. Without being limited to a particular theory, it currently is believed that the reduction is most likely caused by a combination of the increased magnetic permeability with the higher silicon content, as well as an increase in electrical resistivity.

Example 7

Figure 33A:
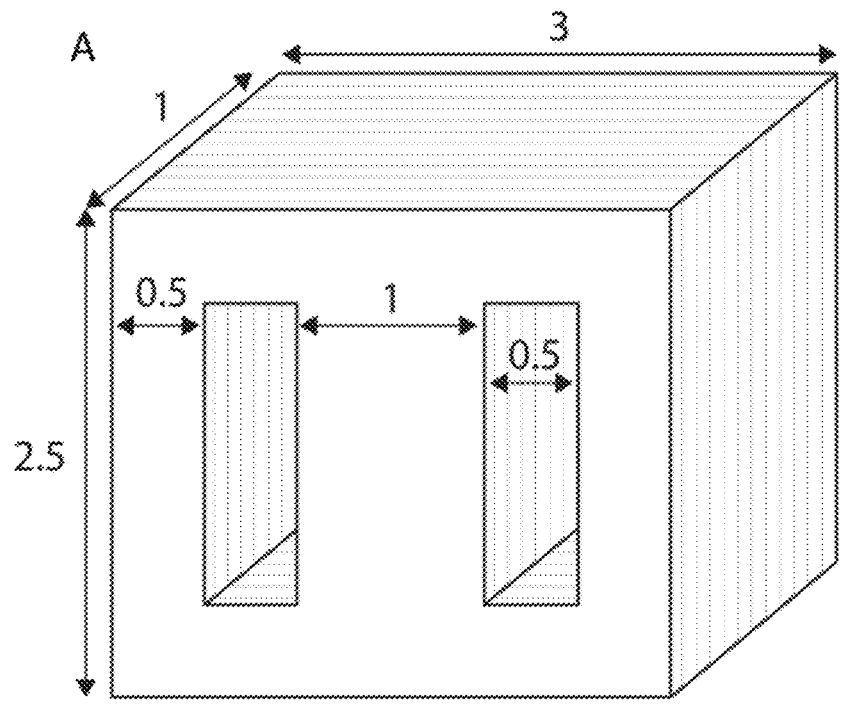
FIGS. 33A and 33B are images of a schematic showing benchtop-scale transformer core dimensions, in inches (FIG. 33A) and a CAD design for continuous thin wall embodiments comprising a Hilbert curve geometry that are used to construct the legs of the transformer core (FIG. 33B).
Figure 33B:
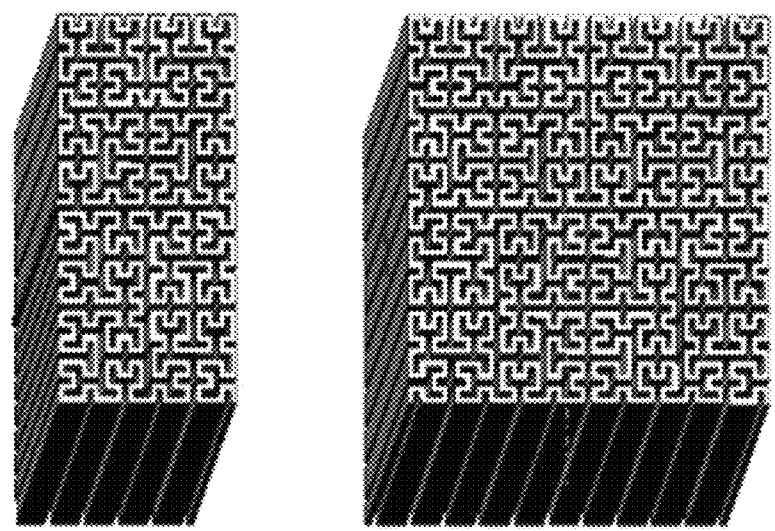

In this example, a benchtop transformer core was designed, fabricated, and tested using an alloy embodiment according to the present disclosure and additive manufacturing. A Hilbert curve cross-sectional geometry was adapted for the transformer design. The selected benchtop scale transformer core design is shown schematically with dimensions in FIG. 33A. The Hilbert curve cross-sectional geometry previously used for the 6.35 mm sq. test cell setup was adapted to the cross-sectional dimensions of the transformer core, while maintaining a 400 µm wall thickness (FIG. 33B).

Figure 34A:
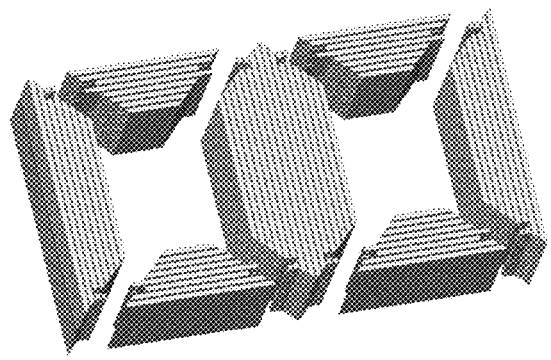
FIGS. 34A-34E are images showing the design and fabrication of an additively manufactured transformer core comprising additively manufactured continuous thin wall components comprising a Hilbert curve geometry.
Figure 34B:
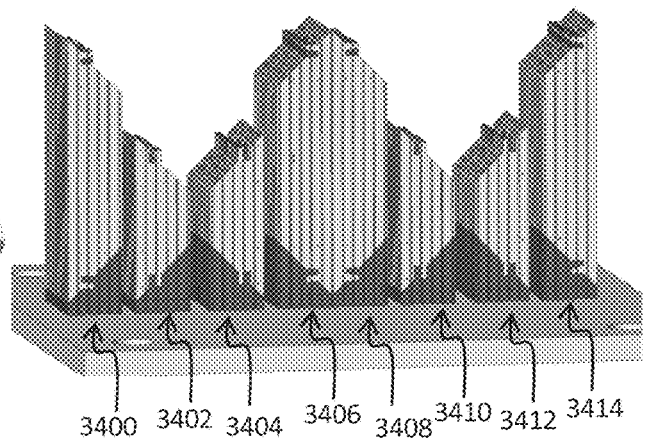
Figure 34C:
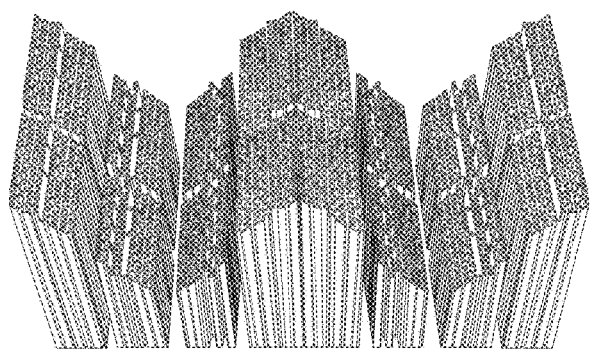
Figure 34D:
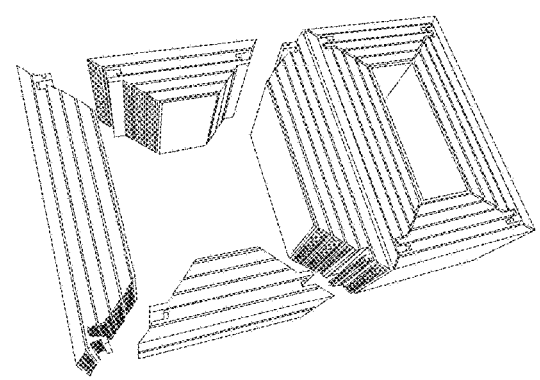
Figure 34E:
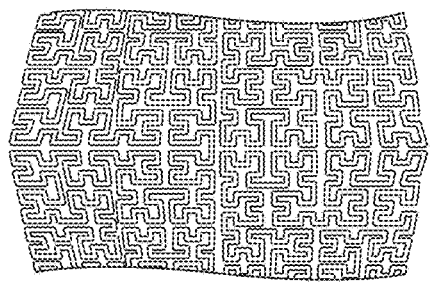

The legs of the core were each fabricated separately, and a locking miter joint design was selected for the joints between the legs. A CAD drawing of the final design is shown in FIG. 34A. The geometry was achieved by a combination of additive manufacturing and wire electrical discharge machining (FIG. 34B, with machined features/ regions 3400, 3402, 3404, 3406, 3408, 3410, 3412, and 3414). The as-built components are shown in FIG. 34C and a heat-treated embodiment is shown in FIG. 34D, which shows the core pre- and post-assembly. FIG. 34E is a close-up photographic image showing the Hilbert curve geometry fabricated with the continuous thin wall. A series of four cores were produced from each of the Fe-3Si and Fe-6SiI alloy embodiments. Following some preliminary tests of machining and assembly, two cores each were selected for further magnetic testing.

To avoid potential build failures, the Fe-6Si alloy was processed with the preheated build plate. Following completion of the build, the finished parts were left in the powder bed with the heater deactivated to cool down slowly to room temperature. The components were then annealed at 1200° C. for 4 hours while attached to the build plate, and then machined and assembled. One of the Fe-6Si cores is shown in FIG. 34D.

Figure 35A:
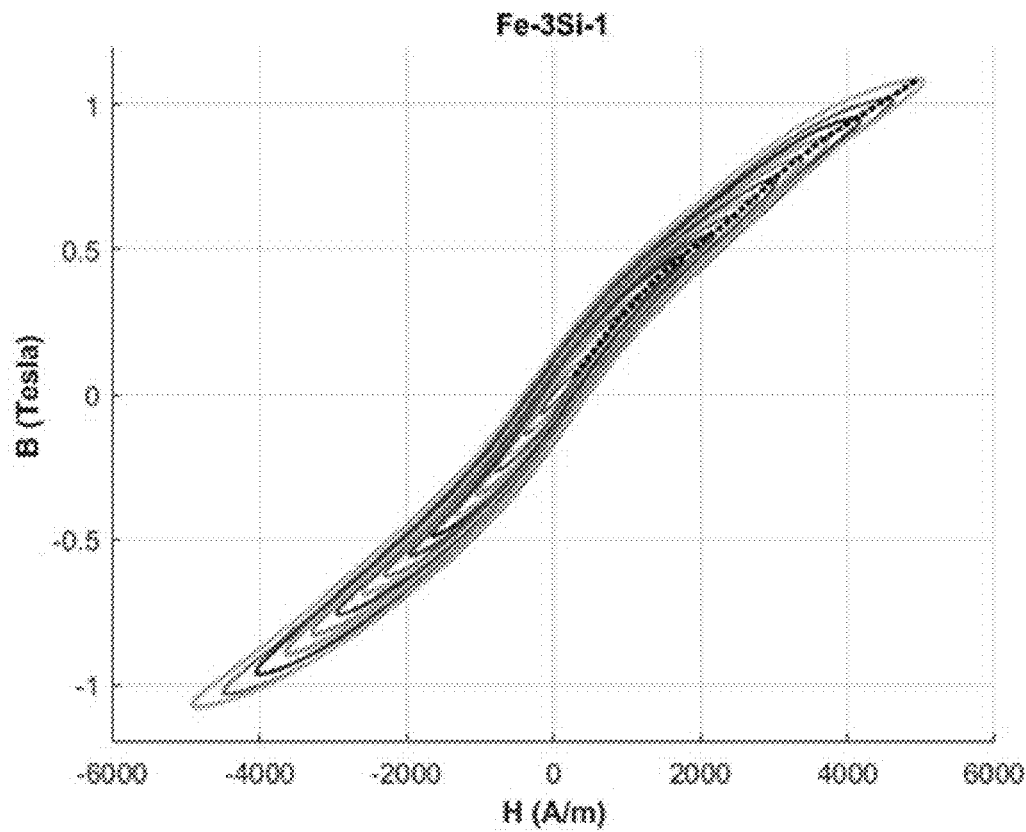
FIGS. 35A and 35B are graphs showing exemplary hysteresis curves for a transformer core comprising an Fe-3Si alloy embodiment (FIG. 35A) and an Fe-6Si alloy embodiment (FIG. 35B).

Prior to magnetic testing, the oxide scale on the cores was removed using a pickling solution comprising 11% HCl and 1.3% HF. The pickling time varied depending on the strength of the solution, which changed over time. Magnetic testing was performed using an experimental set-up. A coil of 64 turns was wound using AWG 16 copper magnet wires. The cores were excited with a 60 Hz sinusoidal voltage source with a magnitude range from about 0.5V to 8.0V rms. The voltage across the coil terminals and current flowing within the terminals was measured and their waveforms recorded by an oscilloscope for post processing. Typical waveforms resulting from testing the cores are shown in FIGS. 35A (Fe-3Si) and 35B (Fe-6Si) with voltage shown in yellow and current in blue.

The voltage waveform was used to obtain the magnetic field flux density (B field) waveform, and current waveform for the magnetic field intensity (H field). The B field is proportional to the integral of the voltages:

$$B = \frac{1}{N} \int V(t)dt, \quad (25)$$

where N is the number of coil turns and V(t) is the simultaneous voltage crossing the coil terminals. The H field is proportional to the magnetomotive force of the coil:

$$H(t) = \frac{1}{l} NI(t), \quad (26)$$

where I(t) is the simultaneous current of the coil, and l is the length of the mean magnetic flux path of the core. The parameters of the core and coil used in the post process calculations are listen in Table 3.

TABLE 3

Transformer core parameters for hysteresis curve post processing.

| Parameter | Value |
| --- | --- |
| Frequency, Hz | 60 |
| Coil turns | 64 |
| Cross-sectional area of core leg, m² | 1.8 × 10⁻⁴ |
| Length of mean magnetic path, m | 0.0984 |

Figure 35B:
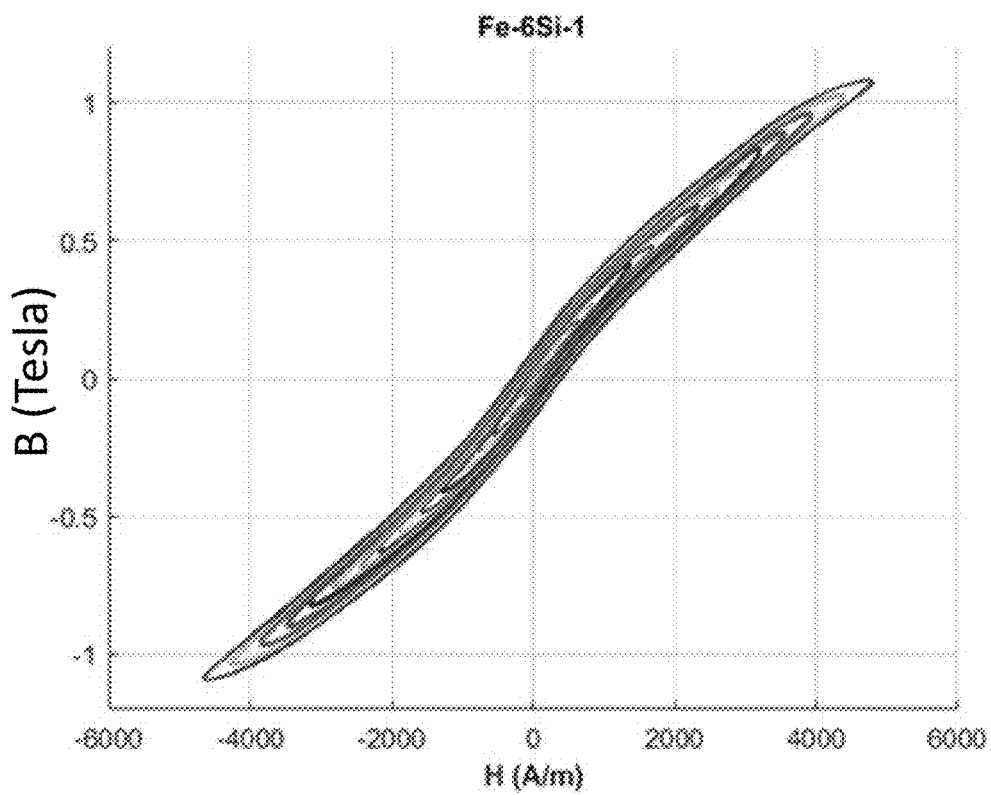

Examples of the hysteresis curves for one core of each composition, at different excitation voltages, are shown in FIGS. 35A and 35B. The higher silicon content appears to slightly narrow the hysteresis curves, suggesting lower power losses, and appears to increase the saturation behavior.

Figure 36:
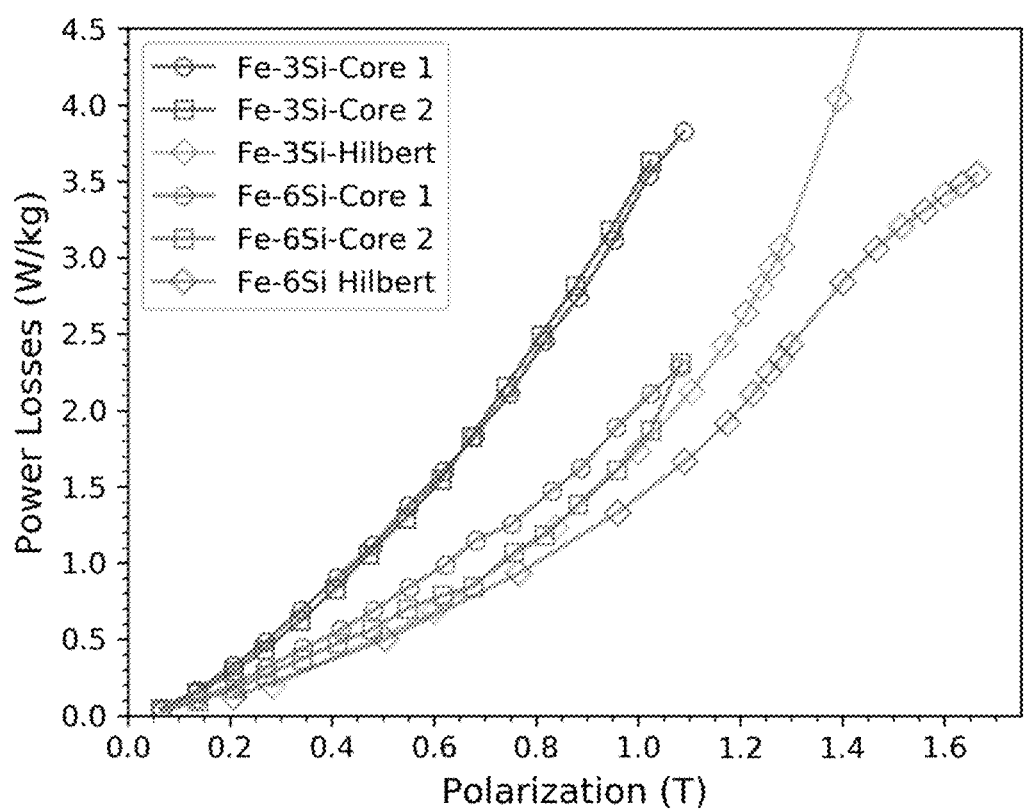
FIG. 36 is a graph showing loss density per unit mass for additively manufactured benchtop-scale transformer cores comprising an Fe-3Si alloy embodiment and an Fe-6Si alloy embodiment and compared to Fe-3Si and Fe-6Si Hilbert curve cross sections, tested at 60 Hz.

The performance of the cores can be quantified by calculating the power losses per unit mass. The data is also compared to the power loss per unit mass for the Fe-3Si and Fe-6Si Hilbert curve cross-sections tested with the simple "picture-frame" geometry. Results are shown in FIG. 36.

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. An additively manufactured object having a shape, comprising:
    a continuous thin wall having a thickness ranging from greater than 0 mm to 1.5 mm and that occupies a fixed region of the object defined by the shape of the object, wherein the continuous thin wall is made of an iron-silicon alloy and comprises at least two termini that do not physically touch, and wherein external boundaries of the continuous thin wall do not touch along a path length of the continuous thin wall; and
    an internal void region defined by the external boundaries of the continuous thin wall.

2. The additively manufactured object of claim 1, wherein the iron-silicon alloy comprises silicon in an amount ranging from 3 wt % to 6 wt %.

3. The additively manufactured object of claim 1, wherein the iron-silicon alloy is not Fe-6.9Si.

4. The additively manufactured object of claim 1, wherein the continuous thin wall has a path length that reduces eddy current loop formation.

5. The additively manufactured object of claim 1, wherein the continuous thin wall is configured in a pattern that comprises at least one angled curve.

6. The additively manufactured object of claim 5, wherein the angled curve ranges from greater than 0° to less than 180°.

7. The additively manufactured object of claim 1, wherein the continuous thin wall is fabricated to have a geometry that adopts a Hilbert curve pattern.

8. The additively manufactured object of claim 1, wherein the continuous thin wall is fabricated to have a shape matching a square spiral pattern.

9. The additively manufactured object of claim 1, wherein the iron-silicon alloy is substantially free of carbon or oxygen interstitial elements.

10. The additively manufactured object of claim 1, wherein the additively manufactured object is a structural component of a transformer core or an electric motor.

11. The additively manufactured object of claim 1, wherein the continuous thin wall does not comprise a single planar sheet of the iron-silicon alloy or a plurality of laminated planar sheets of the iron-silicon alloy.

12. A method for manufacturing the additively manufactured object of claim 1, the method comprising:
    (a) adding a first amount of an iron-silicon alloy feedstock to a build platform;
    (b) exposing the first amount, or a portion thereof, of the iron-silicon alloy feedstock to an energy source to provide a first energy-treated region on the build platform, wherein the first energy-treated region comprises an iron-silicon alloy material;
    (c) adding a second amount of the iron-silicon alloy feedstock to the build platform, wherein the second amount of the iron-silicon alloy feedstock is positioned immediately adjacent to the first energy-treated region on the build platform;

(d) exposing the second amount, or a portion thereof, of the iron-silicon alloy feedstock to the energy source to provide a second energy-treated region on the build platform, wherein the second energy-treated region comprises the iron-silicon alloy material; and repeating steps (a), (b), (c), and/or (d) to fabricate the continuous thin wall made up of the iron-silicon alloy material.

13. The method of claim 12, further comprising preheating a build plate upon which the iron-silicon alloy feedstock is added during fabrication.

14. The method of claim 12, further comprising increasing or decreasing cooling rate to change a thickness of the continuous thin wall.

15. The method of claim 12, wherein a scan pattern is used to modify a grain structure of the iron-silicon alloy material during fabrication.

16. The method of claim 12, wherein the iron-silicon alloy is Fe-3Si or Fe-6Si.

17. The method of claim 12, wherein the iron-silicon alloy feedstock is in the form of a powder.

18. An additively manufactured transformer core, or part thereof, comprising:
   a continuous thin wall made of an Fe-3Si or an Fe-6Si alloy and having a thickness ranging from 0.1 mm to 1.5 mm and that comprises (i) a first terminus and a second terminus, wherein the first terminus and the second terminus do not physically touch and (ii) an external boundary; and
   an internal void region defined by the external boundary of the continuous thin wall; wherein the continuous thin wall comprises at least one angled curve ranging from greater than 0° to 90°.

* * * * *